US009191505B2

(12) United States Patent
Poder

(10) Patent No.: US 9,191,505 B2
(45) Date of Patent: *Nov. 17, 2015

(54) STATEFUL HOME PHONE SERVICE

(75) Inventor: James Poder, Cheltenham, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/543,284

(22) Filed: Jul. 6, 2012

(65) Prior Publication Data
US 2012/0275581 A1  Nov. 1, 2012

Related U.S. Application Data

(63) Continuation of application No. 12/473,319, filed on May 28, 2009, now Pat. No. 8,238,538.

(51) Int. Cl.
H04M 3/42    (2006.01)
H04M 3/436   (2006.01)

(52) U.S. Cl.
CPC .................................... *H04M 3/436* (2013.01)

(58) Field of Classification Search
CPC ............ H04M 2242/40; H04M 3/42348; H04M 3/42365; H04M 3/42374; H04M 3/42059
USPC ............ 379/207.12, 211.02, 211.04, 212.01, 379/37, 201.01, 201.02; 455/456.6, 417
See application file for complete search history.

(56) References Cited

U.S. PATENT DOCUMENTS

| 4,051,326 A | 9/1977 | Badagnani et al. |
| 4,054,756 A | 10/1977 | Comella et al. |
| 4,076,964 A | 2/1978 | Henrion et al. |
| 4,100,377 A | 7/1978 | Flanagan |
| 4,160,129 A | 7/1979 | Peyser et al. |
| 4,191,860 A | 3/1980 | Weber |
| 4,201,891 A | 5/1980 | Lawrence et al. |
| 4,258,387 A | 3/1981 | Lemelson et al. |
| 4,310,727 A | 1/1982 | Lawser |
| 4,313,035 A | 1/1982 | Jordan et al. |
| 4,313,036 A | 1/1982 | Jabara et al. |

(Continued)

FOREIGN PATENT DOCUMENTS

| DE | 3333511 A1 | 4/1985 |
| DE | 4337055 A1 | 5/1994 |

(Continued)

OTHER PUBLICATIONS

Mahy, et al., "A Call Control and Multi-Party Usage Framework for the Session Initiation Protocol (SIP)", http://www.ietf.org/internet-drafts/drafts-ietf-sipping-cc-framework-10.txt, Internet, Apr. 16, 2008, p. 12, The IETF Trust.

(Continued)

*Primary Examiner* — Thjuan K Addy
(74) *Attorney, Agent, or Firm* — Banner & Witcoff, Ltd.

(57) ABSTRACT

Incoming messages, such as phone calls, may be routed to destinations based on a variety of factors, such as the state of the callee's security system, the date and time, the identity of the caller, and the number of recent call attempts by the caller. Potential destinations include all or a subset of the phones associated with a subscriber and outside phones, such as cellular phones operated by third parties. The rules used to route calls may be defined or modified via a web interface.

20 Claims, 3 Drawing Sheets

(56) References Cited

U.S. PATENT DOCUMENTS

| | | |
|---|---|---|
| 4,345,315 A | 8/1982 | Cadotte et al. |
| 4,360,910 A | 11/1982 | Segal et al. |
| 4,371,751 A | 2/1983 | Hilligoss, Jr. et al. |
| 4,371,752 A | 2/1983 | Matthews et al. |
| 4,375,097 A | 2/1983 | Ulug |
| 4,464,543 A | 8/1984 | Kline et al. |
| 4,511,762 A | 4/1985 | Stockdale |
| 4,539,676 A | 9/1985 | Lucas |
| 4,555,594 A | 11/1985 | Friedes et al. |
| 4,565,903 A | 1/1986 | Riley |
| 4,577,066 A | 3/1986 | Bimonte et al. |
| 4,585,906 A | 4/1986 | Matthews et al. |
| 4,589,107 A | 5/1986 | Middleton et al. |
| 4,602,129 A | 7/1986 | Matthews et al. |
| 4,609,778 A | 9/1986 | Franklin et al. |
| 4,611,094 A | 9/1986 | Asmuth et al. |
| 4,611,096 A | 9/1986 | Asmuth et al. |
| 4,625,081 A | 11/1986 | Lotito et al. |
| 4,630,262 A | 12/1986 | Callens et al. |
| 4,652,700 A | 3/1987 | Matthews et al. |
| 4,653,045 A | 3/1987 | Stanley et al. |
| 4,653,090 A | 3/1987 | Hayden |
| 4,659,877 A | 4/1987 | Dorsey et al. |
| 4,672,700 A | 6/1987 | Poncy |
| 4,679,190 A | 7/1987 | Dias et al. |
| 4,685,125 A | 8/1987 | Zave |
| 4,694,483 A | 9/1987 | Cheung |
| 4,707,826 A | 11/1987 | Froggatt |
| 4,710,917 A | 12/1987 | Tompkins et al. |
| 4,713,806 A | 12/1987 | Oberlander et al. |
| 4,718,005 A | 1/1988 | Feigenbaum et al. |
| 4,723,238 A | 2/1988 | Isreal et al. |
| 4,730,071 A | 3/1988 | Schoenthal et al. |
| 4,734,931 A | 3/1988 | Bourg et al. |
| 4,741,820 A | 5/1988 | Coughlin et al. |
| 4,747,130 A | 5/1988 | Ho |
| 4,748,618 A | 5/1988 | Brown et al. |
| 4,765,924 A | 8/1988 | Inoue et al. |
| 4,766,604 A | 8/1988 | Axberg |
| 4,771,425 A | 9/1988 | Baran et al. |
| 4,782,485 A | 11/1988 | Gollub |
| 4,788,718 A | 11/1988 | McNabb et al. |
| 4,790,003 A | 12/1988 | Kepley et al. |
| 4,809,272 A | 2/1989 | Torgrim et al. |
| 4,817,050 A | 3/1989 | Komatsu et al. |
| 4,821,034 A | 4/1989 | Anderson et al. |
| 4,823,373 A | 4/1989 | Takahashi et al. |
| 4,827,500 A | 5/1989 | Binkerd et al. |
| 4,829,324 A | 5/1989 | Drake et al. |
| 4,837,798 A | 6/1989 | Cohen et al. |
| 4,852,149 A | 7/1989 | Zwick et al. |
| 4,852,151 A | 7/1989 | Dittakavi et al. |
| 4,865,763 A | 9/1989 | Inoue et al. |
| 4,866,758 A | 9/1989 | Heinzelmann |
| 4,866,763 A | 9/1989 | Cooper et al. |
| 4,872,157 A | 10/1989 | Hemmady et al. |
| 4,872,159 A | 10/1989 | Hemmady et al. |
| 4,872,160 A | 10/1989 | Hemmady et al. |
| 4,872,197 A | 10/1989 | Pemmaraju |
| 4,875,206 A | 10/1989 | Nichols et al. |
| 4,877,949 A | 10/1989 | Danielson et al. |
| 4,882,476 A | 11/1989 | White |
| 4,885,739 A | 12/1989 | Read et al. |
| 4,893,248 A | 1/1990 | Pitts et al. |
| 4,893,302 A | 1/1990 | Hemmady et al. |
| 4,894,824 A | 1/1990 | Hemmady et al. |
| 4,897,866 A | 1/1990 | Majmudar et al. |
| 4,897,874 A | 1/1990 | Lidinsky et al. |
| 4,899,333 A | 2/1990 | Roediger |
| 4,899,373 A | 2/1990 | Lee et al. |
| 4,903,260 A | 2/1990 | Boettle et al. |
| 4,903,261 A | 2/1990 | Baran et al. |
| 4,904,100 A | 2/1990 | Enix |
| 4,907,277 A | 3/1990 | Callens et al. |
| 4,907,724 A | 3/1990 | Wing, Jr. et al. |
| 4,910,794 A | 3/1990 | Mahany |
| 4,916,691 A | 4/1990 | Goodman |
| 4,918,722 A | 4/1990 | Duehren et al. |
| 4,922,348 A | 5/1990 | Gillon et al. |
| 4,922,486 A | 5/1990 | Lidinsky et al. |
| 4,922,529 A | 5/1990 | Kiel |
| 4,924,510 A | 5/1990 | Le |
| 4,933,931 A | 6/1990 | Kokubo |
| 4,937,676 A | 6/1990 | Finelli et al. |
| 4,942,574 A | 7/1990 | Zelle |
| 4,958,341 A | 9/1990 | Hemmady et al. |
| 4,961,088 A | 10/1990 | Gilliland et al. |
| 4,969,184 A | 11/1990 | Gordon et al. |
| 4,970,723 A | 11/1990 | Lin |
| 4,972,504 A | 11/1990 | Daniel, Jr. et al. |
| 4,977,556 A | 12/1990 | Noguchi |
| 4,979,206 A | 12/1990 | Padden et al. |
| 4,979,207 A | 12/1990 | Baum et al. |
| 4,995,074 A | 2/1991 | Goldman et al. |
| 4,996,685 A | 2/1991 | Farese et al. |
| 4,996,707 A | 2/1991 | O'Malley et al. |
| D315,573 S | 3/1991 | Schultz et al. |
| 5,008,906 A | 4/1991 | Reichwein |
| 5,008,926 A | 4/1991 | Misholi |
| 5,009,337 A | 4/1991 | Bimbi |
| 5,012,511 A | 4/1991 | Hanle et al. |
| 5,014,266 A | 5/1991 | Bales et al. |
| 5,018,191 A | 5/1991 | Catron et al. |
| 5,019,699 A | 5/1991 | Koenck |
| 5,023,868 A | 6/1991 | Davidson et al. |
| 5,025,254 A | 6/1991 | Hess |
| 5,027,388 A | 6/1991 | Bradshaw et al. |
| 5,029,196 A | 7/1991 | Morganstein |
| 5,029,199 A | 7/1991 | Jones et al. |
| 5,029,200 A | 7/1991 | Haas et al. |
| 5,031,098 A | 7/1991 | Miller et al. |
| 5,034,975 A | 7/1991 | Grimes |
| 5,041,972 A | 8/1991 | Frost |
| 5,042,027 A | 8/1991 | Takase et al. |
| 5,046,088 A | 9/1991 | Margulies |
| 5,052,020 A | 9/1991 | Koenck et al. |
| 5,052,943 A | 10/1991 | Davis |
| 5,062,103 A | 10/1991 | Davidson et al. |
| 5,065,393 A | 11/1991 | Sibbitt et al. |
| 5,068,888 A | 11/1991 | Scherk et al. |
| 5,070,536 A | 12/1991 | Mahany et al. |
| 5,072,442 A | 12/1991 | Todd |
| 5,075,771 A | 12/1991 | Hashimoto |
| 5,088,052 A | 2/1992 | Spielman et al. |
| 5,091,905 A | 2/1992 | Amada |
| 5,097,528 A | 3/1992 | Gursahaney et al. |
| 5,098,877 A | 3/1992 | Coughlin et al. |
| 5,103,449 A | 4/1992 | Jolissaint |
| 5,107,492 A | 4/1992 | Roux et al. |
| 5,113,430 A | 5/1992 | Richardson, Jr. et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker et al. |
| 5,131,020 A | 7/1992 | Liebesny et al. |
| 5,134,647 A | 7/1992 | Pugh et al. |
| 5,136,707 A | 8/1992 | Block et al. |
| 5,140,626 A | 8/1992 | Ory et al. |
| 5,144,282 A | 9/1992 | Sutterlin et al. |
| 5,144,340 A | 9/1992 | Hotomi et al. |
| 5,146,488 A | 9/1992 | Okada et al. |
| 5,146,491 A | 9/1992 | Silver et al. |
| 5,153,738 A | 10/1992 | Stemmle |
| 5,155,484 A | 10/1992 | Chambers, IV |
| 5,155,502 A | 10/1992 | Kimura et al. |
| 5,155,761 A | 10/1992 | Hammond |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,163,055 A | 11/1992 | Lee et al. |
| 5,163,080 A | 11/1992 | Amoroso et al. |
| 5,164,938 A | 11/1992 | Jurkevich et al. |
| 5,179,936 A | 1/1993 | O'Hara et al. |

(56) References Cited

U.S. PATENT DOCUMENTS

| | | | |
|---|---|---|---|
| 5,180,232 | A | 1/1993 | Chadima, Jr. et al. |
| 5,181,236 | A | 1/1993 | LaVallee et al. |
| 5,182,748 | A | 1/1993 | Sakata et al. |
| 5,185,785 | A | 2/1993 | Funk et al. |
| 5,185,860 | A | 2/1993 | Wu |
| 5,187,710 | A | 2/1993 | Chau et al. |
| 5,191,410 | A | 3/1993 | McCalley et al. |
| 5,193,110 | A | 3/1993 | Jones et al. |
| 5,195,085 | A | 3/1993 | Bertsch et al. |
| 5,195,086 | A | 3/1993 | Baumgartner et al. |
| 5,195,128 | A | 3/1993 | Knitl |
| 5,195,183 | A | 3/1993 | Miller et al. |
| 5,197,127 | A | 3/1993 | Waclawsky et al. |
| 5,199,062 | A | 3/1993 | Von Meister et al. |
| 5,200,993 | A | 4/1993 | Wheeler et al. |
| 5,202,817 | A | 4/1993 | Koenck et al. |
| 5,202,825 | A | 4/1993 | Miller et al. |
| 5,204,894 | A | 4/1993 | Darden |
| 5,206,901 | A | 4/1993 | Harlow et al. |
| 5,206,903 | A | 4/1993 | Kohler et al. |
| 5,208,809 | A | 5/1993 | Fergeson et al. |
| 5,208,848 | A | 5/1993 | Pula |
| 5,208,908 | A | 5/1993 | Harrison et al. |
| 5,215,011 | A | 6/1993 | Monney |
| 5,216,233 | A | 6/1993 | Main et al. |
| 5,218,187 | A | 6/1993 | Koenck et al. |
| 5,218,188 | A | 6/1993 | Hanson |
| 5,223,699 | A | 6/1993 | Flynn et al. |
| 5,223,820 | A | 6/1993 | Sutterlin et al. |
| 5,225,071 | A | 7/1993 | Coughlin et al. |
| 5,226,075 | A | 7/1993 | Funk et al. |
| 5,227,614 | A | 7/1993 | Danielson et al. |
| 5,228,076 | A | 7/1993 | Hopner et al. |
| 5,231,492 | A | 7/1993 | Dangi et al. |
| 5,235,317 | A | 8/1993 | Sutterlin et al. |
| 5,237,604 | A | 8/1993 | Ryan |
| 5,239,542 | A | 8/1993 | Breidenstein et al. |
| 5,239,677 | A | 8/1993 | Jasinski |
| 5,241,588 | A | 8/1993 | Babson, III et al. |
| 5,243,645 | A | 9/1993 | Bissell et al. |
| 5,243,654 | A | 9/1993 | Hunter |
| 5,245,533 | A | 9/1993 | Marshall |
| 5,247,347 | A | 9/1993 | Litteral et al. |
| 5,247,571 | A | 9/1993 | Kay et al. |
| 5,253,341 | A | 10/1993 | Rozmanith et al. |
| 5,254,971 | A | 10/1993 | Sutterlin et al. |
| 5,255,314 | A | 10/1993 | Applegate et al. |
| 5,260,986 | A | 11/1993 | Pershan |
| 5,262,760 | A | 11/1993 | Iwamura et al. |
| 5,263,080 | A | 11/1993 | Jones et al. |
| 5,265,033 | A | 11/1993 | Vajk et al. |
| 5,265,155 | A | 11/1993 | Castro |
| 5,268,957 | A | 12/1993 | Albrecht |
| 5,272,749 | A | 12/1993 | Masek |
| 5,274,696 | A | 12/1993 | Perelman |
| 5,274,700 | A | 12/1993 | Gechter et al. |
| 5,276,731 | A | 1/1994 | Arbel et al. |
| 5,280,159 | A | 1/1994 | Schultz et al. |
| RE34,536 | E | 2/1994 | Frimmel, Jr. |
| 5,285,494 | A | 2/1994 | Sprecher et al. |
| 5,287,199 | A | 2/1994 | Zoccolillo |
| 5,287,270 | A | 2/1994 | Hardy et al. |
| 5,289,378 | A | 2/1994 | Miller et al. |
| 5,289,468 | A | 2/1994 | Yoshida |
| 5,291,302 | A | 3/1994 | Gordon et al. |
| 5,293,619 | A | 3/1994 | Dean |
| 5,294,782 | A | 3/1994 | Kumar |
| 5,295,154 | A | 3/1994 | Meier et al. |
| 5,303,297 | A | 4/1994 | Hillis |
| 5,305,181 | A | 4/1994 | Schultz |
| 5,307,354 | A | 4/1994 | Cramer et al. |
| 5,308,966 | A | 5/1994 | Danielson et al. |
| 5,309,437 | A | 5/1994 | Perlman et al. |
| 5,311,583 | A | 5/1994 | Friedes et al. |
| 5,313,053 | A | 5/1994 | Koenck et al. |
| 5,313,598 | A | 5/1994 | Yamakawa |
| 5,315,093 | A | 5/1994 | Stewart |
| 5,315,636 | A | 5/1994 | Patel |
| 5,315,705 | A | 5/1994 | Iwami et al. |
| 5,317,566 | A | 5/1994 | Joshi |
| 5,317,691 | A | 5/1994 | Traeger |
| 5,318,719 | A | 6/1994 | Hughes et al. |
| 5,322,991 | A | 6/1994 | Hanson |
| 5,325,290 | A | 6/1994 | Cauffman et al. |
| 5,325,421 | A | 6/1994 | Hou et al. |
| 5,325,426 | A | 6/1994 | Held |
| 5,327,421 | A | 7/1994 | Hiller et al. |
| 5,327,486 | A | 7/1994 | Wolff et al. |
| 5,329,520 | A | 7/1994 | Richardson |
| 5,329,578 | A | 7/1994 | Brennan et al. |
| 5,331,580 | A | 7/1994 | Miller et al. |
| 5,333,173 | A | 7/1994 | Seazholtz et al. |
| 5,333,266 | A | 7/1994 | Boaz et al. |
| 5,335,276 | A | 8/1994 | Thompson et al. |
| 5,337,044 | A | 8/1994 | Folger et al. |
| 5,341,374 | A | 8/1994 | Lewen et al. |
| 5,341,425 | A | 8/1994 | Wasilewski et al. |
| 5,341,430 | A | 8/1994 | Aulia et al. |
| 5,341,477 | A | 8/1994 | Pitkin et al. |
| 5,345,446 | A | 9/1994 | Hiller et al. |
| 5,346,611 | A | 9/1994 | Coughlin et al. |
| 5,347,512 | A | 9/1994 | Fechalos et al. |
| 5,347,516 | A | 9/1994 | Yoshida |
| 5,347,633 | A | 9/1994 | Ashfield et al. |
| 5,349,497 | A | 9/1994 | Hanson et al. |
| 5,349,638 | A | 9/1994 | Pitroda et al. |
| 5,349,678 | A | 9/1994 | Morris et al. |
| 5,351,276 | A | 9/1994 | Doll, Jr. et al. |
| 5,351,286 | A | 9/1994 | Nici |
| 5,353,331 | A | 10/1994 | Emery et al. |
| 5,359,185 | A | 10/1994 | Hanson |
| 5,361,256 | A | 11/1994 | Doeringer et al. |
| 5,361,259 | A | 11/1994 | Hunt et al. |
| 5,363,431 | A | 11/1994 | Schull et al. |
| 5,365,524 | A | 11/1994 | Hiller et al. |
| 5,365,546 | A | 11/1994 | Koenck et al. |
| 5,367,566 | A | 11/1994 | Moe et al. |
| 5,369,571 | A | 11/1994 | Metts |
| 5,371,858 | A | 12/1994 | Miller et al. |
| 5,375,068 | A | 12/1994 | Palmer et al. |
| 5,375,159 | A | 12/1994 | Williams |
| 5,375,161 | A | 12/1994 | Fuller et al. |
| 5,377,186 | A | 12/1994 | Wegner et al. |
| 5,379,327 | A | 1/1995 | Sharma et al. |
| 5,381,407 | A | 1/1995 | Chao |
| 5,381,465 | A | 1/1995 | Carter et al. |
| 5,381,471 | A | 1/1995 | Balakrishnan et al. |
| 5,384,831 | A | 1/1995 | Creswell et al. |
| 5,384,840 | A | 1/1995 | Blatchford et al. |
| 5,386,467 | A | 1/1995 | Ahmad |
| 5,388,267 | A | 2/1995 | Chan et al. |
| 5,390,175 | A | 2/1995 | Hiller et al. |
| 5,390,335 | A | 2/1995 | Stephan et al. |
| 5,392,344 | A | 2/1995 | Ash et al. |
| 5,392,400 | A | 2/1995 | Berkowitz et al. |
| 5,394,436 | A | 2/1995 | Meier et al. |
| 5,396,542 | A | 3/1995 | Alger et al. |
| 5,396,543 | A | 3/1995 | Beeson, Jr. et al. |
| 5,400,393 | A | 3/1995 | Knuth et al. |
| 5,402,424 | A | 3/1995 | Kou |
| 5,402,478 | A | 3/1995 | Hluchyj et al. |
| 5,406,557 | A | 4/1995 | Baudoin |
| 5,408,237 | A | 4/1995 | Patterson et al. |
| 5,408,382 | A | 4/1995 | Schultz et al. |
| 5,408,669 | A | 4/1995 | Stewart et al. |
| 5,410,141 | A | 4/1995 | Koenck et al. |
| 5,410,754 | A | 4/1995 | Klotzbach et al. |
| 5,414,762 | A | 5/1995 | Flisik et al. |
| 5,416,842 | A | 5/1995 | Aziz |
| 5,418,844 | A | 5/1995 | Morrisey et al. |
| 5,420,211 | A | 5/1995 | Hughes et al. |
| 5,420,916 | A | 5/1995 | Sekiguchi |
| 5,422,882 | A | 6/1995 | Hiller et al. |
| 5,422,940 | A | 6/1995 | Endo et al. |

(56) References Cited

U.S. PATENT DOCUMENTS

| | | |
|---|---|---|
| 5,422,941 A | 6/1995 | Hasenauer et al. |
| 5,423,003 A | 6/1995 | Berteau |
| 5,425,028 A | 6/1995 | Britton et al. |
| 5,425,051 A | 6/1995 | Mahany |
| 5,425,085 A | 6/1995 | Weinberger et al. |
| 5,425,090 A | 6/1995 | Orriss |
| 5,425,091 A | 6/1995 | Josephs |
| 5,426,636 A | 6/1995 | Hiller et al. |
| 5,426,694 A | 6/1995 | Hebert |
| 5,428,608 A | 6/1995 | Freeman et al. |
| 5,428,636 A | 6/1995 | Meier |
| 5,428,771 A | 6/1995 | Daniels et al. |
| 5,430,719 A | 7/1995 | Weisser, Jr. |
| 5,430,727 A | 7/1995 | Callon |
| 5,432,715 A | 7/1995 | Shigematsu et al. |
| 5,434,797 A | 7/1995 | Barris |
| 5,434,852 A | 7/1995 | La Porta et al. |
| 5,434,906 A | 7/1995 | Robinson et al. |
| 5,434,913 A | 7/1995 | Tung et al. |
| 5,436,957 A | 7/1995 | McConnell |
| 5,436,963 A | 7/1995 | Fitzpatrick et al. |
| 5,438,568 A | 8/1995 | Weisser, Jr. |
| 5,440,563 A | 8/1995 | Isidoro et al. |
| 5,440,620 A | 8/1995 | Slusky |
| 5,440,621 A | 8/1995 | Castro |
| 5,440,624 A | 8/1995 | Schoof, II |
| 5,440,653 A | 8/1995 | Greggain et al. |
| 5,440,699 A | 8/1995 | Farrand et al. |
| 5,440,741 A | 8/1995 | Morales et al. |
| 5,442,387 A | 8/1995 | Loofbourow et al. |
| 5,442,690 A | 8/1995 | Nazif et al. |
| 5,444,709 A | 8/1995 | Riddle |
| 5,446,730 A | 8/1995 | Lee et al. |
| 5,448,626 A | 9/1995 | Kajiya et al. |
| 5,448,633 A | 9/1995 | Jamaleddin et al. |
| 5,449,970 A | 9/1995 | Kumar et al. |
| 5,450,411 A | 9/1995 | Heil |
| 5,450,483 A | 9/1995 | Williams |
| 5,452,287 A | 9/1995 | DiCecco et al. |
| 5,452,289 A | 9/1995 | Sharma et al. |
| 5,452,350 A | 9/1995 | Reynolds et al. |
| 5,452,446 A | 9/1995 | Johnson |
| 5,453,986 A | 9/1995 | Davis et al. |
| 5,455,821 A | 10/1995 | Schaeffer et al. |
| 5,457,629 A | 10/1995 | Miller et al. |
| 5,457,735 A | 10/1995 | Erickson |
| 5,459,720 A | 10/1995 | Iliev et al. |
| 5,459,775 A | 10/1995 | Isono et al. |
| 5,461,611 A | 10/1995 | Drake, Jr. et al. |
| 5,463,677 A | 10/1995 | Bash et al. |
| 5,465,207 A | 11/1995 | Boatwright et al. |
| 5,466,170 A | 11/1995 | Pavek |
| 5,468,947 A | 11/1995 | Danielson et al. |
| 5,468,950 A | 11/1995 | Hanson |
| 5,469,496 A | 11/1995 | Emery et al. |
| 5,469,497 A | 11/1995 | Pierce et al. |
| 5,469,500 A | 11/1995 | Satter et al. |
| 5,471,519 A | 11/1995 | Howe et al. |
| 5,471,522 A | 11/1995 | Sells et al. |
| 5,473,608 A | 12/1995 | Gagne et al. |
| 5,473,677 A | 12/1995 | D'Amato et al. |
| 5,475,732 A | 12/1995 | Pester, III |
| 5,475,737 A | 12/1995 | Garner et al. |
| 5,475,748 A | 12/1995 | Jones |
| 5,475,817 A | 12/1995 | Waldo et al. |
| 5,475,836 A | 12/1995 | Harris et al. |
| 5,477,531 A | 12/1995 | McKee et al. |
| 5,478,581 A | 12/1995 | Christie et al. |
| 5,479,411 A | 12/1995 | Klein |
| 5,479,473 A | 12/1995 | Zey |
| 5,479,494 A | 12/1995 | Clitherow |
| 5,479,650 A | 12/1995 | Archibald et al. |
| 5,481,542 A | 1/1996 | Logston et al. |
| 5,481,600 A | 1/1996 | Alesio |
| 5,481,603 A | 1/1996 | Gutierrez et al. |
| 5,483,524 A | 1/1996 | Lev et al. |
| 5,483,527 A | 1/1996 | Doshi et al. |
| 5,483,549 A | 1/1996 | Weinberg et al. |
| 5,483,586 A | 1/1996 | Sussman |
| 5,483,587 A | 1/1996 | Hogan et al. |
| 5,483,588 A | 1/1996 | Eaton et al. |
| 5,483,596 A | 1/1996 | Rosenow et al. |
| 5,483,676 A | 1/1996 | Mahany et al. |
| 5,487,111 A | 1/1996 | Slusky |
| 5,488,575 A | 1/1996 | Danielson et al. |
| 5,490,060 A | 2/1996 | Malec et al. |
| 5,490,247 A | 2/1996 | Tung et al. |
| 5,491,743 A | 2/1996 | Shiio et al. |
| 5,491,779 A | 2/1996 | Bezjian |
| 5,491,796 A | 2/1996 | Wanderer et al. |
| 5,493,409 A | 2/1996 | Maeda et al. |
| 5,493,568 A | 2/1996 | Sampat et al. |
| 5,493,573 A | 2/1996 | Kobayashi et al. |
| 5,495,521 A | 2/1996 | Rangachar |
| 5,497,411 A | 3/1996 | Pellerin |
| 5,500,859 A | 3/1996 | Sharma et al. |
| 5,500,889 A | 3/1996 | Baker et al. |
| 5,500,929 A | 3/1996 | Dickinson |
| 5,504,746 A | 4/1996 | Meier |
| 5,506,887 A | 4/1996 | Emery et al. |
| 5,506,893 A | 4/1996 | Buscher et al. |
| 5,511,111 A | 4/1996 | Serbetcioglu et al. |
| 5,511,114 A | 4/1996 | Stimson et al. |
| 5,513,127 A | 4/1996 | Gard et al. |
| 5,515,303 A | 5/1996 | Cargin, Jr. et al. |
| 5,517,434 A | 5/1996 | Hanson et al. |
| 5,517,560 A | 5/1996 | Greenspan |
| 5,517,562 A | 5/1996 | McConnell |
| 5,517,563 A | 5/1996 | Norell |
| 5,519,772 A | 5/1996 | Akman et al. |
| 5,520,470 A | 5/1996 | Willett |
| 5,521,719 A | 5/1996 | Yamada |
| 5,521,924 A | 5/1996 | Kakuma et al. |
| 5,524,137 A | 6/1996 | Rhee |
| 5,524,145 A | 6/1996 | Parker |
| 5,526,257 A | 6/1996 | Lerner |
| 5,526,344 A | 6/1996 | Diaz et al. |
| 5,526,353 A | 6/1996 | Henley et al. |
| 5,526,416 A | 6/1996 | Dezonno et al. |
| 5,526,489 A | 6/1996 | Nilakantan et al. |
| 5,530,744 A | 6/1996 | Charalambous et al. |
| 5,530,852 A | 6/1996 | Meske, Jr. et al. |
| 5,533,019 A | 7/1996 | Jayapalan |
| 5,533,108 A | 7/1996 | Harris et al. |
| 5,533,115 A | 7/1996 | Hollenbach et al. |
| 5,534,913 A | 7/1996 | Majeti et al. |
| 5,534,937 A | 7/1996 | Zhu et al. |
| 5,535,371 A | 7/1996 | Stewart et al. |
| 5,537,461 A | 7/1996 | Bridges et al. |
| 5,537,470 A | 7/1996 | Lee |
| 5,537,611 A | 7/1996 | Rajagopal et al. |
| 5,539,193 A | 7/1996 | Gibbs et al. |
| 5,539,194 A | 7/1996 | Miller et al. |
| 5,539,734 A | 7/1996 | Burwell et al. |
| 5,539,884 A | 7/1996 | Robrock, II |
| 5,539,886 A | 7/1996 | Aldred et al. |
| 5,541,398 A | 7/1996 | Hanson |
| 5,541,917 A | 7/1996 | Farris |
| 5,541,927 A | 7/1996 | Kristol et al. |
| 5,541,930 A | 7/1996 | Klingman |
| 5,544,010 A | 8/1996 | Schultz et al. |
| 5,546,398 A | 8/1996 | Tucker et al. |
| 5,546,452 A | 8/1996 | Andrews et al. |
| 5,548,726 A | 8/1996 | Pettus |
| 5,550,914 A | 8/1996 | Clarke et al. |
| 5,551,025 A | 8/1996 | O'Reilly et al. |
| 5,551,035 A | 8/1996 | Arnold et al. |
| 5,551,044 A | 8/1996 | Shah et al. |
| 5,553,124 A | 9/1996 | Brinskele |
| 5,555,276 A | 9/1996 | Koenck et al. |
| 5,555,290 A | 9/1996 | McLeod et al. |
| 5,557,541 A | 9/1996 | Schulhof et al. |
| 5,557,668 A | 9/1996 | Brady |
| 5,559,068 A | 9/1996 | Chen et al. |

(56) References Cited

U.S. PATENT DOCUMENTS

| | | |
|---|---|---|
| 5,559,721 A | 9/1996 | Ishii |
| 5,559,871 A | 9/1996 | Smith |
| 5,559,932 A | 9/1996 | Machida et al. |
| 5,561,670 A | 10/1996 | Hoffert et al. |
| 5,561,802 A | 10/1996 | Orimo et al. |
| 5,563,805 A | 10/1996 | Arbuckle et al. |
| 5,563,882 A | 10/1996 | Bruno et al. |
| 5,564,077 A | 10/1996 | Obayashi et al. |
| 5,566,316 A | 10/1996 | Fechner et al. |
| 5,566,351 A | 10/1996 | Crittenden et al. |
| 5,568,645 A | 10/1996 | Morris et al. |
| 5,570,410 A | 10/1996 | Hooshiari |
| 5,572,442 A | 11/1996 | Schulhof et al. |
| 5,572,579 A | 11/1996 | Orriss et al. |
| 5,572,583 A | 11/1996 | Wheeler, Jr. et al. |
| 5,574,782 A | 11/1996 | Baird et al. |
| 5,575,961 A | 11/1996 | Kuwabara et al. |
| 5,576,529 A | 11/1996 | Koenck et al. |
| 5,579,472 A | 11/1996 | Keyworth, II et al. |
| 5,583,564 A | 12/1996 | Rao et al. |
| 5,583,920 A | 12/1996 | Wheeler, Jr. |
| 5,583,926 A | 12/1996 | Venier et al. |
| 5,583,929 A | 12/1996 | Ardon |
| 5,584,784 A | 12/1996 | Wu |
| 5,586,175 A | 12/1996 | Hogan et al. |
| 5,586,177 A | 12/1996 | Farris et al. |
| 5,586,260 A | 12/1996 | Hu |
| 5,587,577 A | 12/1996 | Schultz |
| 5,590,127 A | 12/1996 | Bales et al. |
| 5,590,133 A | 12/1996 | Billstrom et al. |
| 5,590,181 A | 12/1996 | Hogan et al. |
| 5,590,186 A | 12/1996 | Liao et al. |
| 5,590,346 A | 12/1996 | West et al. |
| 5,594,490 A | 1/1997 | Dawson et al. |
| 5,594,717 A | 1/1997 | Watanabe et al. |
| 5,594,769 A | 1/1997 | Pellegrino et al. |
| 5,594,782 A | 1/1997 | Zicker et al. |
| 5,594,789 A | 1/1997 | Seazholtz et al. |
| 5,598,411 A | 1/1997 | Matsukawa |
| 5,598,464 A | 1/1997 | Hess et al. |
| 5,598,487 A | 1/1997 | Hacker et al. |
| 5,600,710 A | 2/1997 | Weisser, Jr. et al. |
| 5,600,791 A | 2/1997 | Carlson et al. |
| 5,602,456 A | 2/1997 | Cargin, Jr. et al. |
| 5,602,846 A | 2/1997 | Holmquist et al. |
| 5,602,854 A | 2/1997 | Luse et al. |
| 5,602,909 A | 2/1997 | Carkner et al. |
| 5,602,918 A | 2/1997 | Chen et al. |
| 5,602,991 A | 2/1997 | Berteau |
| 5,603,084 A | 2/1997 | Henry, Jr. et al. |
| 5,603,085 A | 2/1997 | Shedlo |
| 5,604,682 A | 2/1997 | McLaughlin et al. |
| 5,604,737 A | 2/1997 | Iwami et al. |
| 5,606,596 A | 2/1997 | Jain et al. |
| 5,608,446 A | 3/1997 | Carr et al. |
| 5,608,447 A | 3/1997 | Farry et al. |
| 5,608,786 A | 3/1997 | Gordon |
| 5,610,910 A | 3/1997 | Focsaneanu et al. |
| 5,610,915 A | 3/1997 | Elliott et al. |
| 5,610,972 A | 3/1997 | Emery et al. |
| 5,610,976 A | 3/1997 | Uota et al. |
| 5,610,977 A | 3/1997 | Williams et al. |
| 5,615,251 A | 3/1997 | Hogan et al. |
| 5,617,343 A | 4/1997 | Danielson et al. |
| 5,617,422 A | 4/1997 | Litzenberger et al. |
| 5,617,540 A | 4/1997 | Civanlar et al. |
| 5,619,555 A | 4/1997 | Fenton et al. |
| 5,619,557 A | 4/1997 | Van Berkum |
| 5,619,562 A | 4/1997 | Maurer et al. |
| 5,621,727 A | 4/1997 | Vaudreuil |
| 5,621,787 A | 4/1997 | McKoy et al. |
| 5,623,581 A | 4/1997 | Attenberg |
| 5,623,601 A | 4/1997 | Vu |
| 5,625,180 A | 4/1997 | Hanson et al. |
| 5,625,404 A | 4/1997 | Grady et al. |
| 5,625,407 A | 4/1997 | Biggs et al. |
| 5,625,555 A | 4/1997 | Davis |
| 5,625,669 A | 4/1997 | McGregor et al. |
| 5,625,675 A | 4/1997 | Katsumaru et al. |
| 5,625,677 A | 4/1997 | Feiertag et al. |
| 5,625,681 A | 4/1997 | Butler, II |
| 5,625,682 A | 4/1997 | Gray et al. |
| 5,627,886 A | 5/1997 | Bowman |
| 5,629,978 A | 5/1997 | Blumhardt et al. |
| 5,630,066 A | 5/1997 | Gosling |
| 5,631,847 A | 5/1997 | Kikinis |
| 5,633,916 A | 5/1997 | Goldhagen et al. |
| 5,633,919 A | 5/1997 | Hogan et al. |
| 5,634,012 A | 5/1997 | Stefik et al. |
| 5,635,980 A | 6/1997 | Lin et al. |
| 5,636,216 A | 6/1997 | Fox et al. |
| 5,638,430 A | 6/1997 | Hogan et al. |
| 5,640,001 A | 6/1997 | Danielson et al. |
| 5,640,319 A | 6/1997 | Beuning et al. |
| 5,640,388 A | 6/1997 | Woodhead et al. |
| 5,644,471 A | 7/1997 | Schultz et al. |
| 5,646,982 A | 7/1997 | Hogan et al. |
| 5,651,006 A | 7/1997 | Fujino et al. |
| 5,652,787 A | 7/1997 | O'Kelly |
| 5,652,789 A | 7/1997 | Miner et al. |
| 5,652,894 A | 7/1997 | Hu et al. |
| 5,654,957 A | 8/1997 | Koyama |
| 5,657,250 A | 8/1997 | Park et al. |
| 5,657,317 A | 8/1997 | Mahany et al. |
| 5,659,599 A | 8/1997 | Arumainayagam et al. |
| 5,661,197 A | 8/1997 | Villiger et al. |
| 5,661,782 A | 8/1997 | Bartholomew et al. |
| 5,661,790 A | 8/1997 | Hsu |
| 5,661,792 A | 8/1997 | Akinpelu et al. |
| 5,663,208 A | 9/1997 | Martin |
| 5,664,005 A | 9/1997 | Emery et al. |
| 5,664,013 A | 9/1997 | Rossi |
| 5,664,102 A | 9/1997 | Faynberg |
| 5,668,857 A | 9/1997 | McHale |
| 5,669,062 A | 9/1997 | Olds et al. |
| 5,671,436 A | 9/1997 | Morris et al. |
| 5,672,860 A | 9/1997 | Miller et al. |
| 5,673,031 A | 9/1997 | Meier |
| 5,673,263 A | 9/1997 | Basso et al. |
| 5,675,507 A | 10/1997 | Bobo, II |
| 5,675,741 A | 10/1997 | Aggarwal et al. |
| 5,679,943 A | 10/1997 | Schultz et al. |
| 5,680,116 A | 10/1997 | Hashimoto et al. |
| 5,680,392 A | 10/1997 | Semaan |
| 5,680,442 A | 10/1997 | Bartholomew et al. |
| 5,680,446 A | 10/1997 | Fleischer, III et al. |
| 5,680,633 A | 10/1997 | Koenck et al. |
| 5,682,379 A | 10/1997 | Mahany et al. |
| 5,687,167 A | 11/1997 | Bertin et al. |
| 5,689,416 A | 11/1997 | Shimizu et al. |
| 5,689,550 A | 11/1997 | Garson et al. |
| 5,689,553 A | 11/1997 | Ahuja et al. |
| 5,689,698 A | 11/1997 | Jones et al. |
| 5,689,726 A | 11/1997 | Lin |
| 5,691,973 A | 11/1997 | Ramstrom et al. |
| 5,692,039 A | 11/1997 | Brankley et al. |
| 5,694,318 A | 12/1997 | Miller et al. |
| 5,694,463 A | 12/1997 | Christie et al. |
| 5,694,466 A | 12/1997 | Xie et al. |
| 5,696,903 A | 12/1997 | Mahany |
| 5,699,089 A | 12/1997 | Murray |
| 5,699,352 A | 12/1997 | Kriete et al. |
| 5,699,528 A | 12/1997 | Hogan |
| 5,701,295 A | 12/1997 | Bales et al. |
| 5,701,301 A | 12/1997 | Weisser, Jr. |
| 5,701,465 A | 12/1997 | Baugher et al. |
| 5,703,935 A | 12/1997 | Raissyan et al. |
| 5,703,940 A | 12/1997 | Sattar et al. |
| 5,703,942 A | 12/1997 | Pinard et al. |
| 5,706,286 A | 1/1998 | Reiman et al. |
| 5,708,680 A | 1/1998 | Gollnick et al. |
| 5,708,780 A | 1/1998 | Levergood et al. |
| 5,708,833 A | 1/1998 | Kinney et al. |
| 5,710,728 A | 1/1998 | Danielson et al. |

(56) References Cited

U.S. PATENT DOCUMENTS

| | | |
|---|---|---|
| 5,710,884 A | 1/1998 | Dedrick |
| 5,712,903 A | 1/1998 | Bartholomew et al. |
| 5,712,906 A | 1/1998 | Grady et al. |
| 5,712,907 A | 1/1998 | Wegner et al. |
| 5,712,908 A | 1/1998 | Brinkman et al. |
| 5,719,854 A | 2/1998 | Choudhury et al. |
| 5,719,936 A | 2/1998 | Hillenmayer |
| 5,721,825 A | 2/1998 | Lawson et al. |
| 5,721,916 A | 2/1998 | Pardikar |
| 5,721,937 A | 2/1998 | Kurihara et al. |
| 5,722,067 A | 2/1998 | Fougnies et al. |
| 5,724,355 A | 3/1998 | Bruno et al. |
| 5,724,406 A | 3/1998 | Juster |
| 5,724,412 A | 3/1998 | Srinivasan |
| 5,726,984 A | 3/1998 | Kubler et al. |
| 5,727,002 A | 3/1998 | Miller et al. |
| 5,727,129 A | 3/1998 | Barrett et al. |
| 5,729,542 A | 3/1998 | Dupont |
| 5,729,544 A | 3/1998 | Lev et al. |
| 5,729,599 A | 3/1998 | Plomondon et al. |
| 5,732,078 A | 3/1998 | Arango |
| 5,732,213 A | 3/1998 | Gessel et al. |
| 5,732,219 A | 3/1998 | Blumer et al. |
| 5,737,333 A | 4/1998 | Civanlar et al. |
| 5,737,395 A | 4/1998 | Irribarren |
| 5,737,404 A | 4/1998 | Segal |
| 5,737,407 A | 4/1998 | Graumann |
| 5,737,414 A | 4/1998 | Walker et al. |
| 5,740,164 A | 4/1998 | Liron |
| 5,740,366 A | 4/1998 | Mahany et al. |
| 5,742,596 A | 4/1998 | Baratz et al. |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,744,533 A | 4/1998 | Iwamoto et al. |
| 5,745,556 A | 4/1998 | Ronen |
| 5,745,694 A | 4/1998 | Egawa et al. |
| 5,747,785 A | 5/1998 | Miller et al. |
| 5,747,786 A | 5/1998 | Cargin, Jr. et al. |
| 5,748,468 A | 5/1998 | Notenboom et al. |
| 5,748,619 A | 5/1998 | Meier |
| 5,751,707 A | 5/1998 | Voit et al. |
| 5,751,903 A | 5/1998 | Swaminathan et al. |
| 5,751,961 A | 5/1998 | Smyk |
| 5,754,542 A | 5/1998 | Ault et al. |
| 5,754,639 A | 5/1998 | Flockhart et al. |
| 5,754,641 A | 5/1998 | Voit et al. |
| 5,757,772 A | 5/1998 | Thornberg et al. |
| 5,757,784 A | 5/1998 | Liebowitz et al. |
| 5,758,110 A | 5/1998 | Boss et al. |
| 5,758,172 A | 5/1998 | Seo |
| 5,758,281 A | 5/1998 | Emery et al. |
| 5,761,290 A | 6/1998 | Farris et al. |
| 5,761,294 A | 6/1998 | Shaffer et al. |
| 5,763,867 A | 6/1998 | Main et al. |
| 5,764,736 A | 6/1998 | Shachar et al. |
| 5,764,741 A | 6/1998 | Barak |
| 5,764,919 A | 6/1998 | Hashimoto |
| 5,768,513 A | 6/1998 | Kuthyar et al. |
| 5,774,530 A | 6/1998 | Montgomery et al. |
| 5,774,533 A | 6/1998 | Patel |
| 5,774,535 A | 6/1998 | Castro |
| 5,774,660 A | 6/1998 | Brendel et al. |
| 5,774,668 A | 6/1998 | Choquier et al. |
| 5,774,670 A | 6/1998 | Montulli |
| 5,774,695 A | 6/1998 | Autrey et al. |
| 5,777,991 A | 7/1998 | Adachi et al. |
| 5,778,313 A | 7/1998 | Fougnies |
| 5,781,550 A | 7/1998 | Templin et al. |
| 5,781,620 A | 7/1998 | Montgomery et al. |
| 5,781,624 A | 7/1998 | Mitra et al. |
| 5,784,617 A | 7/1998 | Greenstein et al. |
| 5,787,160 A | 7/1998 | Chaney et al. |
| 5,787,163 A | 7/1998 | Taylor et al. |
| 5,787,254 A | 7/1998 | Maddalozzo, Jr. et al. |
| 5,790,172 A | 8/1998 | Imanaka |
| 5,790,532 A | 8/1998 | Sharma et al. |
| 5,790,536 A | 8/1998 | Mahany et al. |
| 5,790,548 A | 8/1998 | Sistanizadeh et al. |
| 5,790,779 A | 8/1998 | Ben-Natan et al. |
| 5,790,780 A | 8/1998 | Brichta et al. |
| 5,790,806 A | 8/1998 | Koperda |
| 5,793,672 A | 8/1998 | Wong et al. |
| 5,793,762 A | 8/1998 | Penners et al. |
| 5,793,763 A | 8/1998 | Mayes et al. |
| 5,793,771 A | 8/1998 | Darland et al. |
| 5,795,228 A | 8/1998 | Trumbull et al. |
| 5,796,790 A | 8/1998 | Brunner |
| 5,796,953 A | 8/1998 | Zey |
| 5,799,063 A | 8/1998 | Krane |
| 5,799,072 A | 8/1998 | Vulcan et al. |
| 5,799,156 A | 8/1998 | Hogan et al. |
| 5,799,317 A | 8/1998 | He et al. |
| 5,802,146 A | 9/1998 | Dulman |
| 5,802,265 A | 9/1998 | Bressoud et al. |
| 5,802,304 A | 9/1998 | Stone |
| 5,802,502 A | 9/1998 | Gell et al. |
| 5,802,510 A | 9/1998 | Jones |
| 5,802,513 A | 9/1998 | Bowie, III |
| 5,804,805 A | 9/1998 | Koenck et al. |
| 5,805,298 A | 9/1998 | Ho et al. |
| 5,805,474 A | 9/1998 | Danielson et al. |
| 5,805,587 A | 9/1998 | Norris et al. |
| 5,805,602 A | 9/1998 | Cloutier et al. |
| 5,805,682 A | 9/1998 | Voit et al. |
| 5,805,807 A | 9/1998 | Hanson et al. |
| 5,805,910 A | 9/1998 | Lee et al. |
| 5,809,128 A | 9/1998 | McMullin |
| 5,809,129 A | 9/1998 | Andersson et al. |
| 5,809,133 A | 9/1998 | Bartkowiak et al. |
| 5,809,415 A | 9/1998 | Rossmann |
| 5,812,533 A | 9/1998 | Cox et al. |
| 5,812,534 A | 9/1998 | Davis et al. |
| 5,812,639 A | 9/1998 | Bartholomew et al. |
| 5,812,656 A | 9/1998 | Garland et al. |
| 5,812,776 A | 9/1998 | Gifford |
| 5,812,795 A | 9/1998 | Horovitz et al. |
| 5,812,865 A | 9/1998 | Theimer et al. |
| 5,815,652 A | 9/1998 | Ote et al. |
| 5,815,665 A | 9/1998 | Teper et al. |
| 5,818,836 A | 10/1998 | DuVal |
| 5,818,921 A | 10/1998 | Vander Meiden et al. |
| 5,825,772 A | 10/1998 | Dobbins et al. |
| 5,825,780 A | 10/1998 | Christie |
| 5,825,862 A | 10/1998 | Voit et al. |
| 5,825,863 A | 10/1998 | Walker |
| 5,825,869 A | 10/1998 | Brooks et al. |
| 5,826,051 A | 10/1998 | Porter et al. |
| 5,826,268 A | 10/1998 | Schaefer et al. |
| 5,828,737 A | 10/1998 | Sawyer |
| 5,828,740 A | 10/1998 | Khuc et al. |
| 5,828,844 A | 10/1998 | Civanlar et al. |
| 5,832,197 A | 11/1998 | Houji |
| 5,834,753 A | 11/1998 | Danielson et al. |
| 5,835,579 A | 11/1998 | Gersi et al. |
| 5,835,723 A | 11/1998 | Andrews et al. |
| 5,835,724 A | 11/1998 | Smith |
| 5,835,757 A | 11/1998 | Oulid-Aissa et al. |
| 5,838,665 A | 11/1998 | Kahn et al. |
| 5,838,682 A | 11/1998 | Dekelbaum et al. |
| 5,838,686 A | 11/1998 | Ozkan |
| 5,838,768 A | 11/1998 | Sumar et al. |
| 5,838,774 A | 11/1998 | Weisser, Jr. |
| 5,838,916 A | 11/1998 | Domenikos et al. |
| 5,838,970 A | 11/1998 | Thomas |
| 5,841,764 A | 11/1998 | Roderique et al. |
| 5,842,028 A | 11/1998 | Vajapey |
| 5,843,413 A | 12/1998 | Causton et al. |
| 5,844,893 A | 12/1998 | Gollnick et al. |
| 5,844,896 A | 12/1998 | Marks et al. |
| 5,845,138 A | 12/1998 | Nowlin, Jr. |
| 5,845,267 A | 12/1998 | Ronen |
| 5,848,142 A | 12/1998 | Yaker |

(56) References Cited

U.S. PATENT DOCUMENTS

| | | |
|---|---|---|
| 5,848,143 A | 12/1998 | Andrews et al. |
| 5,850,358 A | 12/1998 | Danielson et al. |
| 5,850,433 A | 12/1998 | Rondeau |
| 5,854,833 A | 12/1998 | Hogan et al. |
| 5,854,975 A | 12/1998 | Fougnies et al. |
| 5,862,171 A | 1/1999 | Mahany |
| 5,862,325 A | 1/1999 | Reed et al. |
| 5,862,377 A | 1/1999 | Lee |
| 5,864,604 A | 1/1999 | Moen et al. |
| 5,864,610 A | 1/1999 | Ronen |
| 5,864,670 A | 1/1999 | Hayashi et al. |
| 5,867,495 A | 2/1999 | Elliott et al. |
| 5,867,562 A | 2/1999 | Scherer |
| 5,867,566 A | 2/1999 | Hogan et al. |
| 5,867,571 A | 2/1999 | Borchering |
| 5,870,454 A | 2/1999 | Dahlen |
| 5,870,474 A | 2/1999 | Wasilewski et al. |
| 5,870,561 A | 2/1999 | Jarvis et al. |
| 5,870,565 A | 2/1999 | Glitho |
| 5,872,847 A | 2/1999 | Boyle et al. |
| 5,873,077 A | 2/1999 | Kanoh et al. |
| 5,873,099 A | 2/1999 | Hogan et al. |
| 5,875,296 A | 2/1999 | Shi et al. |
| 5,878,126 A | 3/1999 | Velamuri et al. |
| 5,878,128 A | 3/1999 | Kantola |
| 5,878,130 A | 3/1999 | Andrews et al. |
| 5,878,209 A | 3/1999 | Manssen |
| 5,878,212 A | 3/1999 | Civanlar et al. |
| 5,878,219 A | 3/1999 | Vance, Jr. et al. |
| 5,881,134 A | 3/1999 | Foster et al. |
| 5,883,891 A | 3/1999 | Williams et al. |
| 5,883,894 A | 3/1999 | Patel et al. |
| 5,884,032 A | 3/1999 | Bateman et al. |
| 5,884,037 A | 3/1999 | Aras et al. |
| 5,888,087 A | 3/1999 | Hanson et al. |
| 5,889,774 A | 3/1999 | Mirashrafi et al. |
| 5,889,777 A | 3/1999 | Miyao et al. |
| 5,890,167 A | 3/1999 | Bridge, Jr. et al. |
| 5,892,754 A | 4/1999 | Kompella et al. |
| 5,892,822 A | 4/1999 | Gottlieb et al. |
| 5,892,971 A | 4/1999 | Danielson et al. |
| 5,895,431 A | 4/1999 | Miller et al. |
| 5,895,906 A | 4/1999 | Danielson et al. |
| 5,898,668 A | 4/1999 | Shaffer |
| 5,898,673 A | 4/1999 | Riggan et al. |
| 5,898,697 A | 4/1999 | Hurme et al. |
| 5,901,140 A | 5/1999 | Van As et al. |
| 5,901,313 A | 5/1999 | Wolf et al. |
| 5,903,558 A | 5/1999 | Jones et al. |
| 5,903,559 A | 5/1999 | Acharya et al. |
| 5,903,735 A | 5/1999 | Kidder et al. |
| 5,905,736 A | 5/1999 | Ronen et al. |
| 5,907,547 A | 5/1999 | Foladare et al. |
| 5,907,602 A | 5/1999 | Peel et al. |
| 5,909,430 A | 6/1999 | Reaves |
| 5,910,946 A | 6/1999 | Csapo |
| 5,912,882 A | 6/1999 | Yafuso et al. |
| 5,912,887 A | 6/1999 | Sehgal |
| 5,914,481 A | 6/1999 | Danielson et al. |
| 5,915,001 A | 6/1999 | Uppaluru |
| 5,915,005 A | 6/1999 | He |
| 5,915,008 A | 6/1999 | Dulman |
| 5,915,012 A | 6/1999 | Miloslavsky |
| 5,916,303 A | 6/1999 | Scott |
| 5,917,175 A | 6/1999 | Miller et al. |
| 5,917,424 A | 6/1999 | Goldman et al. |
| 5,917,817 A | 6/1999 | Dunn et al. |
| 5,918,059 A | 6/1999 | Tavallaei et al. |
| 5,918,179 A | 6/1999 | Foladare et al. |
| 5,923,659 A | 7/1999 | Curry et al. |
| 5,923,736 A | 7/1999 | Shachar |
| 5,926,482 A | 7/1999 | Christie et al. |
| 5,928,292 A | 7/1999 | Miller et al. |
| 5,930,343 A | 7/1999 | Vasquez |
| 5,930,348 A | 7/1999 | Regnier et al. |
| 5,930,700 A | 7/1999 | Pepper et al. |
| 5,933,412 A | 8/1999 | Choudhury et al. |
| 5,933,425 A | 8/1999 | Iwata |
| 5,933,486 A | 8/1999 | Norby et al. |
| 5,933,604 A | 8/1999 | Inakoshi |
| 5,933,836 A | 8/1999 | Gobat |
| 5,936,958 A | 8/1999 | Soumiya et al. |
| 5,937,045 A | 8/1999 | Yaoya et al. |
| 5,940,479 A | 8/1999 | Guy et al. |
| 5,940,598 A | 8/1999 | Strauss et al. |
| 5,940,616 A | 8/1999 | Wang |
| 5,940,771 A | 8/1999 | Gollnick et al. |
| 5,943,399 A | 8/1999 | Bannister et al. |
| 5,944,795 A | 8/1999 | Civanlar |
| 5,946,299 A | 8/1999 | Blonder |
| 5,946,381 A | 8/1999 | Danne et al. |
| 5,946,386 A | 8/1999 | Rogers et al. |
| 5,949,056 A | 9/1999 | White |
| 5,949,419 A | 9/1999 | Domine et al. |
| 5,949,776 A | 9/1999 | Mahany et al. |
| 5,949,869 A | 9/1999 | Sink et al. |
| 5,949,977 A | 9/1999 | Hernandez |
| 5,951,694 A | 9/1999 | Choquier et al. |
| 5,953,322 A | 9/1999 | Kimball |
| 5,953,338 A | 9/1999 | Ma et al. |
| 5,953,392 A | 9/1999 | Rhie et al. |
| 5,953,504 A | 9/1999 | Sokal et al. |
| 5,953,651 A | 9/1999 | Lu et al. |
| 5,956,391 A | 9/1999 | Melen et al. |
| 5,956,482 A | 9/1999 | Agraharam et al. |
| 5,956,697 A | 9/1999 | Usui |
| 5,958,013 A | 9/1999 | King et al. |
| 5,958,016 A | 9/1999 | Chang et al. |
| 5,958,052 A | 9/1999 | Bellovin et al. |
| 5,959,998 A | 9/1999 | Takahashi et al. |
| 5,960,416 A | 9/1999 | Block |
| 5,961,601 A | 10/1999 | Iyengar |
| 5,964,836 A | 10/1999 | Rowe et al. |
| 5,966,427 A | 10/1999 | Shaffer et al. |
| 5,966,431 A | 10/1999 | Reiman et al. |
| 5,966,434 A | 10/1999 | Schafer et al. |
| 5,969,321 A | 10/1999 | Danielson et al. |
| 5,970,065 A | 10/1999 | Miloslavsky |
| 5,970,120 A | 10/1999 | Kasrai |
| 5,970,477 A | 10/1999 | Roden |
| 5,974,043 A | 10/1999 | Solomon |
| 5,974,052 A | 10/1999 | Johnson et al. |
| 5,974,133 A | 10/1999 | Fleischer, III et al. |
| 5,974,429 A | 10/1999 | Strub et al. |
| 5,974,453 A | 10/1999 | Andersen et al. |
| 5,974,563 A | 10/1999 | Beeler, Jr. |
| 5,978,569 A | 11/1999 | Traeger |
| 5,978,773 A | 11/1999 | Hudetz et al. |
| 5,978,840 A | 11/1999 | Nguyen et al. |
| 5,979,768 A | 11/1999 | Koenck |
| 5,982,774 A | 11/1999 | Foladare et al. |
| 5,983,227 A | 11/1999 | Nazem et al. |
| 5,987,108 A | 11/1999 | Jagadish et al. |
| 5,987,499 A | 11/1999 | Morris et al. |
| 5,987,517 A | 11/1999 | Firth et al. |
| 5,991,291 A | 11/1999 | Asai et al. |
| 5,991,292 A | 11/1999 | Focsaneanu et al. |
| 5,991,301 A | 11/1999 | Christie |
| 5,991,308 A | 11/1999 | Fuhrmann et al. |
| 5,991,803 A | 11/1999 | Glitho et al. |
| 5,991,810 A | 11/1999 | Shapiro et al. |
| 5,991,864 A | 11/1999 | Kinney et al. |
| 5,995,503 A | 11/1999 | Crawley et al. |
| 5,995,606 A | 11/1999 | Civanlar et al. |
| 5,995,969 A | 11/1999 | Lee et al. |
| 5,996,018 A | 11/1999 | Duault et al. |
| 5,999,524 A | 12/1999 | Corbalis et al. |
| 5,999,525 A | 12/1999 | Krishnaswamy et al. |
| 5,999,610 A | 12/1999 | Lin et al. |
| 6,003,035 A | 12/1999 | Breame |
| 6,005,859 A | 12/1999 | Harvell et al. |
| 6,005,870 A | 12/1999 | Leung et al. |
| 6,005,926 A | 12/1999 | Mashinsky |
| 6,006,100 A | 12/1999 | Koenck et al. |

(56) References Cited

U.S. PATENT DOCUMENTS

| | | |
|---|---|---|
| 6,006,253 A | 12/1999 | Kumar et al. |
| 6,009,469 A | 12/1999 | Mattaway et al. |
| 6,011,975 A | 1/2000 | Emery et al. |
| 6,011,978 A | 1/2000 | Ault et al. |
| 6,012,088 A | 1/2000 | Li et al. |
| 6,014,090 A | 1/2000 | Rosen et al. |
| 6,014,379 A | 1/2000 | White et al. |
| 6,014,437 A | 1/2000 | Acker et al. |
| 6,014,687 A | 1/2000 | Watanabe et al. |
| 6,016,307 A | 1/2000 | Kaplan et al. |
| 6,016,343 A | 1/2000 | Hogan et al. |
| 6,018,360 A | 1/2000 | Stewart et al. |
| 6,018,567 A | 1/2000 | Dulman |
| 6,021,126 A | 2/2000 | White et al. |
| 6,021,263 A | 2/2000 | Kujoory et al. |
| 6,023,147 A | 2/2000 | Cargin, Jr. et al. |
| 6,023,474 A | 2/2000 | Gardner et al. |
| 6,023,699 A | 2/2000 | Knoblock et al. |
| 6,023,724 A | 2/2000 | Bhatia et al. |
| 6,026,087 A | 2/2000 | Mirashrafi et al. |
| 6,026,091 A | 2/2000 | Christie et al. |
| 6,026,433 A | 2/2000 | D'Arlach et al. |
| 6,026,441 A | 2/2000 | Ronen |
| 6,028,858 A | 2/2000 | Rivers et al. |
| 6,029,062 A | 2/2000 | Hanson |
| 6,029,203 A | 2/2000 | Bhatia et al. |
| 6,029,252 A | 2/2000 | Manning |
| 6,029,261 A | 2/2000 | Hartmann |
| 6,031,836 A | 2/2000 | Haserodt |
| 6,031,840 A | 2/2000 | Christie et al. |
| 6,035,028 A | 3/2000 | Ward et al. |
| 6,035,214 A | 3/2000 | Henderson |
| 6,035,379 A | 3/2000 | Raju et al. |
| 6,036,093 A | 3/2000 | Schultz |
| 6,041,109 A | 3/2000 | Cardy et al. |
| 6,041,117 A | 3/2000 | Androski et al. |
| 6,041,357 A | 3/2000 | Kunzelman et al. |
| 6,044,081 A | 3/2000 | Bell et al. |
| 6,046,992 A | 4/2000 | Meier et al. |
| 6,047,051 A | 4/2000 | Ginzboorg et al. |
| 6,047,326 A | 4/2000 | Kilkki |
| 6,047,376 A | 4/2000 | Hosoe |
| 6,048,269 A | 4/2000 | Burns et al. |
| 6,049,450 A | 4/2000 | Cho et al. |
| 6,049,545 A | 4/2000 | Stephenson et al. |
| 6,049,796 A | 4/2000 | Siitonen et al. |
| 6,049,813 A | 4/2000 | Danielson et al. |
| 6,052,445 A | 4/2000 | Bashoura et al. |
| 6,052,450 A | 4/2000 | Allison et al. |
| 6,058,000 A | 5/2000 | Koenck et al. |
| 6,058,113 A | 5/2000 | Chang |
| 6,061,678 A | 5/2000 | Klein et al. |
| 6,064,492 A | 5/2000 | Eldridge et al. |
| 6,064,653 A | 5/2000 | Farris |
| 6,067,516 A | 5/2000 | Levay et al. |
| 6,069,711 A | 5/2000 | Iwata |
| 6,069,890 A | 5/2000 | White et al. |
| 6,073,160 A | 6/2000 | Grantham et al. |
| 6,075,783 A | 6/2000 | Voit |
| 6,078,579 A | 6/2000 | Weingarten |
| 6,078,581 A | 6/2000 | Shtivelman et al. |
| 6,078,582 A | 6/2000 | Curry et al. |
| 6,078,583 A | 6/2000 | Takahara et al. |
| 6,078,943 A | 6/2000 | Yu |
| 6,081,525 A | 6/2000 | Christie et al. |
| 6,081,827 A | 6/2000 | Reber et al. |
| 6,081,844 A | 6/2000 | Nowatzyk et al. |
| 6,082,581 A | 7/2000 | Anderson et al. |
| 6,084,867 A | 7/2000 | Meier |
| 6,084,956 A | 7/2000 | Turner et al. |
| 6,088,358 A | 7/2000 | Tomita et al. |
| 6,088,431 A | 7/2000 | LaDue |
| 6,088,727 A | 7/2000 | Hosokawa et al. |
| 6,088,728 A | 7/2000 | Bellemore et al. |
| 6,091,514 A | 7/2000 | Hasegawa et al. |
| 6,092,196 A | 7/2000 | Reiche |
| 6,094,437 A | 7/2000 | Loehndorf, Jr. et al. |
| 6,094,654 A | 7/2000 | Van Huben et al. |
| 6,094,655 A | 7/2000 | Rogers et al. |
| 6,095,633 A | 8/2000 | Harshbarger et al. |
| 6,097,722 A | 8/2000 | Graham et al. |
| 6,097,804 A | 8/2000 | Gilbert et al. |
| 6,098,078 A | 8/2000 | Gehani et al. |
| 6,098,094 A | 8/2000 | Barnhouse et al. |
| 6,101,182 A | 8/2000 | Sistanizadeh et al. |
| 6,104,645 A | 8/2000 | Ong et al. |
| 6,104,704 A | 8/2000 | Buhler et al. |
| 6,104,711 A | 8/2000 | Voit |
| 6,105,067 A | 8/2000 | Batra |
| 6,108,314 A | 8/2000 | Jones et al. |
| 6,108,341 A | 8/2000 | Christie |
| 6,108,704 A | 8/2000 | Hutton et al. |
| 6,108,789 A | 8/2000 | Dancs et al. |
| 6,112,206 A | 8/2000 | Morris et al. |
| 6,115,458 A | 9/2000 | Taskett |
| 6,115,737 A | 9/2000 | Ely et al. |
| 6,116,715 A | 9/2000 | Lefebvre et al. |
| 6,118,936 A | 9/2000 | Lauer et al. |
| 6,119,931 A | 9/2000 | Novogrod |
| 6,121,990 A | 9/2000 | Fujiwara |
| 6,122,255 A | 9/2000 | Bartholomew et al. |
| 6,125,113 A | 9/2000 | Farris et al. |
| 6,125,126 A | 9/2000 | Hallenstål |
| 6,126,268 A | 10/2000 | Askeland et al. |
| 6,128,304 A | 10/2000 | Gardell et al. |
| 6,131,095 A | 10/2000 | Low et al. |
| 6,131,121 A | 10/2000 | Mattaway et al. |
| 6,134,235 A | 10/2000 | Goldman et al. |
| 6,134,433 A | 10/2000 | Joong et al. |
| 6,134,530 A | 10/2000 | Bunting et al. |
| 6,137,777 A | 10/2000 | Vaid et al. |
| 6,137,792 A | 10/2000 | Jonas et al. |
| 6,141,404 A | 10/2000 | Westerlage et al. |
| 6,141,412 A | 10/2000 | Smith et al. |
| 6,141,413 A | 10/2000 | Waldner et al. |
| 6,141,560 A | 10/2000 | Gillig et al. |
| 6,141,686 A | 10/2000 | Jackowski et al. |
| 6,144,644 A | 11/2000 | Bajzath et al. |
| 6,144,647 A | 11/2000 | Lopez-Torres |
| 6,144,661 A | 11/2000 | Katsube et al. |
| 6,144,667 A | 11/2000 | Doshi et al. |
| 6,144,976 A | 11/2000 | Silva et al. |
| 6,148,410 A | 11/2000 | Baskey et al. |
| 6,149,062 A | 11/2000 | Danielson et al. |
| 6,151,319 A | 11/2000 | Dommety et al. |
| 6,154,445 A | 11/2000 | Farris et al. |
| 6,154,777 A | 11/2000 | Ebrahim |
| 6,157,621 A | 12/2000 | Brown et al. |
| 6,157,636 A | 12/2000 | Voit et al. |
| 6,157,648 A | 12/2000 | Voit et al. |
| 6,157,823 A | 12/2000 | Fougnies et al. |
| 6,161,160 A | 12/2000 | Niu et al. |
| 6,166,826 A | 12/2000 | Yokoyama |
| 6,167,445 A | 12/2000 | Gai et al. |
| 6,169,735 B1 | 1/2001 | Allen, Jr. et al. |
| 6,169,748 B1 | 1/2001 | Barbas et al. |
| 6,170,943 B1 | 1/2001 | Wen et al. |
| 6,172,688 B1 | 1/2001 | Iwasaki et al. |
| 6,173,311 B1 | 1/2001 | Hassett et al. |
| 6,175,618 B1 | 1/2001 | Shah et al. |
| 6,175,877 B1 | 1/2001 | Zerber |
| 6,178,170 B1 | 1/2001 | Duree et al. |
| 6,178,183 B1 | 1/2001 | Buskirk, Jr. |
| 6,178,529 B1 | 1/2001 | Short et al. |
| 6,181,690 B1 | 1/2001 | Civanlar |
| 6,181,695 B1 | 1/2001 | Curry et al. |
| 6,181,703 B1 | 1/2001 | Christie et al. |
| 6,185,184 B1 | 2/2001 | Mattaway et al. |
| 6,185,198 B1 | 2/2001 | LaDue |
| 6,185,519 B1 | 2/2001 | Lin et al. |
| 6,188,677 B1 | 2/2001 | Oyama et al. |
| 6,192,041 B1 | 2/2001 | Phillips |
| 6,192,050 B1 | 2/2001 | Stovall |
| 6,192,400 B1 | 2/2001 | Hanson et al. |

(56) References Cited

U.S. PATENT DOCUMENTS

| | | |
|---|---|---|
| 6,192,401 B1 | 2/2001 | Modiri et al. |
| 6,195,355 B1 | 2/2001 | Demizu |
| 6,195,425 B1 | 2/2001 | Farris |
| 6,195,697 B1 | 2/2001 | Bowman-Amuah |
| 6,198,738 B1 | 3/2001 | Chang et al. |
| 6,201,812 B1 | 3/2001 | Christie |
| 6,204,847 B1 | 3/2001 | Wright |
| 6,205,139 B1 | 3/2001 | Voit |
| 6,205,148 B1 | 3/2001 | Takahashi et al. |
| 6,212,162 B1 | 4/2001 | Horlin |
| 6,212,193 B1 | 4/2001 | Christie |
| 6,212,256 B1 | 4/2001 | Miesbauer et al. |
| 6,212,261 B1 | 4/2001 | Meubus et al. |
| 6,215,790 B1 | 4/2001 | Voit et al. |
| 6,216,017 B1 | 4/2001 | Lee et al. |
| 6,219,227 B1 | 4/2001 | Trane |
| 6,219,229 B1 | 4/2001 | Lee |
| 6,222,919 B1 | 4/2001 | Hollatz et al. |
| 6,226,287 B1 | 5/2001 | Brady |
| 6,226,651 B1 | 5/2001 | Masuda et al. |
| 6,226,678 B1 | 5/2001 | Mattaway et al. |
| 6,230,203 B1 | 5/2001 | Koperda et al. |
| 6,233,234 B1 | 5/2001 | Curry et al. |
| 6,233,318 B1 | 5/2001 | Picard et al. |
| 6,233,604 B1 | 5/2001 | Van Horne et al. |
| 6,234,389 B1 | 5/2001 | Valliani et al. |
| 6,236,851 B1 | 5/2001 | Fougnies et al. |
| 6,240,091 B1 | 5/2001 | Ginzboorg et al. |
| 6,240,414 B1 | 5/2001 | Beizer et al. |
| 6,241,350 B1 | 6/2001 | Otsuka et al. |
| 6,243,373 B1 | 6/2001 | Turock |
| 6,243,374 B1 | 6/2001 | White et al. |
| 6,243,443 B1 | 6/2001 | Low et al. |
| 6,243,718 B1 | 6/2001 | Klein et al. |
| 6,243,751 B1 | 6/2001 | Chatterjee et al. |
| 6,246,758 B1 | 6/2001 | Low et al. |
| 6,249,879 B1 | 6/2001 | Walker et al. |
| 6,252,869 B1 | 6/2001 | Silverman |
| 6,253,230 B1 | 6/2001 | Couland et al. |
| 6,253,249 B1 | 6/2001 | Belzile |
| 6,256,666 B1 | 7/2001 | Singhal |
| 6,256,773 B1 | 7/2001 | Bowman-Amuah |
| 6,260,067 B1 | 7/2001 | Barnhouse et al. |
| 6,260,129 B1 | 7/2001 | Crockett et al. |
| 6,263,212 B1 | 7/2001 | Ross et al. |
| 6,263,372 B1 | 7/2001 | Hogan et al. |
| 6,266,666 B1 | 7/2001 | Ireland et al. |
| 6,266,685 B1 | 7/2001 | Danielson et al. |
| 6,267,520 B1 | 7/2001 | Unno et al. |
| 6,270,271 B1 | 8/2001 | Fujiwara |
| 6,278,693 B1 | 8/2001 | Aldred et al. |
| 6,278,704 B1 | 8/2001 | Creamer et al. |
| 6,279,001 B1 | 8/2001 | DeBettencourt et al. |
| 6,279,038 B1 | 8/2001 | Hogan et al. |
| 6,282,192 B1 | 8/2001 | Murphy et al. |
| 6,282,281 B1 | 8/2001 | Low |
| 6,282,284 B1 | 8/2001 | Dezonno et al. |
| 6,282,574 B1 | 8/2001 | Voit |
| 6,285,745 B1 | 9/2001 | Bartholomew et al. |
| 6,289,010 B1 | 9/2001 | Voit et al. |
| 6,292,478 B1 | 9/2001 | Farris |
| 6,292,479 B1 | 9/2001 | Bartholomew et al. |
| 6,292,481 B1 | 9/2001 | Voit et al. |
| 6,293,469 B1 | 9/2001 | Masson et al. |
| 6,295,292 B1 | 9/2001 | Voit et al. |
| 6,298,043 B1 | 10/2001 | Mauger et al. |
| 6,298,057 B1 | 10/2001 | Guy et al. |
| 6,298,062 B1 | 10/2001 | Gardell et al. |
| 6,298,064 B1 | 10/2001 | Christie |
| 6,298,120 B1 | 10/2001 | Civanlar et al. |
| 6,298,127 B1 | 10/2001 | Petrunka |
| 6,298,383 B1 | 10/2001 | Gutman et al. |
| 6,301,609 B1 | 10/2001 | Aravamudan et al. |
| 6,304,567 B1 | 10/2001 | Rosenberg |
| 6,304,967 B1 | 10/2001 | Braddy |
| 6,308,216 B1 | 10/2001 | Goldszmidt et al. |
| 6,310,873 B1 | 10/2001 | Rainis et al. |
| 6,310,883 B1 | 10/2001 | Mann et al. |
| 6,314,103 B1 | 11/2001 | Medhat et al. |
| 6,321,235 B1 | 11/2001 | Bird |
| 6,324,264 B1 | 11/2001 | Wiener et al. |
| 6,324,275 B1 | 11/2001 | Yagel et al. |
| 6,324,279 B1 | 11/2001 | Kalmanek, Jr. et al. |
| 6,324,547 B1 | 11/2001 | Lennert et al. |
| 6,325,488 B1 | 12/2001 | Beerling et al. |
| 6,327,258 B1 | 12/2001 | Deschaine et al. |
| 6,327,622 B1 | 12/2001 | Jindal et al. |
| 6,330,250 B1 | 12/2001 | Curry et al. |
| 6,332,023 B1 | 12/2001 | Porter et al. |
| 6,332,153 B1 | 12/2001 | Cohen |
| 6,335,927 B1 | 1/2002 | Elliott et al. |
| 6,338,064 B1 | 1/2002 | Ault et al. |
| 6,338,088 B1 | 1/2002 | Waters et al. |
| 6,343,115 B1 | 1/2002 | Foladare et al. |
| 6,343,292 B1 | 1/2002 | Roach et al. |
| 6,344,904 B1 | 2/2002 | Mercer |
| 6,347,084 B1 | 2/2002 | Hulyalkar et al. |
| 6,347,085 B2 | 2/2002 | Kelly |
| 6,353,611 B1 | 3/2002 | Norris et al. |
| 6,353,898 B1 | 3/2002 | Wipfel et al. |
| 6,359,880 B1 | 3/2002 | Curry et al. |
| 6,360,271 B1 | 3/2002 | Schuster et al. |
| 6,363,065 B1 | 3/2002 | Thornton et al. |
| 6,366,661 B1 | 4/2002 | Devillier et al. |
| 6,373,929 B1 | 4/2002 | Johnson et al. |
| 6,374,292 B1 | 4/2002 | Srivastava et al. |
| 6,374,302 B1 | 4/2002 | Galasso et al. |
| 6,375,344 B1 | 4/2002 | Hanson et al. |
| 6,377,568 B1 | 4/2002 | Kelly |
| 6,381,321 B1 | 4/2002 | Brown et al. |
| 6,381,651 B1 | 4/2002 | Nishio et al. |
| 6,385,191 B1 | 5/2002 | Coffman et al. |
| 6,385,193 B1 | 5/2002 | Civanlar et al. |
| 6,389,010 B1 | 5/2002 | Kubler et al. |
| 6,389,431 B1 | 5/2002 | Frolund et al. |
| 6,389,541 B1 | 5/2002 | Patterson |
| 6,393,467 B1 | 5/2002 | Potvin |
| 6,400,702 B1 | 6/2002 | Meier |
| 6,405,055 B1 | 6/2002 | Silverbrook et al. |
| 6,407,991 B1 | 6/2002 | Meier |
| 6,418,441 B1 | 7/2002 | Call |
| 6,418,461 B1 | 7/2002 | Barnhouse et al. |
| 6,418,467 B1 | 7/2002 | Schweitzer et al. |
| 6,424,714 B1 | 7/2002 | Wasilewski et al. |
| 6,430,195 B1 | 8/2002 | Christie et al. |
| 6,430,275 B1 | 8/2002 | Voit et al. |
| 6,430,276 B1 | 8/2002 | Bouvier et al. |
| 6,430,282 B1 | 8/2002 | Bannister et al. |
| 6,430,739 B1 | 8/2002 | Ballard |
| 6,431,703 B2 | 8/2002 | Rousseau et al. |
| 6,434,568 B1 | 8/2002 | Bowman-Amuah |
| 6,434,624 B1 | 8/2002 | Gai et al. |
| 6,438,218 B1 | 8/2002 | Farris et al. |
| 6,438,222 B1 | 8/2002 | Burg |
| 6,438,705 B1 | 8/2002 | Chao et al. |
| 6,442,169 B1 | 8/2002 | Lewis |
| 6,442,577 B1 | 8/2002 | Britton et al. |
| 6,445,782 B1 | 9/2002 | Elfe et al. |
| 6,446,200 B1 | 9/2002 | Ball et al. |
| 6,449,650 B1 | 9/2002 | Westfall et al. |
| 6,453,314 B1 | 9/2002 | Chan et al. |
| 6,456,617 B1 | 9/2002 | Oda et al. |
| 6,463,470 B1 | 10/2002 | Mohaban et al. |
| 6,466,570 B1 | 10/2002 | Low et al. |
| 6,466,984 B1 | 10/2002 | Naveh et al. |
| 6,470,081 B1 | 10/2002 | Sbisa et al. |
| 6,477,580 B1 | 11/2002 | Bowman-Amuah |
| 6,484,027 B1 | 11/2002 | Mauney et al. |
| 6,493,733 B1 | 12/2002 | Pollack et al. |
| 6,496,831 B1 | 12/2002 | Baulier et al. |
| 6,498,788 B1 | 12/2002 | Emilsson et al. |
| 6,513,040 B1 | 1/2003 | Becker et al. |
| 6,516,337 B1 | 2/2003 | Tripp et al. |
| 6,519,254 B1 | 2/2003 | Chuah et al. |

(56) References Cited

U.S. PATENT DOCUMENTS

| | | |
|---|---|---|
| 6,523,027 B1 | 2/2003 | Underwood |
| 6,529,516 B1 | 3/2003 | Parzych |
| 6,556,659 B1 | 4/2003 | Bowman-Amuah |
| 6,556,672 B1 | 4/2003 | Holland et al. |
| 6,557,036 B1 | 4/2003 | Kavacheri et al. |
| 6,564,215 B1 | 5/2003 | Hsiao et al. |
| 6,584,093 B1 | 6/2003 | Salama et al. |
| 6,584,193 B1 | 6/2003 | Petrunka |
| 6,584,548 B1 | 6/2003 | Bourne et al. |
| 6,587,433 B1 | 7/2003 | Borella et al. |
| 6,587,877 B1 | 7/2003 | Douglis et al. |
| 6,587,933 B2 | 7/2003 | Crockett et al. |
| 6,594,254 B1 | 7/2003 | Kelly |
| 6,600,733 B2 | 7/2003 | Deng |
| 6,628,430 B1 | 9/2003 | Silverbrook et al. |
| 6,628,644 B1 | 9/2003 | Nelson et al. |
| 6,636,485 B1 | 10/2003 | Fijolek et al. |
| 6,654,357 B1 | 11/2003 | Wiedeman |
| 6,667,759 B2 | 12/2003 | Gerszberg et al. |
| 6,668,253 B1 | 12/2003 | Thompson et al. |
| 6,671,285 B1 | 12/2003 | Kirkby et al. |
| 6,675,205 B2 | 1/2004 | Meadway et al. |
| 6,678,264 B1 | 1/2004 | Gibson |
| 6,690,782 B2 | 2/2004 | Creamer et al. |
| 6,690,783 B2 | 2/2004 | Creamer et al. |
| 6,690,788 B1 | 2/2004 | Bauer et al. |
| 6,697,174 B2 | 2/2004 | Mercer |
| 6,701,378 B1 | 3/2004 | Gilhuly et al. |
| 6,718,361 B1 | 4/2004 | Basani et al. |
| 6,718,380 B1 | 4/2004 | Mohaban et al. |
| 6,720,915 B2 | 4/2004 | Sheynblat |
| 6,731,732 B2 | 5/2004 | Creamer et al. |
| 6,732,188 B1 | 5/2004 | Flockhart et al. |
| 6,741,871 B1 | 5/2004 | Silverbrook et al. |
| 6,744,877 B1 | 6/2004 | Edwards |
| 6,744,878 B1 | 6/2004 | Komissarchik et al. |
| 6,754,181 B1 | 6/2004 | Elliott et al. |
| 6,754,699 B2 | 6/2004 | Swildens et al. |
| 6,754,714 B1 | 6/2004 | Chebrolu |
| 6,757,740 B1 | 6/2004 | Parekh et al. |
| 6,766,326 B1 | 7/2004 | Cena |
| 6,766,420 B2 | 7/2004 | Rawson, III |
| 6,768,793 B1 | 7/2004 | Sbisa et al. |
| 6,775,519 B1 | 8/2004 | Wiedeman et al. |
| 6,785,769 B1 | 8/2004 | Jacobs et al. |
| 6,788,769 B1 | 9/2004 | Waites |
| 6,789,170 B1 | 9/2004 | Jacobs et al. |
| 6,795,917 B1 | 9/2004 | Ylonen |
| 6,798,767 B1 | 9/2004 | Alexander et al. |
| 6,798,771 B1 | 9/2004 | Low et al. |
| 6,810,033 B2 | 10/2004 | Derks |
| 6,831,915 B1 | 12/2004 | Beyschlag et al. |
| 6,835,135 B1 | 12/2004 | Silverbrook et al. |
| 6,842,612 B2 | 1/2005 | Kalish et al. |
| 6,856,282 B2 | 2/2005 | Mauro et al. |
| 6,859,451 B1 | 2/2005 | Pasternack et al. |
| 6,859,525 B1 | 2/2005 | McElvaney |
| 6,865,608 B2 | 3/2005 | Hunter |
| 6,873,694 B2 | 3/2005 | Lipinski |
| 6,882,643 B1 | 4/2005 | Mauger et al. |
| 6,891,945 B2 | 5/2005 | Porter et al. |
| 6,912,276 B1 | 6/2005 | Olafsson et al. |
| 6,914,686 B2 | 7/2005 | Silverbrook et al. |
| 6,914,969 B2 | 7/2005 | Creamer et al. |
| 6,915,140 B2 | 7/2005 | Silverbrook |
| 6,947,982 B1 | 9/2005 | McGann et al. |
| 6,954,525 B2 | 10/2005 | Deo et al. |
| 6,959,420 B1 | 10/2005 | Mitchell et al. |
| 6,961,417 B2 | 11/2005 | Koch |
| 6,963,928 B1 | 11/2005 | Bagley et al. |
| 6,970,914 B1 | 11/2005 | Philyaw et al. |
| 6,973,659 B2 | 12/2005 | Smith et al. |
| 6,983,040 B1 | 1/2006 | Kalmanek, Jr. et al. |
| 6,987,987 B1 | 1/2006 | Vacanti et al. |
| 6,990,465 B1 | 1/2006 | Wandmacher et al. |
| 6,990,495 B1 | 1/2006 | Grason et al. |
| 6,999,206 B2 | 2/2006 | Silverbrook |
| 6,999,444 B1 | 2/2006 | Nitta et al. |
| 7,000,012 B2 | 2/2006 | Moore et al. |
| 7,012,916 B2 | 3/2006 | Low et al. |
| 7,013,001 B1 | 3/2006 | Felger |
| 7,018,294 B2 | 3/2006 | Silverbrook et al. |
| 7,024,184 B2 * | 4/2006 | Erb et al. ............... 455/417 |
| 7,024,450 B1 | 4/2006 | Deo et al. |
| 7,032,022 B1 | 4/2006 | Shanumgam et al. |
| 7,058,726 B1 | 6/2006 | Osaku et al. |
| 7,061,923 B2 | 6/2006 | Dugan et al. |
| 7,065,571 B2 | 6/2006 | Schweitzer et al. |
| 7,065,587 B2 | 6/2006 | Huitema et al. |
| 7,077,748 B2 | 7/2006 | Silverbrook et al. |
| 7,079,292 B2 | 7/2006 | Silverbrook et al. |
| 7,088,705 B2 | 8/2006 | Curry et al. |
| 7,100,195 B1 | 8/2006 | Underwood |
| 7,110,393 B1 | 9/2006 | Tripathi et al. |
| 7,125,337 B2 | 10/2006 | Silverbrook |
| 7,125,338 B2 | 10/2006 | Silverbrook |
| 7,131,001 B1 | 10/2006 | Johnson |
| 7,139,828 B2 | 11/2006 | Alkhatib et al. |
| 7,139,840 B1 | 11/2006 | O'Toole |
| 7,145,898 B1 | 12/2006 | Elliott |
| 7,146,179 B2 | 12/2006 | Parulski et al. |
| 7,155,425 B2 | 12/2006 | Nykanen |
| 7,158,258 B2 | 1/2007 | Silverbrook |
| 7,170,887 B2 | 1/2007 | Rosenberg |
| 7,171,457 B1 | 1/2007 | Wilson et al. |
| 7,185,073 B1 | 2/2007 | Gai et al. |
| 7,206,304 B2 | 4/2007 | Low et al. |
| 7,236,575 B2 | 6/2007 | Kim et al. |
| 7,286,562 B1 | 10/2007 | Vargo et al. |
| 7,336,649 B1 | 2/2008 | Huang |
| 7,451,195 B1 | 11/2008 | Seligmann |
| 7,903,641 B2 | 3/2011 | Low et al. |
| 8,107,594 B2 * | 1/2012 | Bennett et al. ............. 379/37 |
| 8,189,565 B2 | 5/2012 | Low et al. |
| 8,204,046 B2 | 6/2012 | Low et al. |
| 8,223,752 B2 | 7/2012 | Low et al. |
| 2001/0014839 A1 | 8/2001 | Belanger et al. |
| 2001/0027098 A1 | 10/2001 | Suzuki |
| 2001/0027406 A1 | 10/2001 | Araki et al. |
| 2001/0027478 A1 | 10/2001 | Meier et al. |
| 2001/0027491 A1 | 10/2001 | Terretta et al. |
| 2001/0030941 A1 | 10/2001 | Musikka et al. |
| 2001/0037302 A1 | 11/2001 | McFadzean et al. |
| 2001/0039576 A1 | 11/2001 | Kanada |
| 2001/0040885 A1 | 11/2001 | Jonas et al. |
| 2001/0044302 A1 | 11/2001 | Okuyama |
| 2001/0052007 A1 | 12/2001 | Shigezumi |
| 2001/0056493 A1 | 12/2001 | Mineo |
| 2002/0006133 A1 | 1/2002 | Kakemizu et al. |
| 2002/0007421 A1 | 1/2002 | Dixon et al. |
| 2002/0013850 A1 | 1/2002 | Mitchell et al. |
| 2002/0016174 A1 | 2/2002 | Gibson et al. |
| 2002/0029207 A1 | 3/2002 | Bakalash et al. |
| 2002/0041590 A1 | 4/2002 | Donovan |
| 2002/0055982 A1 | 5/2002 | Goddard |
| 2002/0064149 A1 | 5/2002 | Elliott et al. |
| 2002/0065041 A1 | 5/2002 | Lunsford et al. |
| 2002/0065932 A1 | 5/2002 | Kobayashi |
| 2002/0073019 A1 | 6/2002 | Deaton |
| 2002/0073139 A1 | 6/2002 | Hawkins et al. |
| 2002/0078102 A1 | 6/2002 | Dutta |
| 2002/0083166 A1 | 6/2002 | Dugan et al. |
| 2002/0085541 A1 | 7/2002 | Migimatsu |
| 2002/0086636 A1 | 7/2002 | Tracy et al. |
| 2002/0097710 A1 | 7/2002 | Burg |
| 2002/0099598 A1 | 7/2002 | Eicher, Jr. et al. |
| 2002/0102974 A1 | 8/2002 | Raith |
| 2002/0114324 A1 | 8/2002 | Low et al. |
| 2002/0116457 A1 | 8/2002 | Eshleman et al. |
| 2002/0129096 A1 | 9/2002 | Mansour et al. |
| 2002/0129157 A1 | 9/2002 | Varsano |
| 2002/0143989 A1 | 10/2002 | Huitema et al. |
| 2002/0147726 A1 | 10/2002 | Yehia et al. |
| 2002/0152245 A1 | 10/2002 | McCaskey et al. |

(56) References Cited

U.S. PATENT DOCUMENTS

| | | |
|---|---|---|
| 2002/0158765 A1 | 10/2002 | Pape et al. |
| 2002/0161896 A1 | 10/2002 | Wen et al. |
| 2002/0163910 A1 | 11/2002 | Wisner et al. |
| 2002/0165870 A1 | 11/2002 | Chakraborty et al. |
| 2002/0167940 A1 | 11/2002 | Low et al. |
| 2002/0169892 A1 | 11/2002 | Miyaoku et al. |
| 2002/0183038 A1 | 12/2002 | Comstock et al. |
| 2002/0184358 A1 | 12/2002 | Traversat et al. |
| 2002/0194015 A1 | 12/2002 | Gordon et al. |
| 2002/0198985 A1 | 12/2002 | Fraenkel et al. |
| 2003/0005028 A1 | 1/2003 | Dritschler et al. |
| 2003/0005350 A1 | 1/2003 | Koning et al. |
| 2003/0007497 A1 | 1/2003 | March et al. |
| 2003/0009295 A1 | 1/2003 | Markowitz et al. |
| 2003/0014523 A1 | 1/2003 | Teloh et al. |
| 2003/0018726 A1 | 1/2003 | Low et al. |
| 2003/0037146 A1 | 2/2003 | O'Neill |
| 2003/0037232 A1 | 2/2003 | Bailiff |
| 2003/0039210 A1 | 2/2003 | Jin et al. |
| 2003/0039212 A1 | 2/2003 | Lloyd et al. |
| 2003/0040316 A1 | 2/2003 | Stanforth et al. |
| 2003/0046298 A1 | 3/2003 | Weedon |
| 2003/0050918 A1 | 3/2003 | Pilkington et al. |
| 2003/0055908 A1 | 3/2003 | Brown et al. |
| 2003/0055962 A1 | 3/2003 | Freund et al. |
| 2003/0058277 A1 | 3/2003 | Bowman-Amuah |
| 2003/0065779 A1 | 4/2003 | Malik et al. |
| 2003/0065986 A1 | 4/2003 | Fraenkel et al. |
| 2003/0074475 A1 | 4/2003 | Ollikainen |
| 2003/0081758 A1 | 5/2003 | Kumar et al. |
| 2003/0120764 A1 | 6/2003 | Laye et al. |
| 2003/0159083 A1 | 8/2003 | Fukuhara et al. |
| 2003/0167234 A1 | 9/2003 | Bodmer et al. |
| 2003/0177178 A1 | 9/2003 | Jones et al. |
| 2003/0187935 A1 | 10/2003 | Agarwalla et al. |
| 2003/0193933 A1 | 10/2003 | Jonas et al. |
| 2003/0198335 A1 | 10/2003 | Porter et al. |
| 2003/0200272 A1 | 10/2003 | Campise et al. |
| 2003/0200313 A1 | 10/2003 | Peterka et al. |
| 2003/0204815 A1 | 10/2003 | Edwards et al. |
| 2003/0229900 A1 | 12/2003 | Reisman |
| 2003/0233518 A1 | 12/2003 | Yamagami et al. |
| 2004/0005046 A1 | 1/2004 | Deo et al. |
| 2004/0024872 A1 | 2/2004 | Kelley et al. |
| 2004/0025076 A1 | 2/2004 | Cabrera et al. |
| 2004/0031058 A1 | 2/2004 | Reisman |
| 2004/0034808 A1 | 2/2004 | Day et al. |
| 2004/0054854 A1 | 3/2004 | Thiyagaranjan et al. |
| 2004/0059719 A1 | 3/2004 | Gupta et al. |
| 2004/0068579 A1 | 4/2004 | Marmigere et al. |
| 2004/0117404 A1 | 6/2004 | Crivella et al. |
| 2004/0143453 A1 | 7/2004 | Weaver |
| 2004/0158766 A1 | 8/2004 | Liccione et al. |
| 2004/0168184 A1 | 8/2004 | Steenkamp et al. |
| 2004/0179481 A1 | 9/2004 | Graupner |
| 2004/0215787 A1 | 10/2004 | Gibson et al. |
| 2004/0252332 A1 | 12/2004 | McCoog et al. |
| 2004/0268175 A1 | 12/2004 | Koch et al. |
| 2005/0010550 A1 | 1/2005 | Potter et al. |
| 2005/0013426 A1 | 1/2005 | Ooki |
| 2005/0015466 A1 | 1/2005 | Tripp |
| 2005/0021713 A1 | 1/2005 | Dugan et al. |
| 2005/0044197 A1 | 2/2005 | Lai |
| 2005/0191989 A1 | 9/2005 | Plush et al. |
| 2005/0228937 A1 | 10/2005 | Karr et al. |
| 2005/0246345 A1 | 11/2005 | Lent et al. |
| 2005/0268145 A1 | 12/2005 | Hufferd et al. |
| 2006/0140356 A1 | 6/2006 | Bossemeyer, Jr. et al. |
| 2006/0239254 A1 | 10/2006 | Short et al. |
| 2007/0050492 A1 | 3/2007 | Jorgensen |
| 2007/0204036 A1 | 8/2007 | Mohaban et al. |
| 2007/0263644 A1 | 11/2007 | Christie et al. |
| 2007/0274461 A1 | 11/2007 | Bennett, III et al. |
| 2008/0161019 A1* | 7/2008 | Goffin et al. ............... 455/456.6 |
| 2008/0318561 A1 | 12/2008 | Olshansky et al. |
| 2009/0147937 A1* | 6/2009 | Sullhan et al. ........... 379/201.02 |

FOREIGN PATENT DOCUMENTS

| | | |
|---|---|---|
| DE | 4342220 A1 | 6/1994 |
| EP | 0226333 A1 | 6/1987 |
| EP | 235257 A1 | 9/1987 |
| EP | 335562 A2 | 10/1989 |
| EP | 365885 A2 | 5/1990 |
| EP | 381365 A2 | 8/1990 |
| EP | 0456947 A1 | 11/1991 |
| EP | 0484261 A2 | 5/1992 |
| EP | 0549127 A2 | 6/1993 |
| EP | 0559979 A2 | 9/1993 |
| EP | 0633685 A2 | 1/1995 |
| EP | 0654930 A1 | 5/1995 |
| EP | 0669771 A1 | 8/1995 |
| EP | 0701194 A1 | 3/1996 |
| EP | 0708570 A2 | 4/1996 |
| EP | 0709997 A2 | 5/1996 |
| EP | 0710042 A2 | 5/1996 |
| EP | 722237 A1 | 7/1996 |
| EP | 0724368 A2 | 7/1996 |
| EP | 0729281 A2 | 8/1996 |
| EP | 0740445 A2 | 10/1996 |
| EP | 0750256 A2 | 12/1996 |
| EP | 0750440 A2 | 12/1996 |
| EP | 0751656 A2 | 1/1997 |
| EP | 0767568 A2 | 4/1997 |
| EP | 0781016 A2 | 6/1997 |
| EP | 0802690 A1 | 10/1997 |
| EP | 0812088 A2 | 12/1997 |
| EP | 0812089 A2 | 12/1997 |
| EP | 0820028 A2 | 1/1998 |
| EP | 0823809 A2 | 2/1998 |
| EP | 0848540 A2 | 6/1998 |
| EP | 0873637 A1 | 10/1998 |
| EP | 0885530 A1 | 12/1998 |
| EP | 0901296 A2 | 3/1999 |
| EP | 0913968 A1 | 5/1999 |
| EP | 0942363 A2 | 9/1999 |
| EP | 1089580 A2 | 4/2001 |
| EP | 1091528 A2 | 4/2001 |
| EP | 1128632 A2 | 8/2001 |
| EP | 1170662 A2 | 1/2002 |
| EP | 1289235 A2 | 3/2003 |
| GB | 236567 A | 10/1925 |
| GB | 235536 A | 11/1925 |
| GB | 2278000 A | 11/1994 |
| GB | 2300789 A | 11/1996 |
| GB | 2322771 A | 9/1998 |
| GB | 2338372 A | 12/1999 |
| JP | S60204361 A | 10/1985 |
| JP | H0230543 U | 2/1990 |
| JP | H041051 U | 1/1992 |
| JP | H04105113 U | 9/1992 |
| JP | H0486444 A | 10/1992 |
| JP | H0516377 U | 3/1993 |
| JP | H0564045 U | 8/1993 |
| JP | H05201081 A | 8/1993 |
| JP | H05330150 A | 12/1993 |
| JP | H0637944 U | 5/1994 |
| JP | H06149051 A | 5/1994 |
| JP | H06183117 A | 7/1994 |
| JP | H07108688 B2 | 11/1995 |
| JP | H0879417 A | 3/1996 |
| JP | H0890879 A | 4/1996 |
| JP | H08118653 A | 5/1996 |
| JP | H08224730 A | 9/1996 |
| JP | H08256367 A | 10/1996 |
| JP | H0936941 A | 2/1997 |
| JP | H09113990 A | 5/1997 |
| JP | H09116843 A | 5/1997 |
| JP | H09123474 A | 5/1997 |
| JP | H09135316 A | 5/1997 |
| JP | H09168051 | 6/1997 |
| JP | H09168063 | 6/1997 |

(56) References Cited

FOREIGN PATENT DOCUMENTS

| | | |
|---|---|---|
| JP | H09168064 | 6/1997 |
| JP | H09168065 | 6/1997 |
| JP | H09172459 | 6/1997 |
| JP | H09172462 | 6/1997 |
| JP | H09187960 A | 7/1997 |
| JP | H09267487 A | 10/1997 |
| JP | H09314918 A | 12/1997 |
| JP | H10116843 A | 5/1998 |
| JP | H10126728 A | 5/1998 |
| JP | H1168851 A | 3/1999 |
| JP | H1168861 A | 3/1999 |
| JP | 2001-169341 A | 6/2001 |
| JP | 2001297027 A | 10/2001 |
| JP | 2002132810 A | 5/2002 |
| JP | 2002229836 A | 8/2002 |
| JP | 2002278903 A | 9/2002 |
| JP | 2003218941 A | 7/2003 |
| JP | 2004363685 A | 12/2004 |
| JP | 2006053581 A | 2/2006 |
| RU | 2157596 C2 | 10/2000 |
| RU | 2170454 C2 | 7/2001 |
| WO | 9012466 A1 | 10/1990 |
| WO | 9107839 A1 | 5/1991 |
| WO | 9108629 A1 | 6/1991 |
| WO | 9325035 A1 | 12/1993 |
| WO | 94/08289 A1 | 4/1994 |
| WO | 9411813 A1 | 5/1994 |
| WO | 9423523 A1 | 10/1994 |
| WO | 9501691 A1 | 1/1995 |
| WO | 9522221 A1 | 8/1995 |
| WO | 9525407 A1 | 9/1995 |
| WO | 9529564 A1 | 11/1995 |
| WO | 9531057 A1 | 11/1995 |
| WO | 9531060 A1 | 11/1995 |
| WO | 95/35633 A2 | 12/1995 |
| WO | 9609714 A1 | 3/1996 |
| WO | 9620448 A1 | 7/1996 |
| WO | 9620553 A2 | 7/1996 |
| WO | 9632800 A1 | 10/1996 |
| WO | 9634341 A1 | 10/1996 |
| WO | 9638018 A1 | 11/1996 |
| WO | 96/38962 A1 | 12/1996 |
| WO | 96/42045 A1 | 12/1996 |
| WO | 9714238 A1 | 4/1997 |
| WO | 9715983 A1 | 5/1997 |
| WO | 9716007 A1 | 5/1997 |
| WO | 9716014 A2 | 5/1997 |
| WO | 9719548 A1 | 5/1997 |
| WO | 9720423 A1 | 6/1997 |
| WO | 9720424 A1 | 6/1997 |
| WO | 9722211 A1 | 6/1997 |
| WO | 9723078 A1 | 6/1997 |
| WO | 9726749 A1 | 7/1997 |
| WO | 9728628 A1 | 8/1997 |
| WO | 9732427 A1 | 9/1997 |
| WO | 9733412 A1 | 9/1997 |
| WO | 98/12860 A1 | 3/1998 |
| WO | 9823080 A2 | 5/1998 |
| WO | 9826543 A1 | 6/1998 |
| WO | 9834391 A2 | 8/1998 |
| WO | 9842102 A1 | 9/1998 |
| WO | 9843150 A2 | 10/1998 |
| WO | 00/14989 A1 | 3/2000 |
| WO | 00/19326 A1 | 4/2000 |
| WO | 0045265 A1 | 8/2000 |
| WO | 0141457 A2 | 6/2001 |
| WO | 0161920 A1 | 8/2001 |
| WO | 0186470 A1 | 11/2001 |
| WO | 0207037 A1 | 1/2002 |
| WO | 0221865 A1 | 3/2002 |
| WO | 02059763 A1 | 8/2002 |
| WO | 02067144 A1 | 8/2002 |
| WO | 03014928 A2 | 2/2003 |
| WO | 03021900 A1 | 3/2003 |
| WO | 03023735 A2 | 3/2003 |
| WO | 2005055561 A2 | 6/2005 |
| WO | 2006036356 A1 | 4/2006 |

OTHER PUBLICATIONS

"ESI Presence Management for ESI Business Phone Systems—Details", http://www.esi-estech.com/products/systems/presence/details.php, Internet, Feb. 3, 2009 (Date of Access), Estech Systems, Inc., Plano, Texas.

Kolarov, et al., "End-to-End Adaptive Rate Based Congestion Control Scheme for ABR Service in Wide Area ATM Networks", Feb. 1995, pp. 138-143.

Lee, et al., "Integrated Packet Networks with Quality of Service Constraints", Global Telecommunication Conference, IEEE Dec. 1991, pp. 223-227.

Li, et al., "Time-Driven Priority Flow Control for Real-Time Heterogeneous Internetworking", Proceedings in Computer Communications, Fifteenth Annual Joint Conference of the IEEE Computer Communication Generation, San; Francisco, Mar. 24-28, 1996, vol. 1 Conf., Mar. 24, 1996 IEEE, pp. 189-197.

Lipoff, "Operations Support System Framework for Data Over Cable Services", Data Over Cable Technical Reports, TR-DOCS-OS-SIW08-961 016, Oct. 16, 1996, pp. 1-20.

Low, "The Internet Telephony Red Herring", IEEE 1996, May 15, 1996, pp. 72-80.

Low, "The Internet Telephony Red Herring", Intelligent Networked Platforms Dept., Intelligent Networked Computing Laboratory, Hewlett-Packard Laboratories, Bristol, May 15, 1996, pp. 1-15.

Low, et al., "Webin—An Architecture for Fast Development of IN-Based Personal Services" Workshop Record Intelligent Network. Freedom and Flexibility: Realizing the Promise of Intelligent Network Services, IEEE, Apr. 21, 1996, 6 pages.

Macedonia, et al., "Mbone Provides Audio and Video Across the Internet", Apr. 1994, 13 pages.

Mach2 DNS (Domain Name Services), Module Au-A-11045/97, Jun. 13, 1995.

Malamud, et al., "Principles of Operation for the TPC.INT Subdomain: General Principles and Policy", RFC 1530, Oct. 1993, 6 pages.

Malamud, et al., "Principles of Operation for the TPC.INT Subdomain: Remote Printing—Administrative Policies", RFC 1529, Oct. 1993, 5 pages.

Malamud, et al., "Principles of Operation for the TPC.INT Subdomain: Remote Printing—Technical Procedures", RFC 1528, Oct. 1993, 10 pages.

Malyan, et al., "A Microcellular Interconnection Architecture for Personal Communications Networks", 1992 IEEE, pp. 502-505. (May 1992).

Malyan, et al., "Network Architecture and Signaling for Wireless Personal Communications", IEEE Journal on Selected Areas in Communications, vol. 11, No. 6, Aug. 1993, 12 pages.

Manning, et al., "DNS NSAP Resource Records", RFC 1706, Oct. 1994, 9 pages.

Margulies, "CT's Cyberdate with the 'Net", Aug. 1996, Computer Telephony Periscope, pp. 28-29.

Mark Handley, "Session Invitation Protocol," Feb. 22, 1996, 17 pages.

Martersteck, et al., "The 5ESS Switching System: Introduction," AT&T Technical Journal, Jul. 1985, 10 pages.

Maruyama, "A Concurrent Object-Oriented Switching Program in Hill", IEEE Communications Magazine, vol. 29, No. 1, Jan. 1991, pp. 60-68.

Matta, et al., "Type-of-Service Routing in Dynamic Datagram Networks", 1994, Proceedings of the Conference on Computer Communications, IEEE, pp. 992-999. (Jun. 1994).

Mayer, et al., "Service Net-2000: An Intelligent Network Evolution", AT&T Technical Journal, vol. 70, No. 3/4, 1991, pp. 99-110. (Jan. 1991).

McConnell, "How to Build an Internet PBX", <http://www.phonezone.com/ip-phone.htm>, Oct. 1996, pp. 1-9.

(56) References Cited

OTHER PUBLICATIONS

Mealling, etal., "Uniform Resource Names, ISO OIDs and DNS", Internet: <http://www.gbiv.com/protocols/uri/drafts/draft mealling-oid-dns-OO.txt>, pp. 1-14 (Nov. 22, 1995).
Michalski, "The Internet as Communications Lab", Release 1.0, 2-94, Feb. 18, 1994, 28 pages.
Miller, "Managing the Internet", Troubleshooting TCP/IP, Chapter 7, 1992, pp. 365-375.
Mills, "Phone Service via the Internet May Slash Rates", The Washington Post, Aug. 11, 1996, p. A4.
Mitra, et al., "Uniform Resource Names", Internet: <http://www.mitra.biz/uri/graft-ictt-uri-resource-names-0.3.txt>, Nov. 1994, pp. 1-9.
Mockapetris, "Domain Names—Implementation and Specification", RFC 1035, Nov. 1987, 45 pages.
Mockapetris, "RFC 11 01—DNS Encoding of Network Names and Other Types", Internet: <http://www.faqs.org/rfcs/rfc11 01.html>, Apr. 1989, pp. 1-12.
Mockapetris, P., "Domain Names—Concepts and Facilities," RFC 1034 (Nov. 1987).
Morgan, et al., "Service Creation Technologies for the Intelligent Network", AT&T Technical Journal, 1991, pp. 58-71. (Jan. 1991).
Moy, "RFC 1247—IETF Network Working Group: OSPF Version 2", Jul. 1991, <http://tools.ietf.org/html/rfc1247>, 183 pages.
Muffett, "Proper Care and Feeding of Firewalls", Sun Microsystems, Nov. 14, 1994, pp. 1-12.
NetNumber, <http://www.netnumber.com/intellectualproperty.html>, 1 page, 1999.
Newton, "Telephony Messaging on the Internet", Computer Telephony, Jul. 1996, pp. 10-16.
Ng, et al., "Distributed Architectures and Databases for Intelligent Personal Communication Networks", 1992 IEEE, ICWC '92, pp. 300-304. (Jun. 1992).
Niitsu, et al., "Computer-Aided Stepwise Service Creation Environment for Intelligent Network", Supercomm/International Conference on Communications, Jun. 14, 1992, pp. 454-458.
Office Action, U.S. Appl. No. 11/066,880, mailed Dec. 11, 2007.
Office Action, U.S. Appl. No. 11/066,880, mailed Sep. 24, 2008.
Office Action, U.S. Appl. No. 11/590,489, mailed Dec. 1, 2009.
Office Action, U.S. Appl. No. 11/590,489, mailed Mar. 18, 2009.
Office Action, U.S. Appl. No. 12/389,837, mailed Jun. 25, 2010.
Office Action, U.S. Appl. No. 12/389,843, mailed Jul. 2, 2010.
Office Action, U.S. Appl. No. 12/389,851, mailed Jul. 23, 2010.
Office Action, U.S. Appl. No. 10/052,305 (U.S. Pat. No. 7,206,304 ), mailed Jun. 19, 2006.
Office Action, U.S. Appl. No. 11/066,880, mailed Apr. 14, 2009.
Office Action, U.S. Appl. No. 11/066,880, mailed Nov. 23, 2009.
O'Malley, et al., "A Dynamic Network Architecture", ACM Transactions on Computer Systems, vol. 10, No. 2, May 1992, pp. 110-143.
Oppen, et al., "The Clearinghouse: A Decentralized Agent for Locating Named Objects in a Distributed Environment", ACM Transactions on Office Information Systems, vol. 1, No. 3, Jul. 1983, pp. 230-235.
Parness, "IDT to Unveil Net2Phone at Corndex; Revolutionary System Uses Internet to Make Overseas PC-to-Telephone Calls for 10 cents a Minute", Nov. 6, 1995, <www.highbearn.corn>, 2 pages.
AT&T / Spanlink Press release, "AT&T, Spanlink to provide secure internet Links", Dec. 4, 1995.
Bersano-Begey T F et al: "A Java collaborative interface for genetic programming applications: image analysis for scientific inquiry" Apr. 13, 1997, Evolutionary Computation, 1997., IEEE International Conference on Indianapolis, IN, USA Apr. 13-16, 1997, New York, NY, USA, IEEE, US, pp. 477-482, XP01 0225484.
Common Patent Policy for ITU-T/ITU-R/ISO/IEC, Apr. 19, 2007.
Das Internet in Deutschland—Ein alter Hut?, May 4, 2007.
European Search Report—EP 00117677.5—Mailing date: Nov. 8, 2000.
European Search Report—EP 020005682—Mailing date: Aug. 6, 2002.
European Search Report—EP 02011638.0—Mailing date: Nov. 23, 2005.
European Search Report—EP 04106083.1—Mailing date: Oct. 11, 2005.
European Search Report—EP 97300799.0—Mailing date: Sep. 29, 1998.
European Search Report—EP 97300819.6—Mailing date: Sep. 29, 1998.
European Search Report—EP 98123599.7—Mailing date: Oct. 12, 1999.
European Search Report—EP 98306279.5—Mailing date: Jan. 4, 1999.
European Search Report—EP 98307559.9—Mailing date: Feb. 26, 1999.
Fraud suppression techniques using SS/protocol analyzers, Research Disclosure, No. 365, Sep. 1994, p. 491, XP000471281, Emsworth GB.
Hou et al.: Error monitoring issues for common channel signaling, IEEE journal on selected areas in communications, vol. 12, No. 3, Apr. 1994, pp. 456,467, xp000458691.
International Preliminary Examination Report—PCT/EP1998/01119—date of completion: May 25, 1999.
International Preliminary Examination Report—PCT/GB1996/03048—date of completion: Mar. 30, 1998.
International Preliminary Examination Report—PCT/GB1996/03049—date of completion: Jan. 22, 1998.
International Preliminary Examination Report—PCT/GB1996/03051—date of completion: Mar. 4, 1998.
International Preliminary Examination Report—PCT/GB1996/03055—date of completion: Mar. 5, 1998.
International Preliminary Examination Report—PCT/GB1997/00469—date of completion: May 12, 1998.
International Search Report—PCT/EP1998/01119—Date of completion: Aug. 20, 1998.
International Search Report—PCT/EP1998/01120—Date of mailing: Sep. 15, 1998.
International Search Report—PCT/GB1996/03048—Mailing date: Mar. 27, 1997.
International Search Report—PCT/GB1996/03049—Mailing date: Jun. 2, 1997.
International Search Report—PCT/GB1996/03051—Date of completion: Mar. 10, 1997.
International Search Report—PCT/GB1996/03054—Mailing date: Sep. 25, 1997.
International Search Report—PCT/GB1996/03055—Date of completion: Mar. 27, 1997.
International Search Report—PCT/GB1997/00469—Mailing date: Sep. 25, 1997.
ITU-Approved Global TLD ".tel" to be used for "E.164 Number Mapping", Internet Management Systems, Inc., Study group 2—Delayed contribution 185 Corr.1, COM2-D185 Corr.1-E, Geneva, May 18-28, 7 pages2004.
ITU-T, X.691 Corrigendum 1, Series X: Data networks, open System communications and Security, May 2005.
Jabbari: "Common channel signaling system No. 7 for ISDN and intelligent networks", Proceedings of the IEEE., vol. 79, No. 2, Feb. 1991, pp. 155-169, XP000226399, New York, US.
Lee et al., Design and Implementation of Important Applications in a Java-Based Multimedia Digital Classroom, Aug. 1997, IEEE Transactions on Consumer Electronics, vol. 43, No. 3, pp. 264-270.
Notice of opposition—EP 02000568.2—Mailing date: Feb. 14, 2005.
Office action—EP 02000567.4—Mailing date: Sep. 11, 2003.
Office action—EP 02000568.2—Mailing date: Sep. 11, 2003.
Office action—EP 02011638.0—Mailing date: Dec. 1, 2011.
Office action—EP 02011638.0—Mailing date: Dec. 18, 2007.
Office action—EP 02079913.6—Mailing date: Apr. 25, 2012.
Office action—EP 96941763.3—Mailing date: Sep. 4, 2003.
Office action—EP 96941765.8—Mailing date: Feb. 8, 2000.
Office action—EP 96941769.0—Mailing date: Mar. 10, 2003.
Office action—EP 96941769.0—Mailing date: Mar. 24, 2004.
Office action—EP 96941769.0—Mailing date: Sep. 4, 2001.
Office action—EP 97300799.0—Mailing date: Nov. 21, 2003.

(56) References Cited

OTHER PUBLICATIONS

Office action—EP 97300819.6—Mailing date: Nov. 21, 2003.
Office action—EP 97903514.4—Mailing date: Dec. 30, 1999.
Office action—EP 98123599.7—Mailing date: Nov. 27, 2006.
Office action—EP 98306279.5—Mailing date: Sep. 14, 2001.
Office action—EP 98916876.0—Mailing date: Feb. 15, 2002.
Ekstein, Ronnie, et al., "AAA Protocols: Comparison between Radius, Diameter and Cops," Internet Engineering Task Force (IETF), pp. 1-17, Aug. 1999.
F. Shen et al. Profile-Based Subscriber Service Provisioning, IEEE, Apr. 15, 2002; pp. 561-574.
Finseth C. "An access control protocol, sometimes called TACACS," Network Working Group, University of Minnesota, pp. 1-21, Jul. 1993.
Flykt, P., et al., "SIP Services and Interworking IPv6," 3G Mobile Communication Technologies, Mar. 26-28, 2001, Conference Publication No. 477.
Gait, J, 1991. Stability, Availability, and Response in Network File Service. IEEE Trans. Softw. Eng. 17, 2(Feb. 1991),133-140 DOI= http://dx.doi.org/10.1109/32.67594.
George Coulouris et al. "Secure Communication in Non-uniform Trust Environments". Jul. 1998. ECOOP Workshop on Distributed Object Security.
Gleeson, B., et al., "A Framework for IP Based Virtual Private Networks," The Internet Society, pp. 1-62, Feb. 2000.
Glitho R.H et al. "creating value added services in internet telephony: an overview and a case study on a high-level service creation environment", IEEE transacitons on systems, man and cybermetics, PartC : applications and reviews, issue: 4, vol. 33, 2003, pp. 446-457.
Goyal, Pawan, et al., "Integration of call signaling and resource management for IP telephony," IEEE Network, pp. 24-32, May/Jun. 1999.
Guerin, et al., "QoS Routing Mechanisms and OSPF Extensions", Internet Engineering Task Force (Dec. 1998).
Handley, M., et al., "SIP: Session Initiation Protocol," Network Working Group, The Internet Society, Mar. 1999.
Hansson et al. "Phone Doubler—A Step Towards Integrated Internet and Telephone Communities" 1997 Ericsson Review, No. 4 pp. 142-151.
Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.
Hedrick, C., "Routing Information Protocol", Jun. 1988, http://www.internic.net/rfc/rfc1058.txt, pp. 1-30.
Herzog, S., et al., "COPS Usage for RSVP," Network Working Group, pp. 1-15, Jan. 2000.
Hinden et al., "The DARPA Internet Gateway", Sep. 1982, http://www.internic.net/rfc/rfc823.txt, pp. 1-41.
Hirokazu Takatama et al. "Intelligent SIP system for Mobile Internet", NEC Intelligent network workshop 2001.
Hubaux, Jean-Pierre, et al., "The impact of the Internet on telecommunication architectures," Computer Networks 31 (1999).
Inamori, Hisayoshi, et al., "Common Software Platform for Realizing a Strategy for Introducing the TMN," Network Operations and Management Symposium, vol. 2, pp. 579-589, Feb. 1998.
Inoue et al., "Evolution Scenario of Broadband Services Based on Granulated Broadband Network Concept", IEEE Region 10 Conference, Tencon 92, Nov. 11-13, 1992.
Inoue et al., "Granulated Broadband Network Applicable to B-ISDN and PSTN Services", IEEE Journal on Selected Areas in Communiations, vol. 10, No. 9, Dec. 1992.
Iraklis Varlamis et al. "Bridging XML-schema and relational databases: a system for generating and manipulating relational databass using valid XML documents", proceedings of the 2001 ACM Symposium on document engineering, pp. 105-114.
Jaewook Shin et al. "A new efficient method of generating processor load data and meta data base in CMS-MX System", Personal wireless communications, Dec. 1997, IEEE International conference, pp. 349-352.

Johnson, David B., "Scalable Support for Transparent Mobile Host Internetworking," Proceedings of the Ninth Annual IEEE Worshop on Computer Communications, pp. 1-10, Oct. 1994.
Kausar, Nadia, et al., "A Charging Model for Sessions on the Internet," IEEE, pp. 32-38, Apr. 1999.
Kazuhiko Ohkubo "Schema transalation into a unified model for service operation", IEEE 1992, pp. 1010-1015.
Kent, Stephen, Evaluating Certification Authority Security, 1998 IEEE Aerospace Conference Proceedings, vol. 4, pp. 319-327.
Kreller, Birgit, et al., "UMTS: A Middleware Architecture and Mobile API Approach," IEEE Personal Communications, pp. 32-38, Apr. 1998.
Kumar, Vijay P., et al., "Beyond Best Effort: Router Architectures for the Differentiated Services of Tomorrow's Internet," IEEE Communications Magazine, pp. 152-164, May 1998.
Kupsys, A.; Ekwall R., "Architectural Issues of JMS Compliant Group Communication," Network Computing and Applications, Fourth IEEE International Symposium on vol., Issue, Jul. 27-29, 2005 pp. 139-148.
Lane,C,H.R. et al. "An entity-based service script editor for IN", eight international conference on software engineering for telecommunication systems and services, 1992, pp. 57-61.
Laubach, "Classical IP and ARP over ATM" Hewlett-Packard Laboratories, Jan. 1994, http://www.faqs.org/rfc/rfc1577.txt.
Lee et al., Concatenated Wireless Roaming Security Association and Authentication Protocol using ID-Based Cryptography, Conference Proceedings of the IEEE Vehicular Technology Conference, vol. 2, New York, NY c.1978-1979, pp. 1507-1511.
Mahadevan, I., et al., "Quality of service achitectures for wireless networks: IntServ andDiffServ models," http://ieeexplore.ieee.org/xpllabsprintf.jsp?arnumber==778974.and.page . . . , Aug. 6, 2002.
Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.
Mascoli, Cicchetti & Listanti, "Alternative Scenarios for Data Applications via Internet-Mobile and DECT-ATM Interworkin," 4th IEEE International Conference on Universal Personal Communications, pp. 788-792, Nov. 6-10, 1995 published. Apr. 1995.
Mealling, M. "DDDS Part Four: The URI Resolution Application," RFC 3404, Oct. 2002, pp. 1-18.
Mealling, M. and Denenberg, R. "URI, URL, and URN: Clarificiations and Recommendations," RFC 3305, Aug. 2002, pp. 1-11.
Merritt, "Providing Telephone Line Access to a Packet Voice Network", University of Southern California, Feb. 1983, ISI/RR-83-107.
Mevel and Simon, Distributed Communication Services in the Masix System, Conference Proceedings of the 1996 IEEE Fifteenth Annual International Phoenix Conference on Computers and Communications, Mar. 27-29, 1996, pp. 172-178.
Mills, D.L., "An Experimental Multiple-Path Routing Algorithm", Mar. 1986, http://www.internic.net/rfc/rfc981.txt, pp. 1-20.
Mills-Tetty Ayorkor et al. "Security Issues in the ABELS System for Linking Distributed Simulations". 2003. IEEE Proceedings of the 36th Annual Simulation Symposium.
Moh M. et al.: "Mobile IP telephony: mobility support of SIP" Proceedings of the International Conference on Computer Communications and Networks, XX, XX, Oct. 11, 1999, pp. 554-559. XP002143545.
Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A., 1993.
Narasimhan P. et al. "Eternal—A component-based framework for transparent fault-tolerant CORBA". In Software—Practice and Experience. vol. 32, No. 8, pp. 771-788. Jul. 10, 2002.
Ninghui Li, Local Names in SPKI/SDSI, Proceedings of the 13th IEEE Computer Security Foundations Workshop, 2000, pp. 2-15.
Noerpel et al., "PACS: Personal Access Communications System—A Tutorial," IEEE Personal Communications, Jun. 1996.
Okada, et al., "Applying CC/PP to User's Environmental Information for Web Service Customization", http://www10.org/cdrom/posters/

(56) References Cited

OTHER PUBLICATIONS 1066.
pdf#search=%22customize%20web%20page%20%20based%20in%20user%20preferences%22.
2001.
O'Malley, Sean W., "A Dynamic Network Architecture," Department of Computer Science, University of Arizona, ACM Transactions on computer systems, vol. 10, No. 2, pp. 110-143, May 1992.
Palme, J. et al. "MIME Encapsulation of Aggregate Documents, such as HTML (MHTML)." RFC 2557, Mar. 1999, pp. 1-28.
Palo Alto Research Center, "Etherphone: Collected Papers 1987-1988," May 1989.
Park, Myung Ah, et al., "Dial-up internet access service system with automatic billing mechanism," ICICS 1997, Electronics .and. Telecommunications Research Institute, pp. 148-151, Singapore, Sep. 9-12, 1997.
Perez et al., "ATM Signaling Support for IP Over ATM", Network Working Group, RFC 1765, Feb. 1995, http:/www.ietf.org/rfc/rfc1765.txt.
Pezzutti, David A., "Operations Issues for Advanced Intelligent Networks," IEEE Communications Magazine, pp. 58-63, Feb. 1992.
Rajan, R., et al., "A policy framework for integrated and differentiated services inthe Internet," Network, IEEE, vol. 13, Issue 5, pp. 36-41, Sep./Oct. 1999.
Rajkumar, R., et al., "A resource allocation model for QoS management," Proceedings. The 18th IEEE Real-Time Systems Symposium (Cat.No. 97CB36172) p. 298-307, Dec. 2-5, 1997.
Ronstrom,M, "On-line schema update for a telecom database", data engineering proceedings, 18th international conference, Mar. 2000, pp. 329-338.
Rosenblum, M and Ousterhout, J.K, 1992. The design and implementation of a log-structured file system. ACM Trans. Comput. Syst. 10,1 (Feb. 1992), 26-52 DOI=http://doi.acm.org/10.1145/146941.146943.
Sakai, H. et al. "A Service Logic Program Generation Method for Advanced Intelligent Network," NTT Network Service Systems Laboratories, 1996, pp. 47-51.
Schulzrinne, Henning, et al., "Signaling for internet telephony," Columbia University, Dept. of Computer Science Technical Report CUCS-005-98, Feb. 2, 1998.
Schutzrinne, Henning, "A comprehensive multimedia control architecture for the Internet," IEEE, pp. 65-76, Sep. 1997.
Shah et al. "Application of a New Network Concept for Faster Service Deployment" International Conference on COMM. 88 Jun. 12-15, 1988, IEEE Comm. Soc. Conference. Record, vol. 3, pp. 1327-1331.
Shouhuai Xu et al. "Authenticated Multicast Immune to Denial-of-Service Attack". Feb. 2003. ACM.
Spurzem B: "Advantages of Mimosa NearPoint for Email Archival" Internet, [Online] Jan. 2005, pp. 1-14, XP002519383 Retrieved from the Internet: URL:http://www.Flexnet.com/Exchange-Email-Archiving-and-Compliance/NearPoint%20E-mail%20Archive%20for%20Exchange.pdf> [retrieved on Mar. 11, 2009] * p. 3, line 1-17 * * p. 9, line 1-p. 11, line 8 * * figure 1 *.
Spurzem B: "Mimosa NearPoint for Microsoft Exchange Server" Internet [Online] Jan. 2005, pp. 1-18, XP002519249 Retrieved from the Internet: URL:http://www.Flexnet.com/Exchange-Email-Archiving-and-Compliance/
NearPoint%20Architecture%20for%20Exchange.pdf> [retrieved on Mar. 11, 2009] * p. 5, line 18-line 20 * * p. 6, line 2-line 5 * * p. 6, line 16-line 26 * * page 7, line 22-line 33 * * p. 8, line 4-line 15 * * p. 8, line 25-line 28 * * figure 2 *.
Stefan Saroiu et al. "A Measurement Study of Peer-to-Peer File Sharing Systems." 2002. University of Washington.
Steven M Bellovin et al. "Augmented Encrypted Key Exchange: A Password-Based Protocol Secure Against Dictionary Attacks and Password File Compromise". 1st Conference Computer & Comm. Security. 1993 ACM. AT&T Bell Laboratories.
Steven M. Bellovin et al. "Encrypted Key Exchange: Password-Based Protocols Secure Against Dictionary Attacks". 1992. IEEE.
Stoica, Ion, et al., "LIRA: An Approach for Service Differentiation in the internet," sponsored by DARPA under contract Nos. N66OO1-96-C-8528 and N00174-96-K-0002, and by a NSF Career Award under grant No. NCR-9624979. Additional support was provi. 1998.
Stojsic, Goran, et al., "Formal Definition of SIP Proxy Behavior," IEEE, pp. 289-292, Feb. 2001.
Sui Man Lui et al. "Interoperability of Peer-to-Peer File Sharing Protocols" Aug. 2002. ACM SIGecom Exchange.
Sunaga, Hiroshi, et al., "A Reliable Communication Switching Platform for Quick Service Provisioning," IEEE International Conference on Communications, Seattle, WA, Jun. 18-22, 1995.
Swinehart et al., "Adding Voice to an Office Computer Network," Proceedings of the IEEE Globecom '83, Feb. 1984.
Varma et al., "Architecture for Interworking Data over PCS," IEEE Communications Magazine, Sep. 1996, 124-130.
Vin et al., "Multimedia Conferencing in the Etherphone Environment," IEEE Computer, vol. 24, No. 10, Oct. 1991.
Waitzman et al., "Distance Vector Multicast Routing Protocol", Nov. 1988, http://www.internic.net/rfc/rfc1075.txt, pp. 1-22.
Wedlund, Elin, et al., "Mobility support using SIP," WoWMoM, Jan. 1999.
Weinstein, "The Experimental Integrated Switched Networks—A System Level Network Text Facility", Proceedings of 1983 IEE Military Communications Conference, Washington, DC, Oct. 31, 1983-Nov. 2, 1983.
Weisser et al. "The Intelligence Network and Forward-Looking Technology" IEEE Comm magazine, Dec. 1988, pp. 64-69.
White, Paul P., "RSVP and Integrated Services in the Internet: A Tutorial," IEEE Communications Magazine, pp. 100-106, May 1997.
Willebeek-LeMair, Marc H., "Videoconferencing over Packet-Based Networks," IEEE Journal on Selected Areas in Communications, vol. 15. No. 6, pp. 1101-1114, Aug. 1997.
Wright, S., et al., "IP "Telephony" vs. ATM: What is There to Discuss?," IEEE, pp. 400-409, Feb. 1998.
Wroclawski, J., "The Use of RSVP with IEFT Integrated Services," ftp://ftp.isi.edu/in-notes/rfc2210.txt, Sep. 22, 1999.
Xuhua Ding and Gene Tsudik, Simple Identity-Based Cryptography with Mediated RSA, The Cryptographers' Track at the RSA Conference 2003, San Francisco, CA, Apr. 13-17, 2003, pp. 193-210.
J.D. Smith, "An Overview to Computer-Telecommunications Integration (CTI)", Telecommunications, Conference Publication No. 404, IEE, pp. 44-48, Mar. 1995.
Zorn, G. and Aboba, B. "RADIUS Authentication Server MIB," RFC 2619, Jun. 1999, pp. 1-16.
"Cryptography and the Internet", www.echonyc.com/~ysue/crypt.html, 1995.
"Interactive Media: An Internet Reality" IEEE Spectrum, vol. 33, No. 4, Apr. 1, 1996, pp. 29-32.
Amza, C. et al., "Bottleneck Characterization of Dynamic Web Site Benchmarks" In Third IBM CAS Conference (2002) 15 pages.
Aversa, L. et al., "Load Balancing a Cluster of Web Servers" Technical Report (1999) 13 pages.
B. Bollig and I. Wegener. Improving the variable ordering of OBDDs is NP-complete. IEEE Transactions on Computers, 45(9):993-1002, 1996.
Bill Croft and John Gilmore, Bootstrap Protocol (BOOTP), IETF RFC-951, Sep. 1985.
Bolot, et al.: "Scalable Feedback Control for Multicast Video Distribution in the Internet" Computer Communications Review, vol. 24, No. 4, Oct. 1, 1994, pp. 58-67.
Bornhoft, M., et al., Computer-Switch Telephony Applications, IEE, Third IEE Conf. on Telecommunications, 1991, pp. 62-66, 1991.
Brian Oki, Manfred Pfluegl, Alex Siegel and Dale Skeen, The Information Bus: an architecture for extensible distributed systems, ACM SIGOPS Operating Systems Review, v27 n5, Dec. 1993, pp. 58-68.
Brij Bhushan and Holger Opderbeck "The Evolution of Data Switching for PBX's" IEEE Journal on Selected Areas in Communications, pp. 569-573, vol. sac-3, No. 4 Jul. 1985.
C. R. Strathmeyer IEEE Commun. Mag., vol. 34, No. 4, 1996.
C. Yang and J. Yu, "UPT demo on integrated wireline and wireless testbed," Proc. ICUPC, pp. 558-562, 1995.
Eric Skow, et al., "A Security Architecture for Application Session Handoof," 2002, IEEE International Conference Proceedings, Apr. 28-May 2, 2002, vol. 1 of 5, pp. 2058-2063, XP010589848.

(56) References Cited

OTHER PUBLICATIONS

Chen and Baras "Optimal Routing in Mixed Media Networks with Integrated Voice and Data Traffic" GLOBECOM '92, IEEE Global Telecommunications Conference pp. 335-339, vol. 1 of 3 vol. Dec. 1992.
Christina J. Jenny and Karl Kummerle "Distributed Processing Within an Integrated Circuit/Packet-Switching Node" IEEE Transactions on Communications, pp. 1088-1101, vol. com-24, No. 10 Oct. 1976.
David C. Luckham and James Vera, An eventbased architecture definition language, IEEE Transactions on Software Engineering, 21(9):717-734, Sep. 1995.
Duan et al., "Efficient Utilization of Multiple Channels Between Two Switches in ATM Networks," Feb. 1995: pp. 1906-1911.
Ejiri, Masayoshi, "For Whom the Advancing Service/Network Management," Feb. 1994: pp. 442-433.
Esaki, Shuji, Tomoki Omiya, and Naoki Shigematsus. "Abstraction and control of transport network resources for intelligent networks." Electronics and Communications in Japan (Part I: Communications) 76.1 (1993): 34-44.
Chase, Jeffrey S., "Dynamic Virtual Clusters in a Grid Site Manager," Proceedings of the IEEE International Symposium on HPDC—2003, XP010463715, pp. 90-100.
Factor and Gelernter, Software Backplanes, Realtime Data Fusion and the Process Trellis, Technical Report YALEU/DCS/TR-852, Yale University Department of Computer Science, Mar. 1991.
G. A. Thom, H.323 : The Multimedia Communications Standard for Local Area Networks, IEEE Comm. Mag., 34(12), Dec. 1996, pp. 52-56.
G.S. Lauer, IN Architectures for Implementing Universal Personal Telecommunications, IEEE Networks Mar./Apr. 1994 6-16.
Going beyond the sandbox: An overview of the new security architecture in the Java Development Kit 1.2—Gong, Mueller, et al.—1997.
Grami et al., "The Role of Satellites in the Information Superhighway," Jun. 1995: pp. 1577-1581.
Gupta et al., "Technical Assessment of (T) INA-TMN-OSI Technology for Service Management Applications," Feb. 1994: pp. 877-887.
I. Faynberg, M. Krishnaswamy and H. Lu A proposal for Internet and Public Switched Telephone Networks (PSTN) Interworking, 1997.
Inamori et al., "Applying TMN to a Distributed Communications Node System with Common Platform Software," Feb. 1995: pp. 83-87.
Introduction to the Intelligent Network Capability Set 1, Rec. Q.1211—ITU-T—1993.
J. Audestad, B. B Jacobsen, Universal personal telecommunication and intelligent network architecture, Proc. of the International Conference on Intelligence in Networks (ICIN), vol. 1, 1995, pp. 89-94.
Zellweger et al., "An Overview of the Etherphone System and Its Applications," Proceedings of the 2nd IEEE Conference on Computer Workstations, Mar. 1988.
Gough, John, and Glenn Smith. "Efficient recognition of events in a distributed system." Australian computer science communications 17 (1995): 173-179.
J.S.M. Ho, I.F Akyildiz, Local anchor scheme for reducing signaling costs in personal communications network, IEEE Transaction on Networking 4 (5) (1996) 709-723.
Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.
K. O. Sandor and A. Schmer. Supporting social awareness @ work, design and experience. In Proceedings of the 1996 ACMConference on Computer Supported Cooperative Work, Boston, 1996.
K. Sullivan and D. Notkin. Reconciling environment integration and component independence. ACM Transactions on Software Engineering and Methodology, 1(3), Jul. 1992.
Kolarov et al., "End-to-End Adaptive Rate Based Congestion Control Scheme for ABR Service in Wide Area ATM Networks," Feb. 1995: pp. 138-143.

L. Gong "Going Beyond the Sandbox: An Overview of the New Security Architecture in the Java Development Kit 1.2", Proc. USENIX Symp. Internet Technologies and Sys., 1997.
L. Lövstrand. Being selectively aware with the khronika system. In Proceedings of the 6th European Conference on Computer Supported Cooperative Work—ECSCW'91, Sep. 1991.
M. Fujioka, S. Sakai, and H. Yagi, "Hierarchical and distributed information handling for UPT," IEEE Network Mag., pp. 50-60, Nov. 1990.
Macedonia et al., "Mbone Provides Audio and Video Across the Internet," Apr. 1994, pp. 30-36.
Maeno, et al. "Distributed Desktop Conferencing System (Mermaid) Based on Group Communication Architecture" Communications—Rising to the Heights, Denver, Jun. 23-26, 1991, vol. 1, Jun. 23, 1991, pp. 520-525.
Manu Malek "Integrated Voice and Data Communications Overview" IEEE Communications Magazine, pp. 5-15, vol. 26, No. 6, Jun. 1988.
Mark J. Karol and Michael G. Hluchyj "Using a Packet Switch for Circuit-Switched Traffic: A Queueing System with Periodic Input Traffic" IEEE Transactions on Communications, pp. 623-625, vol. 37, No. 6, Jun. 1989.
Matsuo, et al.: "Personal Telephone Services Using IC-Cards" IEEE Communications Magazine, vol. 27, No. 7, Jul. 1989, pp. 41-48.
McDavid, D. "A standard for business architecture description" IBM Systems Journal(1999) 19 pages.
Meira, W. et al., "E-representative: a scalability scheme for e-commerce" In Proceedings of the Second International Workshop on Advanced Issues of E-Commercce and Web-based Information Systems(2000) 8 pages.
Mosberger, D. et al, "httperf—A Tool for Measuring Web Server Performance" In First Workshop on Internet Service Performance (1998) 9 pages.
Nahum, E. et al., "Performance Issues in WWW Servers" IEEE (2002) 11 pages.
Nixon, T. 'Design Considerations for Computer-Telephony Application Programming Interfaces and Related Components', IEEE Communications Magazine, pp. 43-47, Apr. 1996.
O. Coudert and J.C. Madre. A unified framework for the formal verification of sequential circuits. In IEEE International Conference on Computer-Aided Design (ICCAD'90), pp. 126-129, 1990.
P. Cronin "An Introduction to TSAPI and Network Telephony", IEEE Comm. Mag., vol. 34, No. 4, pp. 48-54 1996.
Pierre, G. et al., "Differentiated Strategies for Replicating Web Documents" in Proceedings of the 5th International Web Caching and Content Delivery Workshop (2000) 16 pages.
R. E. Bryant. Graph-based algorithms for Boolean function manipulation. IEEE Transaction on Computers, 35(8):677-691, 1986.
R. E. Bryant. On the complexity of VLSI implementations and graph representations of Boolean functions with application to integer multiplication. IEEE Transaction on Computers, 40:205-213, 1991.
R. Srinivasan XDR: External Data RepresentationStandard, IETF RFC-1832, Aug. 1995.
Ravi Kokku et al., "Half-pipe Anchoring: An Efficient Technique for Multiple Connection Handoff," Proceedings 10th International Conference on Network Protocols, Nov. 12, 2002, XP010632563, 10 pages.
Realizing a Foundation for Programmability of ATM Networks with the Binding Architecture—Lazar, Lim, et al.—1996.
Recommendation F.851, Universal Personal Telecommunication (UPT)-service description (service set 1), Jan. 1994.
Robbert van Renesse, Kenneth P. Birman and Silvano Maffeis, Horus, a flexible Group Communication System, Communications of the ACM, Apr. 1996.
S.P. Reiss. Connecting tools using message passing in the FIELD program development environment. IEEE Software, Jul. 1990.
Sontag, E. et al., "A Notion of Input to Output Stability" (1997) 6 pages.
Stuart J. Yuill and Raymond L. Pickholtz "Performance Modeling for Packet Networks with Satellite Overflow" IEEE Transactions on Communications, pp. 808-815, vol. com-29, No. 6, Jun. 1981.
Sun Microsystems, Inc, RPC: Remote Procedure Call Protocol Specification, Version 2,IETF RFC-1057, Jun. 1988.

(56) References Cited

OTHER PUBLICATIONS

Mimosa Systems: Mimosa Architecture Internet, [Online] Oct. 29, 2004, 3 pages, XP002519438 Retrieved from the Internet: URL:http://web.archive.org/web/20041029172122/www.mimosasystems.com/arch.htm> [retrieved on Mar. 11, 2009].
Moy, J., "OSPF Version 2," Network Working Group, Proteon, Inc., Jul. 1991.
National Technical Information Service, Wideband Integrated Voice/Data Technology, ADA132284, Mar. 31, 1983, Massachusetts Inst. of Tech., Lexington, Lincoln Lab.
Neil Wilkinson, "Next generation network services" chapter 12, Internet-based Services, copyright 2002, pp. 155-166.
Neilson, Rob, et al., "A Discussion of Bandwidth Broker Requirements for Internet2 Qbone Deployment," Internet2 Qbone BB Advisory Council, Version 0.7, pp. 1-30, Aug. 1999.
Pan, Ping, et al., "Diameter: Policy and Accounting Extension for SIP," Internet Engineering Task Force, Internet Draft, pp. 1-17, Jul. 31, 1998.
Phone+International, "Telenor Global Services to Route International Calls Through ITXX," http://www.phoneplusinternational.com/hotnews/19h5843.html (Sep. 2001).
Pulver, Jeff, "The internet telephone tookit," Wiley Computer Publishing, New York, NY, 1996.
Q Xie et al. "Endpoint Name Resolution Protocol (ENRP)". May 2, 2002. Network Working Group. www.ietf.org/proceedings.
Rendleman, John, et al., "ATM Goes Into Orbit . . . While IP Gets Speedy in Space," Communications Week, Mar. 17, 1997, www.commweek.com.
T. Imielinski J. Navas: "RFC 2009: GPS-Based Addressing and Routing" GPS-Based Addressing and Routing, XX, XX, Nov. 30, 1996, pp. 1-27, XP002131778.
The Wall Street Journal article on: "MCI's New Service for Corporate Use Sets 1 Line for Net, Phone," pp. B16, Jan. 30, 1997.
"Carriers Improve Net Management Services", Communication Week, May 2, 1994, p. 74.
"New software platform enhances network management capabilities . . . ", Business Wire, Sep. 28, 1995 p. 1-2.
"Rec. H.323", Visual Telephone Systems and Equipment for Local Area Networks which provide a Non-guaranteed Quality of Service, 1996.
"Rec. Q.1211", Introduction to the Intelligent Network Capability Set I, 1993.
"Support of Packet Mode Terminal Equipment by an ISDN," ITU-T Recommendation X.31, 67 pages, Nov. 1995, International Telecommunication Union, Geneva Switzerland.
"Vocaltec Introduces the Internet Phone Telephony Gateway Linking Traditional and Internet Telephone Networks" VocalTec, Mar. 8, 1996.
A. R . Modaressi and R. A. Skoog, Signaling System No. 7 : A Tutorial, IEEE Comm. Mag., Jul. 1990, pp. 19-35.
Bestavros, A. et al., "Distributed Packet Rewriting" In Proceedings of the International Conference on Network Protocols (1997) 13 pages.
Burch, B., "AT&T, MCI to release new management tools", Network World, Jan. 17, 1994, p. 19.
C. Gerety. HP Softbench: A new generation of software development tools. Technical Report SESD-89-25, Hewlett-Packard Software Engineering Systems Division, Fort Collins, Colorado, Nov. 1989.
D. Dean Java Security: Browsers and Beyond, 1997 [online] Available: http://ftp.cs.princeton.edu/sip/pub/internetbeseiged.html.
D. Garlan, G.E. Kaiser, and D. Notkin. Using tool abstraction to compose systems. IEEE Computer, 25(6), Jun. 1992.
DellaFera, Eichin, French, Jedlinsky, Kohl and Sommerfeld, The Zephyr Notification Service, Proceedings USENIX Winter 1988, Dallas Texas, pp. 213-219.
European Computer Manufacturers Association (ECMA), Computer-Supported Telecommunications Applications, ECMA Technical Report TR/52, Jun. 1990.
Francois Fluckiger: "Multimedia Over the Internet" Proceedings of the European Conference on Multimedia Applications, Services and Techniques, 2001.
Frivold, T.J. et al., "Extending WWW for Synchronous Collaboration," Computer Networks and ISDN Systems, vol. 28, No. 28, Dec. 1995, pp. 69-75.
Gadde, S. et al., "Web Caching and Content Distribution: A View From the Interior" Computer Communications (2001) 12 pages.
Gelernter, David, and Arthur J. Bernstein. "Distributed communication via global buffer." Proceedings of the first ACM SIGACT-SIGOPS symposium on Principles of distributed computing. ACM, 1982.
H. D'Hooge "The Communicating PC", IEEE Comm. Mag., vol. 34, No. 4, pp. 36-42 1996.
Hisayoshi Inamori "Performance Evaluation of Mutual Overflow Routing for Hierarchical Packet-Switching Networks" Electronics and Communications in Japan, pp. 111-122, Part 1, vol. 71, No. 6 1988.
Hunt, G. et al., "Network Dispatcher: a connection router for scalable Internet services" Computer Networks and ISDN Systems (1998) 11 pages.
ITU-T Draft Recommendation I.373, Network capabilities to support universal personal telecommunication (UPT), Jul. 1992.
ITU-T Recommendation F.850, Principles of universal personal telecommunication (UPT), Mar. 1993.
ITU-T Recommendation Q.766, "Performance objectives in the integrated services digital network application," Mar. 1993.
ITU-T, Introduction to the Intelligent Network Capability Set 1, Rec. Q.1211, Mar. 1993.
K. McCrary. Jtella homepage,http://www.kenmccrary.com/jtella/, 2002.
Mills M. (Mar. 8, 1996). Freebie Heebie-Jeebies: New Long-Distance Calling via the Internet Scares Small Phone Firms. The Washington Post, sec. F. pp. 1-2.
Weiser, The Computer for the Twenty-First Century, Scientific American, Sep. 1991.
Schwartz, Michael, et al., Applying an Information Gathering Architecture to Netfind: A White Pages Tool for a Changing and Growing Internet, Dec. 1993, Revised Jul. 1994, 23 pages.
Hewlett Packard's Response to European Opposition filed by Siemens AG to European Patent EP1207704 dated Dec. 15, 2005, 17 pages.
T. Magendanz et al., Towards "Intelligence on Demand"—On the Impacts of Intelligent Agents in IN, International Conference on Intelligence in Networks, p. 30-34, Nov. 1, 1996.
Carlo A. Licciardi et al, Would you use TINA in your IN based Network? Some feasible scenarios, International Conference on Intelligence in Networks, p. 35-40. Nov. 1, 1996.
G. von der Straten et al., Realization of B-IN Services in a Multinational ATM network, International Conference on Intelligence in Networks, p. 41-46. Nov. 1, 1996.
M. Burke et al., Aggressively Pushing the IN Envelope in TIA, International Conference on Intelligence in Networks, p. 47-51. Nov. 1, 1996.
Yukio Kawanami et al., An Evolvable Appriaoch on IN Capabilities for Emerging Video on Demand Service, International Conference on Intelligence in Networks, p. 52-57. Nov. 1, 1996.
K. Ravindran, Local Number Portability—The IN Way, International Conference on Intelligence in Networks, p. 59-64. Nov. 1, 1996.
Ronald T. Crocker, Modifying the IN Architecure to Further Support Mobile Communication Services, International Conference on Intelligence in Networks, p. 65-70. Nov. 1, 1996.
Minoru Aramoto et al., Intelligent Network Evolution for Global Services—Handling of Service Data—, International Conference on Intelligence in Networks, p. 77-82. Nov. 1, 1996.
Armin Eberlein et al., Tools for Requirements Capture, Formal Specification and Validation of IN Services, International Conference on Intelligence in Networks, p. 84-89. Nov. 1, 1996.
Marie-Pierre Gervais et al., Formalization of Service Creation in Intelligent Network, International Conference on Intelligence in Networks, p. 90-95. Nov. 1, 1996.
Bernhard Steffen et al., Service Creation; Formal Verification and Abstract Views, International Conference on Intelligence in Networks, p. 96-101. Nov. 1, 1996.

(56) References Cited

OTHER PUBLICATIONS

M. Pucko et al., Integration of Formal and Informal Approach to IN Services Specification and Design, International Conference on Intelligence in Networks, p. 102-106. Nov. 1, 1996.
M. Yoshimi et al., Data transfer between SDFs without interrupting service execution, International Conference on Intelligence in Networks, p. 108-113. Nov. 1, 1996.
O. Makhrovskiy et al., Complex of Software Tools for Intelligent Network Optomizations, Dimensioning and Planning, International Conference on Intelligence in Networks, p. 114-119. Nov. 1, 1996.
Fumio Nitta et al., Semi-Automated Test Data Generation and Test Result Examination for Testing of IN Service Software, International Conference on Intelligence in Networks, p. 120-125. Nov. 1, 1996.
Marc Vincent, IN Service implementation in practice: a system integration point of view, International Conference on Intelligence in Networks, p. 126-129. Nov. 1, 1996.
Manfred Reitenspeis, Providing Highly Available Computer Systems for Telecommunication Applications, International Conference on Intelligence in Networks, p. 130-135. Nov. 1, 1996.
Bertrad Nicolas et al., Judicael: an extensible ODBMS for IN Management, International Conference on Intelligence in Networks, p. 156-161. Nov. 1, 1996.
Raul Oliviera et al., From Intelligent Agents towards Management by Request, International Conference on Intelligence in Networks, p. 162-167. Nov. 1, 1996.
Junya Akiba et al., Intelligent Network Call Model for Controlling B-ISDN, International Conference on Intelligence in Networks, p. 169-174. Nov. 1, 1996.
Hee Jin Lim et al., A Design of Centralized Call Model for Intelligent Network and B-ISDN Integration, International Conference on Intelligence in Networks, p. 175-180. Nov. 1, 1996.
Lucia Vezzoli et al., Intelligent Mobile Video On Demand, International Conference on Intelligence in Networks, p. 181-186. Nov. 1, 1996.
Jose Eduardo Martins et al., The Brazilian Intelligent Network Platform Challenges and Results, International Conference on Intelligence in Networks, p. 136-141. Nov. 1, 1996.
Malcolm Hayes, Managing the Future Intelligent Network, International Conference on Intelligence in Networks, p. 143-145. Nov. 1, 1996.
D. Hamuro et al., A Study on a Software Structure of Service Operations Systems and its Performance Evaluation, International Conference on Intelligence in Networks, p. 146-151. Nov. 1, 1996.
Michel Picard, Service Creation for Service Management and Customer Control, International Conference on Intelligence in Networks, p. 152-155. Nov. 1, 1996.
Kazuhiko Takagi et al., Service Creation and Test Environment for Intelligent Network, International Conference on Intelligence in Networks, p. 188-193. Nov. 1, 1996.
W.D. Bartter et al., Service Creation and Service Management in a Multivendor Intelligent Network, International Conference on Intelligence in Networks, p. 194-199. Nov. 1, 1996.
B. Renard et al., An SDL/MSC Environment for Service Interaction Analysis, International Conference on Intelligence in Networks, p. 200-205. Nov. 1, 1996.
Potted History of the WEBIN Cases in the context of ENUM, dated Jun. 2008.
IBM Technical Disclosure Bulletin, "Workstation Communications System", vol. 37, No. 9, Sep. 1994, pp. 101-104.
S. Harris, et al., "Intelligent Network Realization and Evolution: CCITT Capability Set 1 and Beyond," International Switching Symposium, Yokohama, Japan, Diversification and Integration of Networks and Switching Technologies Towards the 21st Century, Oct. 25-30, 1992, Proceedings vol. 2, p. 127-131.
Pete N. Martin, Service Creation for Intelligent Networks: Delivering the Promise, International Conference on Intelligence in Networks, p. 206-209. Nov. 1, 1996.
Bernard Vilain, Service Creation: tools expectation and service life cycle, International Conference on Intelligence in Networks, p. 210-215. Nov. 1, 1996.
Arne Folkestad et al., On Load Control for Service Data Points; International Conference on Intelligence in Networks, p. 217-222. Nov. 1, 1996.
Terje Jensen et al., Planning Intelligent Networks, International Conference on Intelligence in Networks, p. 223-228. Nov. 1, 1996.
Kwang-Jae Jeong et al., Effective Overload Prevention and Control for Traffic Management in Intelligent Network, International Conference on Intelligence in Networks, p. 229-234. Nov. 1, 1996.
Haitao Tang et al., The Adaptive Resource Assignment and Optimal Utilization of Multi-Service SCP, International Conference on Intelligence in Networks, p. 235-240. Nov. 1, 1996.
Hing Fai (Louis) Chong et al., A Hybrid Approach to Call Party Handling, International Conference on Intelligence in Networks, p. 241-246. Nov. 1, 1996.
Wataru Inoue et al., Proposal of Computer Telephony System using Advanced Call-connection Method, International Conference on Intelligence in Networks, p. 248-253. Nov. 1, 1996.
L. Demounem et al., TINA Reference Points, International Conference on Intelligence in Networks, p. 254-259. Nov. 1, 1996.
Han Zuidweg et al., A Distributed CORBA-Based IN Architecture, International Conference on Intelligence in Networks, p. 260-265. Nov. 1, 1996.
Jean Claude Samou et al., Experiences with a Constraint Based Approach for Network Partitioning, International Conference on Intelligence in Networks, p. 266-271. Nov. 1, 1996.
T. Eckhardt et al., Personal Communications Impacts on TINA, International Conference on Intelligence in Networks, p. 272-276. Nov. 1, 1996.
John Hindle, The Future Growth of PCS: Providing Effective Intelligent Network Solutions, International Conference on Intelligence in Networks, p. 278-283. Nov. 1, 1996.
D.F. Bjornland et al., IN Architectural Options for Handling Calls to CTM Users, International Conference on Intelligence in Networks, p. 284-288. Nov. 1, 1996.
Kimmo Raatikainen et al., Mobility in the Intelligent Network Architecture, International Conference on Intelligence in Networks, p. 289-294. Nov. 1, 1996.
Cristina Ciancetta et al., UMTS in the ACTS Programme: the EXODUS Project, International Conference on Intelligence in Networks, p. 295-300. Nov. 1, 1996.
Christian Chabernaud et al., The Intelligent Network: an essential enhancement of GSM, International Conference on Intelligence in Networks, p. 301-306. Nov. 1, 1996.
David Ludlam, Reflections Intelligent Networks Yesterdym Today and Tomorrow, International Conference on Intelligence in Networks, p. 308-311. Nov. 1, 1996.
Masatoshi Kawarasaki et al., NTT's Open Network Architecture for Intelligent Network, International Conference on Intelligence in Networks, p. 312-317. Nov. 1, 1996.
Jan Ragnarsson, Using Business Cases to Justifyy in Service Provision, International Conference on Intelligence in Networks, p. 318-321. Nov. 1, 1996.
Frank Kraft-Kugler et al., Integrating Operator Assistance into the IN Architecture, International Conference on Intelligence in Networks, p. 322-326. Nov. 1, 1996.
B.B. Sud et al., Justification for Intelligence in Network for a Facilities Based International Wholesale Carrier, International Conference on Intelligence in Networks, p. 327-332 Nov. 1, 1996.
F. Bosco et al., Services Node: what we learnt from a field trial, International Conference on Intelligence in Networks, p. 333-337. Nov. 1, 1996.
Hideki Sakurai et al., Inter-module Connections in Distributed-processing Service Control Points in the Advanced Intelligent Network and Testing of Associated Hardware, International Conference on Intelligence in Networks, p. 339-340. Nov. 1, 1996.
Paolo Coppo et al., New IN products: how to find your way around the new technologies, International Conference on Intelligence in Networks, p. 341-342. Nov. 1, 1996.
Kenji Takeda et al., PersonalWare: A Middleware for Intelligent Personal Network Services, International Conference on Intelligence in Networks, p. 343-344. Nov. 1, 1996.

(56) References Cited

OTHER PUBLICATIONS

Evelina Pentcheva, Intelligent Network Services Descirbred as Database Interactions, International Conference on Intelligence in Networks, p. 345-346. Nov. 1, 1996.
Noriyuki Abe et al., Autonomous Multi-media Load Control of Network by Distributed and Cooperative Multi-server System, International Conference on Intelligence in Networks, p. 347-348. Nov. 1, 1996.
Yves Bretecher, A multi function switch centered on the IN, International Conference on Intelligence in Networks, p. 349-350. Nov. 1, 1996.
A. Campos-Flores et al., Prototyping TINA based services—the ALCIN project, International Conference on Intelligence in Networks, p. 351-352. Nov. 1, 1996.
RFC #1486 (An Experiment in Remote Printing), Jul. 1993.
Plaintiffs Opening Claim Construction Brief filed Mar. 29, 2013 in *Comcast IP Holdings I, LLC v. Sprint Communications Company L.P., et al*, District of Delaware, Case No. 12-205-RGA, 25 pages.
Non Final Office Action—US 90/012,863—Mailing Date: Aug. 27, 2013.
"Using ICC for portable network independent JAIN SLEE Services," available online at <http://jainslee.org/application/sleeandjcc.html>. Apr. 10, 2004.
*Comcast IP Holdings I* Vs. *Sprint Communications*; C.A. No. 1:12-cv-00205-RGA; Expert report of Dr. Ray Mercer regarding the invalidity of Comcast's patents, Sep. 20, 2013.
*Comcast IP Holdings I* Vs. *Sprint Communications*; C.A. No. 1:12-cv-00205-RGA; Rebutal expert report of Dr. Ray Mercer regarding the invalidity of Comcast's patents, Nov. 8, 2013.
*Comcast IP Holdings I, LLC v.Sprint Communications Company L.P. et al*. Claim Construction Order. Filed Aug. 30, 2013.
Mockapetris, P., RFC#1035 (Domain Names—Implementation and Specification), Nov. 1987, 56 pages.
Rose, M., RFC#1703 (Principles of Operation for the TPC.INT Subdomain: Radio Paging—Technical Procedures), Oct. 1994, 10 pages.
Schwartz, Michael, Netfind Support for URL-Based Search Customization, Jun. 28, 1994, 5 pages.
Rosenberg, J., et al., "SIP: Session Initiation Protocol," Network Working Group, The Internet Society, Jun. 2002.
Lottor, Mark. RFC 1033, "Domain administrators operations guide." (1987).
Sinnreich, H., et al., "Interdomain IP communications with QoS, authorization and usage reporting," http:www.cs.columbia.edu/-hgs/sip/drafts/draft-sinnreich-sip-qos-osp, Feb. 2000.
St. Johns, Mike. "Authentication Server," RFC 931, Aug. 1985, pp. 1-5.
*Comcast IP Holdings I, LLC v. Sprint Communications Company L.P. et al.* Gregory J. Lipinski Deposition Transcript, dated Aug. 9, 2013.
Non Final Office Action—US 90/012,849—Mailing Date: Sep. 4, 2013.
Miller, Mark A., "Troubleshooting TCP/IP: Analyzing the Protocols of the Internet," M.and.T Books, pp. 365-389, 1992.
M. Andreasson et al., A server integrating Computer Telephony amd Intelligent Network, International Conference on Intelligence in Networks, p. 7-12 Nov. 1, 1996.
Yoshihiro Niitsu et al., Customization Methodology of Advanced IN Services for a large Number of Subscribers, International Conference on Intelligence in Networks, p. 13-18. Nov. 1, 1996.
Wolfgang Lautenschlager et al., Routing Service for the Implementation of Number Portability, International Conference on Intelligence in Networks, p. 19-24. Nov. 1, 1996.
Soren Wallinder, Universal Personal Telecommunication, UPT, implementation and base for new services, International Conference on Intelligence in Networks, p. 25-28. Nov. 1, 1996.
Non Final Office Action—US 90/012,846—Mailing Date: Aug. 9, 2013.

Swinehart, D.C., et al., "Adding Voice to an Office Computer Network," IEEE Global Telecommunications Conference, San Diego, CA, Nov. 28-Dec. 1, 1983.
*Comcast IP Holdings I, LLC v. Sprint Communications Company L.P., et al*. Claim Construction, dated Aug. 16, 2013.
"Prior Art on Verizon's VoiP Patents", <hllp:l/www.lechdirt.com/articles/20070417/005814.shtml>, Apr. 17, 2007, 9 pages.
"Vocaltec's Telephony Gateway Software Captures 1996 Product of the Year Honors from Computer Telephony Magazine", Dec. 18, 1996, 2 pages.
"VocalTec's Telephony Gateway—The Ultimate Internet Telephony Solution?", Computer Telephony, Sep. 1996, p. 30, 3 pages.
"Web-On Call Voice Browser Redefines Access to the Web", The Netphonic Press Release (Mar. 1996).
Ahmadi, et al., NBBS Traffic Management Overview, IBM Systems Journal, vol. 34, No. 4, 1995, pp. 640-648. (Dec. 1995).
Aidarous, et al., "The Role of the Element Management Layer in Network Management", IEEE Network Operations and Management Symposium, Feb. 14-17, 1994, pp. 59-70.
Alvestrand, et al., "Mapping between X.400 and RFC-822 Message Bodies", RFC1495, <http://tools.ielf.org/html/rfc1495>, Aug. 1993, 12 pages.
Anand, et al., "Accounting Architecture for Cellular Networks", 1996 IEEE, pp. 184-189. (Feb. 1996).
Another Day, Another Set of Prior Art Discovered Against Verizon's VoiP Patents, <http://www.techdirt.com/articles/20070423/094554.shtml>, Apr. 23, 2007, 5 pages.
ANSI, Signalling System No. 7 (SS7), General Information, ANSI, Jun. 1992, 78 pages.
Arango, et al., Guaranteed Internet Bandwidth, IEEE Nov. 1996, pp. 862-866.
Ash, et al., "Design & Optimization of Networks with Dynamic Routing", The Bell System Technical Journal, vol. 60, No. 8, Oct. 1981, pp. 1787-1820.
Atkins, et al., "Integrated Web and Telephone Service Creation", Bell Labs Technical Journal, 1997, pp. 19-35.
Bakre, et al., "M-RPC: A Remote Procedure Call Service for Mobile Clients", 1995 ACM 0-89791-814-S/95/10, pp. 97-110. (Nov. 1995).
Basinger, et al., "The 5ESS Switching System: System Development Environment," AT&T Technical Journal, Jul. 1985, 18 pages.
Bauer, et al., "The 5ESS Switching System: System Test, First-Office Application, and Early Field Experience," AT&T Technical Journal, Jul. 1985, 20 pages.
Bellamy, "Digital Telephony", John Wiley & Sons, Inc., 1982, pp. vii-ix, 9-14 and 238-240.
Bellcore Document GR-1428-CORE, CCS Network Interface Specification (CCSNIS), Supporting Toll-Free Service, A Module of CCSNIS, FR-905, May 1995, 93 pages.
Berners-Lee, "Universal Resource Identifiers in WWW", RFC 1630, Jun. 1994, 23 pages.
Berners-Lee, et al., "Hypertext Transfer Protocol—HTTP/1.0," HTTP Working Group Internet Draft (Oct. 1995).
Biala, "Mobile Radio and Intelligent Networks", Principles and Realization of Mobile Communication, 2nd Revised Edition, 1995, pp. 42-44, 49-51, 53, 82-83 and 341.
Black, "OS I: A Model for Computer Communications Standards", Prentice-Hall, Inc., 1991, pp. 157-201. (Oct. 1990).
Bohn, et al., "Mitigating the Coming Internet Crunch: Multiple Service Levels via Precedence", Journal of High Speed Network, vol. 3, Nov. 4, 1994, pp. 335-349.
Bonetti, et al., "Distribution of RFC 1327 mapping rules via Internet DNS: the INFNet distributed gateway system," Computer Networks and ISDN Systems, vol. 27 No. 3 pp. 461-469 (Dec. 1994).
Borum, et al., "The 5ESS Switching System: Hardware Design," AT&T Technical Journal, Jul. 1985, 21 pages.
Braden, et al., "Integrated Services in the Internet Architecture: An Overview", RFC 1633, Jul. 1994, 28 pages.
Braun, et al., "A Framework for Flow-Based Accounting on the Internet", Sep. 1993, 5 pages.
Byrne, et al., "The 5ESS Switching System: Applications Planning," AT&T Technical Journal, Jul. 1985, 23 pages.
Carney, et al., "The 5ESS Switching System: Architectural Overview, "AT&T Technical Journal, Jul. 1985, 18 pages.

(56) References Cited

OTHER PUBLICATIONS

Carrel, "The TACACS+ Protocol, Version 1.75", Network Working Group, Lol Grant, Internet-Draft Systems, Oct. 1996, draft-grant-tacacs-OO.txt, 64 pages.
Chang, et al., "A Service Acquisition mechanism for the ClienUService Model in Cygnus", IBM Canada Laboratory Technical Report TR 74.059, 1991, pp. 323-345. (May 1991).
Chang, et al., "Rapid Deployment of CPE-Based Telecommunications Services", IEEE-Globecom, vol. 2, pp. 876-880, Nov. 1994.
Chapman, et al., "Overall Concepts and Principles of TINA Version 1.0", Telecommunications Information Networking Architecture Consortium, TINA-C Deliverable. Date of Issue: Feb. 17, 1995, 65 pages.
Chapter 5: The CMA System, VoiP Forum, Oct. 11, 1996, 38 pages.
Chen, et al., "ATM and Satellite Distribution of Multimedia Educational Courseware", IEEE, Jun. 1996, pp. 1133-1137.
Cheriton, "Dissemination-Oriented Communication Systems: Final Report", Nov. 26, 1996, 18 pages.
Cheshire, et al., "Internet Mobility 4×4", ACM 1996, <www.acm.org.>, pp. 1-12. (Aug. 1996).
Civanlar, et al., "FusionNet: Joining the Internet & Phone Networks for Multimedia Applications", 1996, pp. 431-432. (Nov. 1996).
Clark, et al., "Supporting Real-Time Applications in an Integrated Services Packet Network: Architecture and Mechanism", 1992 ACM 0-89791-526-7/92/0008/0014, pp. 14-26. (Oct. 1992).
CMA IPR Additions, Nov. 17, 2008, 3 pages.
Cobbold, et al., "Enhancements for Integrated Wireless Personal Communications Over Metropolitan Area Networks", IEEE, Apr. 1996, pp. 1370-1376.
Cohen, Specifications for the Network Voice Protocol (NVP), Jan. 29, 1976, 33 pages.
Comer, "Internetworking with TCP/IP vol. 1: Principles, Protocols and Architecture", Third Ed., Prentice Hall, 1995, pp. 127-578.
Comer, Internetworking with TCP/IP vol. 1: Principles, Protocols, Architecture, Prentice-Hall, Inc., 1991, pp. 329-330.
Comer, et al., "Uniform Access to Internet Directory Services," Computer Communication Review, vol. 20, No. 4, pp. 50-59 (Sep. 1990).
Crocker, "RFC822—Standard for the Format of ARPA Internet Text Messages", RFC 822 Internet: <http://www.faqs.org/rfcs/rfcB22.html>, pp. 1-42 (Aug. 13, 1982).
Crowcroft, et al., "Pricing Internet Services", 1996, 17 pages.
CT and the 'Net, "Audio and Video Over the Internet", Mar. 1996, 22 pages.
CT and the 'Net, "Supercharging the Web with Computer Telephony", Mar. 1996, 18 pages.
Decker, "New Internet/Telecom Product/Technology Wanted", <http://groups.google.com/group/comp.dcom.lelecom/browse_thread/lhread/1227ba19866a3426/2 . . . >, Sep. 22, 1995, 3 pages.
Deep Throat Shoots Verizon Patent Out of the Water, <http://blog/tmcnel.com/blog/tom-keating/vonage/deep-throat-shoots-verizon-patent-out-of-the-water . . . >, 8 pages, Apr. 19, 2007.
Delatore, et al., "The 5ESS Switching System: Factory System Testing," AT&T Technical Journal, Jul. 1985, 22 pages.
Delatore, et al., "The 5ESS Switching System: Operational Software," AT&T Technical Journal, Jul. 1985, 28 pages.
Diehl, "Data's New Voice", Byte, Sep. 1996, pp. 129-135.
Duan, et al., "Efficient Utilization of Multiple Channels Between Two Switches in ATM IN atm Networks", IEEE Conference on Communications, Jun. 1995, pp. 1906-1911.
Dynamic Address Mappings for Basic Call Management within the VoiP IA 1.0, Jun. 16, 1997, 5 pages.
Eckardt, T. , et al., "On the personal communications Impacts on Multimedia Teleservices," Technical University of Berlin, pp. 435-449 (1994).
Edell, et al., abstract, "Billing Users and Pricing for TCP", Journal on Selected Areas in Communications, vol. 13, Issue 7, Sep. 1995, 2 pages.
Ejiri, "For Whom the Advancing Service/Network Management", IEEE Network Operations and Management Symposium, Feb. 14-17, 1994, pp. 422-433.

El-Gendy, H., et al., "Computer-Supported Routing for Intelligent Networks and Personalized Wired Communications", IEEE, Nov. 1994, pp. 1027-1033.
Elia, et al., "Skyplex: Distribution Up-Link for Digital Television via Satellite", Apr. 1996, pp. 305-313.
Elixmann, et al., "OpenSwitching—Extending Control Architectures to Facilitate Applications", International Switching Symposium, vol. 2, Apr. 23, 1995, pp. 239-243.
Ely, "The Service Control Point as a Cross Network Integrator", Apr. 1996, pp. 1-8.
Email from Dr. Schulzrinne regarding publication of SCIP, Oct. 10, 1995, 1 page.
Eriksson, "Mbone: The Multicase Backbone", Communications of the ACM, vol. 57, No. 8, Aug. 1994, pp. 54-60, 13 pages.
Esaki, et al., "Abstraction and Control of Transport Network Resources for Intelligent Networks", Electronics & Communications in Japan: Part 1—Communications, vol. 76, No. 1, Jan. 1993.
Estrin, et al., "Design Considerations for Usage Accounting and Feedback in Internetworks", 1990, 12 pages. (Oct. 1990).
Everhart, et al., "New DNS RR Definitions", RFC 1183, Oct. 1990, 11 pages.
Everhart, et al., "RFC-1183—New DNS RR definitions", Internet: <http://www.faqs.org/rfcs/rfc1183.htmi>, Oct. 1990, pp. 1-9.
Fang, "Building an Accounting Infrastructure for the Internet", IEEE Nov. 1996, pp. 105-109.
Feinmann, "VIC Computer Telephony", Computer Telephony, Mar. 1996, 3 pages.
Finseth, "An Access Control Protocol, Sometimes Called TACACS", University of Minnesota, Jul. 1993 Network Working Group, Request for Comments: 1492, 22 pages.
T. A. Anschutz, "A historical perspective of CSTA", IEEE Comm. Mag., vol. 34, pp. 30-35 1996.
Teodoro, G. et al., "Load Balancing on Stateful Clustered Web Servers" IEEE (2003) 9 pages.
Tohru Kohashi, et al., "Integrated-Circuit and Packet-Switching Applications to a Loop System for Local Area Networks" IEEE Journal on Selected Areas in Communications, pp. 574-583, vol. sac-3, No. 4, Jul. 1985.
Waldo, Wollrath, Wyant and Kendall, Events in an RPC Based Distributed System, SunLabs Technical Report SMLI TR-95-47, Nov. 1995.
Want, Schilit, Adams, Gold, Petersen, Goldberg, Ellis and Weiser, The ParcTab Ubiquitous Computing Experiment, Xerox PARC Computer Science Laboratory Tech Report CSL-95-1, Mar. 1995.
Wrigley, C. "Design Criteria for Electronic Market Servers" Electronic Markets (1997) pp. 12-16.
Ying-Dar Lin et al., "Direct Web Switch Routing with State Migration, TCP Masquerade, and Cookie Name Rewriting," Globecom 2003, IEEE Global Telecommunications Conference, Dec. 2003, IEEE, CP010677300, pp. 3663-3667.
V. Rajendra, D. Jagannathan and L. S. Baum, editors. Blackboard Architectures and Applications. Academic Press, Boston, 1989.
W. D. Ambrosch , A. Maher, and B. Sasscer, Eds., The Intelligent Network,Springer Verlag 1989.
IPv6—The New Internet Protocol, Christian Huitema, Prentice Hall 1996.
J. S. Quarterman. The Matrix: Computer Networks and Conferencing Systems Worldwide. Digital Press, Bedford, MA, 1990.
S. Carl-Mitchell and J. S. Quarterman. The Internet Connection: System Connectivity and Configuration. Addison Wesley, Reading, MA, 1994. ISBN 0-201-54237-4.
Curran, S. "Why your Telco Can't Ignore the Internet." Rural Telecommunications 14 (1995): 30-41.
Lee et al., "Supporting Multi-User, Multi-Applet Workspaces in CBE", Computer Supported Cooperative Work 1996, Cambridge, MA.
Banerjea, et al., "Designing QoSMIC: A Quality of service Sensitive Multicast Internet Protocol", Internet-Draft, Inter-Domain Multicast Routing (Apr. 1998).
"A Call to Phones," Wired Magazine, Issue 4.03, http://www.wired.com/wired/archive/4.03/updata.html (Mar. 1996).

(56) References Cited

OTHER PUBLICATIONS

*Comcast IP Holdings I, LLC* v. *Sprint Communications Company L.P. et al.*; Expert report of Dr. Ray Mercer regarding the invalidly of Comcast patents, Sep. 20, 2013.
Cady et al., "Mastering the Internet", Sybex Inc., Alameda, CA 1996.
Leconte, A., and M. Sevcik. "Reshaping the IN for Multimedia: Is there a life after Internet." International Conference on Intelligence in Networks, p. 2-6. Nov. 1, 1996.
"Internet Access: Internet Phone-to-Phone Technology Now a Reality . . . ", Edge Publishing, Aug. 12, 1996.
"Internet Phone Calls are Cheap but Limited", New Media Markets, Feb. 23, 1995, Financial Times Business Information, Ltd., ISSN:0265-4717.
"Internet Telephony Seems to be Evolving East, But is There Anyone on the Line?", Computergram International, Aug. 19, 1996, No. 2980, ISSN: 0268-716X.
"Internet's International Phone Calls are Cheap But Limited", Telecom Markets, Financial Times Business Information ID, Mar. 2, 1995, ISSN: 0267-1484.
"Netspeak Corporation Introduces Webphone, Industry's First Internet-Based Telephony Solution for Business Users," PC Forum, Apr. 9, 1996.
Everhart, C., et al., RFC#1183 (New DNS RR Definitions), Oct. 1990, 12 pages.
Albitz, Paul, et al., "DNS and BIND" (excerpted), Oct. 1992, Revised Mar. 1993 and Jul. 1994, 53 pages.
"Objectivity/DB in telecommunications applications", an objectivity , Inc. White Paper, copyright 2001, 8 pages.
"Overview", NetSpeak Corporation, Apr. 8, 1997, printed from Edgar Online.
Annual Report to the Defense Communications Agency, "Defense Switched Network Technology and Experiments Program", Massachusetts Institute of Technology Lincoln Laboratory, Oct. 1, 1982-Sep. 30, 1983, issued Sep. 30, 1985.
Aspnes, James, et al., "On-Line Routing of Virtual Circuits willi Applications to Load Balancing and Machine Scheduling," pp. 486-504, Journal of the ACM, vol. 44, No. 3, May 1997.
Bethoney, Herb, "HAHTSite Gives Pros Everything They Need," PC Week, p. 36, Mar. 10, 1997.
Bonett, Monica, "Personalization of Web Services: Opportunities and Challenges", Date: Jun. 22, 2001, http://www.ariadne.ac.uk/issue28/personalization/.
Chun-Li Lin et al. "Three-party Encrypted Key Exchange: Attacks and a Solution". May 2000.
Cohen et al., "A Network Voice Protocol NVP-11", Lincoln Laboratory Massachusetts Institute of Technology, Apr. 1, 1981, ISI/RR-83-23.
Frezza, "The Internet Phone is Poised to Conquer", Communications Week, Dec. 11, 1995, http://techweb.cmp.com/cw/current.
Garrahan, James J., et al., "Intelligent Network Overview," IEEE Communications Magazine, vol. 31, No. 3, pp. 30-36, Mar. 1993.
Gross, "Proceedings of the Oct. 15-17, 1988 Joint Meeting of the Internet Engineering and Internet Architecture Task Forces", Fourth IETF, The Mitre Corporation.
Gys, L, et al., "Intelligence in the Network," Alcatel Telecommunications Review, pp. 13-22, 1st Quarter 1998.
Haiges, S. "JAIN/SLEE: EJB for Communications, Opening the telecommunications world for Java," http://java.sys-con.com/read/46230.htm, Sep. 7, 2004. Not Prior Art.
Schulzrinne et al., "Simple Conference Invitation Protocol", Internet Engineering Task Force, draft-ieft-mmusic-sip-00, Feb. 22, 1996.
Handley et al., "SIP: Session Initiation Protocol", Internet Engineering Task Force, Internet Draft, Jul. 31, 1997, draft-ietf-mmusic-sip-03.txt, Jul. 31, 1997.
Handley, M., et al., "SIP: Session Initiation Protocol," Internet Engineering Task Force, pp. 1-30, Dec. 2, 1996.
Henk Uijterwaal and Olaf Kolkman, "Internet Delay Measurements Using Test Traffic Design Note", RIPE NCC, http://www.ripe.net/test-trafic/Notes/RIPE-158/ (Jun. 1997).
Henk Uijterwaal, "Internet Delay Measurements Using Test Traffic Installing and Hosting a Test Box", RIPE NCC, http://www.ripe.net/test-traffic/Notes/RIPE-168/note.html (Mar. 1998).
JAIN Integrated network APIs for the Java Platform, A white paper describing the JAIN objectives, overall technical architecture and program structure, Nov 2000, 23 pages.
Keiser et al., "Digital Telephony and Network Integration", 1995, Chapman Hall, Second Edition, pp. 426-428.
Kelly, Katy, "Up to their laptops in packed powder: Mountaintop office keeps skiers in touch," USA Today, Final Edition, News, pp. 1A, Feb. 21, 1997.
Lantz, Keith A., "Towards a universal directory service," Operating Systems Review, vol. 20, No. 2, Apr. 1986.
McConnell, Brian, "How to Build an Internet PBX", Pacific Telephony Design, printed from http://www.phonezone.com/ip-phone.htm Mar. 5, 1997.
Mills, M. (Jan. 23, 1996) "It's the Net's Best Thing to Being There: With Right Software, Computer Becomes Toll-Free Telephone", The Washington Post, sec. C, pp. 1,5.
J.B. Postel. Simple Mail Transfer Protocol. Req. for Com. 821, USC Information Sci. Institute, Aug. 1982.
Jain, Surinder K. "Evolving existing narrowband networks towards broadband networks with IN capabilities." Intelligent Network Workshop, 1996. IN'96., IEEE. IEEE, 1996.
Johnson, May. "Number Portability (NP) Using the Intelligent Network." Intelligent Network Workshop, 1996. IN'96., IEEE. IEEE, 1996.
*Comcast IP Holdings I, LLC* v. *Sprint Communications Company L.P., et al.* Joint Appendix Accompanying the Parties' Joint Claim Construction Brief, filed Jun. 4, 2013.
*Comcast IP Holdings I, LLC* v. *Sprint Communications Company L.P., et al.* Parties' Joint Claim Construction Brief, filed May 31, 2013.
*Comcast IP Holdings I, LLC* v. *Sprint Communications Company L.P., et al.* Joint Claim Construction Chart, filed Mar. 1, 2013.
Jordan, Rob. "Why is the intelligent peripheral so stupid?." Intelligent Network Workshop, 1996. IN'96., IEEE. IEEE, 1996.
K. Harrenstien, M. Stahl and E. Feinler. NICName/Whois. Req. for Com 954, SRI International, Oct. 1985.
Kang, Myeongho. "Design of service feature interaction manager in AIN." Intelligent Network Workshop, 1996. IN'96., IEEE. IEEE, 1996.
Kawahara, R., and T. Asaka. "Overload control for intelligent networks based on an estimation of maximum number of calls in a node." Intelligent Network Workshop, 1996. IN'96., IEEE. IEEE, 1996.
Kawanami, Yukio. "IN platform for DAVIC video on demand service." Intelligent Network Workshop, 1996. IN'96., IEEE. IEEE, 1996.
Kiwata, Kazuhiro. "A navigation service in TINA." Intelligent Network Workshop, 1996. IN'96., IEEE. IEEE, 1996.
Klabunde, Karin. "Multimedia session management." Intelligent Network Workshop, 1996. IN'96., IEEE. IEEE, 1996.
Kong, Qinzheng, G. R. A. H. A. M. Chen, and N. O. R. M. Lawler. "Distributed architecture for IN service management." IEEE Intelligent Network Workshop IN'96. 1996.
Kriete, Viola. "A journey through the life of an IN service in a commercial IN system." Intelligent Network Workshop, 1996. IN'96., IEEE. IEEE, 1996.
Kwast, Erik. "An exercise in test generation for telecommunications services." Intelligent Network Workshop, 1996. IN'96., IEEE. IEEE, 1996.
Lias Jr, J. L. "Advanced services management via intelligent access peripherals." Intelligent Network Workshop, 1996. IN'96., IEEE. IEEE, 1996.
London, J. W., et al. "Cost effective Internet access and video conferencing for a community cancer network." Proceedings of the Annual Symposium on Computer Application in Medical Care. American Medical Informatics Association, 1995.
M. Lottor. Internet Growth (1981-1991) Req. for Com. 1296, Network Information Systems Center, SRI Int., Jan. 1992.

(56) References Cited

OTHER PUBLICATIONS

M. McCahill. The Internet Gopher: A Distributed Server Information System. ConneXions—The Interoperability Report, 6(7), pp. 10-14, Interop, Inc, Jul. 1992.
M.D. Schroeder, A.D. Birrell and R.M. Needham. Experience with Grapevine: The Growth of a Distributed System. ACM Trans. Comput. Syst., 2(1), pp. 3-23, Feb. 1984.
M.F. Schwartz and D.C.M. Wood. Discovering Shared Interests Among People Using Graph Analysis of Global Electronic Mail Traffic. Department of Computer Science, University of Colorado, Boulder, Colorado, Feb. 1992. To appera, Communcations of the ACM.
M.F. Schwartz and J.S. Quarterman. The Changing Global Internet Service Infrastructure. Internet Research: Electronic Networking Applications and Policy, 3 (3), pp. 8-25, Fall 1993.
M.F. Schwartz, A. Emtage, B. Kahle and B.C. Neuman. A Comparison of Internet Resource Discovery Approaches. Computing Systems, 5(4), pp. 461-493, Fall 1992.
M.F. Schwartz, D.R. Hardy, W.K. Heinzman and G. Hirschowitz. Supporting Resource Discovery Among Public Internet Archives Using a Spectrum of Information Quality. Proceedings of the Eleventh IEEE International Conference on Distributed Computing Systems, pp. 82-89, Arlington, Texas, May 1991.
M.F. Schwartz. A Measurement Study of Changes in Service-Level Reachability in the Global TCP/IP Internet: Goals, Experimental Design, Implementation, and Policy Considerations. Request for Comments 1273, Department of Computer Science, University of Colorado, Boulder, Colorado, Nov. 1991.
M.F. Schwartz. A Scalable, Non-Hierarchical Resource Discovery Mechanism Based on Probabilistic Protocols, Technical Report CU-CS-474-90, Department of Computer Science, University of Colorado, Boulder, Colorado, Jun. 1990.
M.F. Schwartz. Resource Discovery and Privacy. Internet Society News, 2(1), pp. 16-18, Spr. 1993.
Madureira, M. "The challenge of Brazilian IN national platform." Intelligent Network Workshop, 1996. IN'96., IEEE. IEEE, 1996.
Request for Ex Parte reexamination of U.S. Pat. No. 7,206,304; Apr. 29, 2013.
Grant for Ex Parte reexamination request of U.S. Pat. No. 8,170,008; USPTO; Jun. 6, 2013.
Malis, Andy, David Robinson, and R. Ullmann. Multiprotocol Interconnect on X. 25 and ISDN in the Packet Mode. RFC 1356. BBN Communications, Computervision System Integration, Process Software Corporation, 1992.
McGovern, Michael, and R. Ullmann. "CATNIP: Common Architecture for the Internet." (1994).
Mercando, Anthony D. "Maneuvering on the Internet." Pacing and Clinical Electrophysiology 17.5 (1994): 976-979.
Grant for Ex Parte reexamination request of U.S. Pat. No. 8,189,565; USPTO; Jun. 21, 2013.
Mercouroff, Nicolas. "Migration of IN Towards TINA: A DPE based IN." Intelligent Network Workshop, 1996. IN'96., IEEE. IEEE, 1996.
Mohan, Seshadri, and Ravi Jain. "Two user location strategies for personal communications services." Personal Communications, IEEE 1.1 (1994): 42-50.
Request for Ex Parte reexamination of U.S. Pat. No. 8,189,565; May 6, 2013.
Murch, Alan, and Robin Wrigley. "Open networking in New Zealand." Intelligent Network Workshop, 1996. IN'96., IEEE. IEEE, 1996.
Eric Burger—Declaration in support of Plaintiff's opening claim construction brief—*Comcast IP Holdings I* vs. *Sprint communications*; C.A. No. 1:12-cv-00205-RGA; Mar. 29, 2013.
N.P. Singh and M.A. Gisi, "Coordinating Distributed Objects with Declarative Interfaces," Proc. 1st Int'l. Conf. Coordination, Models, Languages and Apps., Cesena, Italy, 1996.
North American Directory Forum. User Bill of Rights for Entries and Listings in the Public Directory. Req. for Com. 1295, North American Directory Forum, Jan. 1992.

Okamoto, M., and Y. Niitsu. "Service specification description using extended message sequence charts between network and users." Intelligent Network Workshop, 1996. IN'96., IEEE. IEEE, 1996.
Obraczka, Katia, Peter B. Danzig, and S-H. Li. "Internet resource discovery services." Computer 26.9 (1993): 8-22.
*Comcast IP Holdings I* Vs. *Sprint Communications*; C.A. No. 1:12-cv-00205-RGA; Plaintiff's reply claim construction brief; May 10, 2013.
EP02000568.2—Summons to attend oral proceeding—Mailing date: Mar. 1, 2006.
Ostrowski, Martin. "Interdomain Security Issues for IN Based Services." Intelligent Network Workshop, 1996. IN'96., IEEE. IEEE, 1996.
P. Vixie. DNS and BIND security issues. USENIX, 1995.
EP02000568.2—Response to Opposition filed—Mailing date: Dec. 15, 2005.
Peeren, Rene. "IN in the hybrid broadband network: the intelligent web." Intelligent Network Workshop, 1996. IN'96., IEEE. IEEE, 1996.
Patel, et al., "The Multimedia Fax-MIME Gateway", Multimedia, IEEE 1994, vol. 1, Issue 4, pp. 64-70.
Peeren, "The Intelligent Web", IEEE Apr. 1996, vol. 1, 13 pages.
Perret, et al., "MAP: Mobile Assistant Programming for Large Scale Communications Networks", Apr. 1996, pp. 1128-1132.
Petrack, "Backup and Alternate Gatekeepers in H.323 for High Availability, Reliability and Scalability", ITU Telecommunication Standardization Sector, Study Group 16, Ex. 0.2&3/15 Rapporteur Meeting, Feb. 1-21, 1997,; 7 pages.
Platt, "Why IsoEthernet Will Change the Voice and Video Worlds", IEEE Communications Magazine, Apr. 1996, pp. 55-59.
Pontailler, "TMN and New Network Architectures", IEEE Communications Magazine, Apr. 1993, 6 pages.
Raatikainan, Database Access in Intelligent Networks, Proceedings of IFIP TC6 Workshop in Intelligent Networks (proceedings held Aug. 1994): Database Access in Intelligent Networks, University of Helsinki, Department of D; Computer Science, pp. 163-183 (book published May 1995).
Retkwa, "Telephone Politics", Internet World, Jun. 1996, pp. 54-60.
RFC 1034, Nov. 1987, 41 pages.
RFC 1035, Nov. 1987, 49 pages.
RFC#1464, Rosenbaum, Using the Domain Name System to Store Arbitrary String Attributes, May 1993, 5 pages.
Rose, "Principles of Operation for the TPC.INT Subdomain: Radio Paging—Technical Procedures", RFC1569, <http://tool.ielf.org/html/rfc1569>, Jan. 1994, 7 pages.
Rose, "Principles of Operation for the TPC.INT Subdomain: Radio Paging—Technical Procedures", RFC1703, <http://tools.ielf.org/html/rfd1703>, Oct. 1994, 10 pages.
Rose, et al., "An Experiment in Remote Printing", RFC1486, <http://tools/ielf.org/html/rfc1486>, Jul. 1993, 14 pages.
Rose, M., et al., "RFC 1486—An Experiment in Remote Printing" RFC 1486 Internet <http:/ /www.faqs.org/rfcs/rfc1486.html> pp. 1-12 (Jul. 1993).
Rosenberg, et al., "Internet Telephony Gateway Location", In Proc. of IEEE INFOCOM, Mar. 1998, 9 pages.
Sairamesh, et al., "An Approach to Pricing, Optical Allocation and Quality of Service Provisioning in High Speed 17 Packet Networks", Fourteenth Annual Joint conference of the IEEE Computer and Communication Societies, vol. 2, D Apr. 1995, 21 pages.
Schreyer, et al., "Least Cost Call Routing", IEEE Jun. 1996, 7 pages.
Schulzrinne, "Personal Mobility for Multimedia Services in the Internet", IDMS 1996, Mar. 1996, 18 pages.
Schulzrinne, "RFC 1889—RTP: A Transport Protocol for Real-Time Applications", Jan. 1996, 151 pages.
Schulzrinne, "RFC 1890—RTP: Profile for Audio and Video Conferences with Minimal Control", Jan. 1996, 18 pages.
Schulzrinne, "Simple Conference Invitation Protocol", Internet Draft, Feb. 22, 1996, 19 pages.
Schwartz, Nelfind Support for URL-Based Search Customization, Computer Science Department, University of Colorado, Boulder, Nelfind Version 4.3, Jun. 28, 1994, 5 pages, retrieved at <hllp:l/ alumnus.caltec.edu/-whitegl/ D; dala__files/Nelfind.WP.URLs>.

(56) References Cited

OTHER PUBLICATIONS

Sclavos, et al., "Information model: From Abstraction to Application", Feb. 1994, 13 pages.
Sears, "Innovations in Internet Telephony: The Internet as the Competitor to the Pots Network", Innovations in Internet Telephony: The Internet as the Successor to the Pots Network, Feb. 28, 1996, pp. 1-6.
Sebestyen, "What is the Position of 0.2, 0.3/15 on Internet Telephony for the IMTC VoiP Forum Meeting in Seattle", ITU Telecommunication Standardization Sector, Study Group 15, Q.2&3/15 Rapporteur Meeting, Dec. 17-20, 1996, 5 pages.
Serrano, "Evolution of Hybrid Fibre Coaxial Network for Multimedia Interactive Services", British Telecommunications Engineering, Oct. 1996, pp. 249-253.
Sevcik, et al., "Customers in Driver's Seat: Private Intelligent Network Control Point", ISS '95 World Telecommunications Congress, vol. 2, pp. 41-44, 1995.
SG15 Plenary, May 28, 1996, regarding H.323, 82 pages.
Shabana, et al., "Intelligent Switch Architecture", Proceedings of the National Communications Forum, vol. 22, No. 2, Sep. 30, 1988, pp. 1312-1320.
Shafer, et al., "URN Services", Internet: <http://staff.o-cic.org/research/publications/shafer/urn/draft-shafer-uri-urn-resolution-OO.html>, Jun. 1995, pp. 1-10.
Shafer, et al., "URN Services", Internet: <http://staff.o-clc-org.oclc/research/publications/shafer/urn/draft-ietf-uri-urn-resolution-01.html>, Jul. 1995, pp. 1-14.
Sharp, et al., "Advanced Intelligent Networks—Now a Reality", Electronics & Communication Engineering Journal, Jun. 1994, pp. 153-162.
Shockey, "ENUM: Phone Numbers Meet the Net", <hllp:l/www.callcentermagazine.com/article/CTM20010618S0010>, Jun. 18, 2001, 4 pages.
Sibal, et al., "Controlling Alternate Routing in General Mesh Packet Flow Networks", Association of Computing Machinery, 1994, pp. 168-179. (Aug. 1994).
Sisalem, et al., "The Network Video Terminal", IEEE 1996 Proceedings, pp. 3-10. (Aug. 1996).
Sollins, K., etal., "RFC 1737—Functional Requirments for Uniform Resource Names," Internet: <http://www.faqs.org/rfcs/rfc1737.'htrnl> pp. 1-6 (Dec. 1994).
Sprint's Preliminary Invalidity Contentions, *Corneas! IP Holdings I, LLC* v. *Spring Communications Company L.P.*, civil action No. 1: 12-cv-00205-RGA, including Exhibits A-P (dated Dec. 3, 2012).
Sriram, et al., "Voice Packerization and Compression in Broadband ATM Networks", Apr. 1991, IEEE Journal on Selected Areas in Communications, vol. 9, No. 3, pp. 294-304.
SS7 Signaling Protocol, Message Transfer Part (MTP), Mar. 1996, 427 pages.
SS7 Signaling Protocol, Signalling Connection Control Part (SCCP), Oct. 1992, 220 pages.
Stylus Innovation, "Computer Telephony and the Internet", <http://www.stylus.com/hvml.htm>, Oct. 1996, 9 pages.
Sullivan, "Videoconferencing Arrives on the Internet", PC Week, Aug. 1996, 1 page.
Sunaga, et al., "A Reliable Communication Switching Platform for Quick Provisioning", IEEE Feb. 1995, pp. 77-82.
Supplementary European Search Report for EP00976942 dated Jul. 7, 2003.
Swale, et al., "Convergence of Public and Private IN," BT Technology Journal, pp. 216-221 (1992).
Swale, et al., "Distributed Intelligence and Data in Public and Private Networks", BT Technology Journal, vol. 13, No. 2, pp. 95-104. (Apr. 1995).
Swale, R., "Virtual Networks of the Future—Converging Public and Private IN," BT Technology Journal, pp. 6/1/-6/5 (1993).
Tao, et al., "Internet Access via Baseband and Broadband ISDN Gateways," IEEE international Conference on Computers and Communications, pp. 485-490 (Apr. 1994).

Telecom Digest, Sep. 21, 1995, vol. 15, Issue 400, <http:l/massis.lcs.mil.edu/archives/back.issues/1995.volume.15/vol15.iss351-400>, 5 pages.
Telephony on the Internet, (Workshop Information) presented by International Quality & Productivity Center, IMTC and VOICE Technology & Services News, Sep. 1996, 6 pages.
The History of TPC.INT, <http://www.lpc.inl/faq/history.html>, 2 pages, 1999.
The Internet Multicasting Service: Ted Turner, watch out!, <http://www.findarticles.com/p/articles/mi_mOREU is_n2_v94/ai_15048995/print?tag=artBody;c . . . >, 5 pages, 1994.
The URN Implementors, "Uniform Resource Names", D-Lib Magazine, Internet: <http://www.dlib.org/dlib/February96/02arms.html>, Feb. 1996, pp. 1-6.
TPC.INT, <http://osdir.com/ml/ielf.fax/1996-12/msg00161.html>, Dec. 19, 1996, 2 pages.
Tsuchida, et al., "Intelligent Dynamic Service Provisioning Architecture in the Multimedia Era", Communications—Gateway to Globalization, IEEE Apr. 1996, pp. 1117-1122.
Validity of Verizon's VoiP Patents Challenged—PC World, <hllp:l/www.pcworld.com/article/130864/validity_of verizons_voip_patents_challenged.html>, Apr. 18, 2007,4 pages.
Venditto, "Internet Phones, The Future is Calling", Internet World, Jun. 1996, pp. 40-52.
Verizon Gets Smacked Down for Its VoiP Patent Suing Spree, <http://www.lechdirt.com/articles/20081006/2246322473.shtml>, Oct. 6, 2008, 3 pages.
Verjinski, "PHASE, A Portable Host Access System Environment", IEEE 1989, 4 pages. (Oct. 1989).
VoiP Watch, "All About Voice Over IP and Internet Based Telephony", Apr. 19, 2007, 2 pages.
Waksberg, "Axe 10 and the Intelligent Network", Commutation and Transmission, No. 4, 1993, pp. 67-76. (Dec. 1993).
Weinrib, et al., abstract, "Decentralized Resource Allocation for Distributed Systems", Conference Title: IEEE INFOCOM '87. The Conference on Computer Communications. Proceedings. Sixth Annual Conference—Global Networks: Concept to Realization, Mar. 1987, 1 page.
Welcome to the Phone Zone, Pacific Telephony Design, <http://www.phonezone.com/index2.htm>, obtained from Internet Oct. 28, 1996, pp. 1-9.
Workstation Communications Systems, IBM Technical Disclosure Bulletin, vol. 37, No. 39 (Sep. 1994).
Xiao, et al., abstract, "Sharing Model of Netware Node Resources and Real-Time Scheduling", Journal: Mini-Micro Systems, vol. 16, No. 12, Dec. 1995, 1 page.
Yamada, et al., "A Study on IN Basic Call State Model for Packet Switched Network", IEEE 1996, 18 pages. (Apr. 1996).
Yang, "INETPhone: Telephone Services and Servers on Internet", RFC 1789, Apr. 1995, Oct. 1996, pp. 1-6.
Yang, et al., "The Design and Implementation of a Service Logic Execution Environment Platform", Globecom '93, vol. 3, Nov. 1993.
Yeager, et al., "Web Server Technology, the Advanced Guide for World Wide Web Information Providers", Chapter 6: Searching for Information on the Web, 6.8.2. Using Database as Indexes to a Document Collection 1996, 3 pages. (Apr. 1996).
Ziegler, "A Distributed Information System Study", IBM System Journal, vol. 18, No. 3, 1979, pp. 374-401. (Dec. 1979).
*Comcast IP Holdings I, LLC* v. *Sprint Communications Company L.P. et al.* Andrew Seaborne Deposition Transcript, dated Aug. 22, 2013.
US Office Action—U.S. Appl. No. 09/999,407—Mailing date: Jun. 17, 2004.
Sebestyn, I., ITU Telecommunication Standardization Sector, Study Group 15, Q;2&3/15 Rapporteur Meeting, Document AVC-1086, v1, Dec. 5, 1996.
Steven Grover, Sun Microsystems, Inc. Java in communications, JAIN SLEE, 2005, pp. 1-27.
Stevens, "TCPIP Illustrated", vol. 1, 1994, Addison-Wesley.
Venezia C et al. "communication web services composition and integration", ICWS '06 Internati;nal conference on Web services, 2006, pp. 523-530.

(56) References Cited

OTHER PUBLICATIONS

Yavatkar, Raj, et al., "A Framework for Policy-based Admission Control," Internet Engineering Task Force, pp. 1-20, Apr. 1999.
"Network management; new software platform enhances network management capabilities; MCI ServiceView offers greater cost savings, increased flexibility.", Product Announcement, Edge, Oct. 2, 1995, on & about AT&T, v. 10, n. 375, p. 11(1).
EIA/TIA, Cellular Radio-Telecommunications Intersystem Operations, Technical Report IS-41 Revision B, EIA/TIA, 1991.
Jacobs, et al.: "Filling HTML Forms Simultaneously: Coweb-Architecture and Functionality" Computer Networks and ISDN Systems, vol. 28, 1996, pp. 1385-1395.
Non Final Office Action—US 90/012,864—Mailing Date: Aug. 16, 2013.
Non Final Office Action—US 90/012,850—Mailing Date: Aug. 16, 2013.
Kuehn, Richard A. (Jul. 1994). The Voice of Technology. [Online text only] Credit World, vol. 82, No. 6.
M. Koji, Abstract, "Conversation/Data Alternate Communication Equipment", Oki Electric Ind. Co., Ltd., Application No. 05004142, filed Jan. 13, 1993.
OMG, The Common Object Request Broker: Architecture and Specification, Rev. 2.0, Jul. 1995.
Oracle® Database "Concepts" Part No. B10743-01 (2003) 732 pages.
S. Boag, D. Chamberlin, M. Fernadez, D. Florescu, J. Robie, J. Simeon, and M. Stefanescu. XQuery 1.0: An XML Query Language (XQL). Technical report, World Wide Web Consortium, Apr. 2002. Available from http://www.w3.org/TR/xquery.
Final Office Action—U.S. Appl. No. 90/012,863—Mailing Date: Nov. 20, 2013.
Response to Non-Final Office Action—US 90/012,859—Filed Nov. 25, 2013, including all declarations and exhibits.
Response to Non-Final Office Action—US 90/012,864—Filed Oct. 16, 2013, including all declarations and exhibits.
Response to Non-Final Office Action—US 90/012,863—Filed Oct. 23, 2013, including all declarations and exhibits.
Response to Non-Final Office Action—US 90/012,845—Filed Nov. 22, 2013, including all declarations and exhibits.
Response to Non-Final Office Action—US 90/012,846—Filed Oct. 9 2013, including all declarations and exhibits.
Response to Non-Final Office Action—US 90/012,849—Filed Nov. 4, 2013, including all declarations and exhibits.
Response to Non-Final Office Action—US 90/012,850—Filed Oct. 16, 2013, including all declarations and exhibits.
3th part letter in Appeal procedure—EP 02000568.2, Mailing date: Dec. 18, 2006.
82371AB PCI-To-ISA/IDE Xcelerator (PIIX4) Manual, Intel Corporation, Apr. 1997, pp. 1-284.
Appeal against decision oral proceedings EP opposition—EP 02000568.2, Mailing date: Dec. 4, 2006.
Appeal decision against decision oral proceedings EP opposition—EP 02000568.2, Mailing date: Jul. 23, 2007.
Patel, Sanjiv P., Grant Henderson, and Nicolas D. Georganas. "Multimedia fax-MIME interworking." Multimedia Computing and Systems, 1994., Proceedings of the International Conference on. IEEE, 1994.
Removing Type A Restrictions, John Visser, IEEE Intelligent Network Workshop '96, Melbourne 1996.
Reber, Ulrich. "IN as an integrator for private and public networks." Intelligent Network Workshop, 1996. IN'96., IEEE. IEEE, 1996.
Resource Reservation Protocol (RSVP) Version I Functional Specification, R. Braden, L. Zang, S. Herzog, S. Jamin, IETF, Aug. 1996.
Rieken, Ralf. Serivce Creation, INAP and Basic Network Interworking: What is their relationship concerning competitive services? IEEE Intelligent Network Workshop '96, Melbourne 1996.
Romao, A. "Tools for DNS debugging." (1994).
Roscam, Rombaut. Service Personalization in Future Intelligent Networks. Intelligent Network Workshop, 1996. IN'96., IEEE. IEEE, 1996.
Russo, Pete. "A practical approach to a usable IN feature interaction tool." Intelligent Network Workshop, 1996. IN'96., IEEE. IEEE, 1996.
Salter, Avril. "Architecting IN from a User Behaviour Perspective: A Wireless View." Intelligent Network Workshop, 1996. IN'96., IEEE. IEEE, 1996.
Sasse, Martina Angela, and Roy Bennett. "Multimedia conferencing over the internet—the mice project." (1995).
*Comcast IP Holdings I, LLC* v. *Sprint Communications Company L.P., et al.* Scheduling Order Regarding Counterclaim—Plaintiff's Patents, filed Jul. 24, 2012.
Schlenoff, Craig I. World Wide Web and Mosaic: User's Guide. Craig I. Schlenoff., 1994.
Schmandt, Chris, and Michael A. McKenna. "An audio and telephone server for multi-media workstations." Computer Workstations, 1988., Proceedings of the 2nd IEEE Conference on. IEEE, 1988.
Schopp, Michael. "Performance Evaluation of IN Based Mobility Management." Intelligent Network Workshop, 1996. IN'96., IEEE. IEEE, 1996.
Request for Ex Parte reexamination of U.S. Pat. No. 7,012,916; Apr. 24, 2013.
Grant for Ex Parte reexamination request of U.S. Pat. No. 7,012,916; USPTO; May 30, 2013.
Schreyer, Oliver, Holger Gappisch, and Henning Maass. "Least cost call routing—a brilliant application for private IN." Intelligent Network Workshop, 1996. IN'96., IEEE. IEEE, 1996.
Schulzrinne, Henning. "Internet services: from electronic mail to real-time multimedia." Kommunikation in Verteilten Systemen. Springer Berlin Heidelberg, 1995.
Schulzrinne, Henning. Voice communication across the Internet: A network voice terminal. University of Massachusetts at Amherst, Department of Computer and Information Science, 1992.
Schwartz, "Internet Resource Discovery at the University of Colorado," Oct. 1992.
Schwartz, "Netfind Internet 'White pages' Tool Available by FTP," Mar. 1992.
Schwartz, "Which White Pages Service is Appropriate for my Site?", Winter 1993.
Schwartz, Michael F., and Calton Pu. "Applying an information gathering architecture to Netfind: a white pages tool for a changing and growing Internet." IEEE/ACM Transactions on Networking (TON) 2.5 (1994): 426-439.
Schwartz, Michael F., and Panagiotis G. Tsirigotis. "Experience with a semantically cognizant internet white pages directory tool." Internetworking: Research and Experience 2.1 (1991): 23-50.
Scott, Peter. "Using HYTELNET to Access Internet Resources." Public Access—Computer Systems Review 3.4 (1992).
Signalling System No. 7, IS-41 and Cellular Telephone Networking, David Wilson, Proceedings of the IEEE Personal Communications, 1st. Quarter 1994.
Serino, Mike. "SCP Reliability: How are we doing?." Intelligent Network Workshop, 1996. IN'96., IEEE. IEEE, 1996.
*Sprint Communications Company L.P.* v. *Comcast Cable Communications, LLC.* Sprint's Preliminary Infringement Contentions, dated Nov. 2, 2012.
Stevenson, Sylvia, Yana Kane-Esrig, and Kevin Dooley. "Risk analysis of advanced intelligent network architectures." Intelligent Network Workshop, 1996. IN'96., IEEE. IEEE, 1996.
Sturrus, Richard. "IN Test and Simulation Tool." Intelligent Network Workshop, 1996. IN'96., IEEE. IEEE, 1996.
Sturrus, Richard. "Service creation in a multi-vendor IN." Intelligent Network Workshop, 1996. IN'96., IEEE. IEEE, 1996.
T Berners-Lee, R. Cailliau, J. Groff and B. Pollermann. World-Wide Web: The Information Universe. Electronic Networking: Research, Applications and Policy, 2(1), pp. 52-58, Meckler Publications, Westport Connecticut, Spring 1992.
Learn, Larry L. "Internet Telephony: The Next Killer Application?(Or, How I Cut My Long-Distance Phone Bill to Nothing!)." Library Hi Tech News 123 (1995): 12-19.
Smith D G: "An Introduction to GSM Enhancements for Operator Specific Services (Camel)", IEEE Colloquium on Mobile Communications Towards the Next Millenium and Beyond, May 17, 1996, pp. 6/1-6/09, XP000605991.

(56) References Cited

OTHER PUBLICATIONS

Grant for Ex Parte reexamination request of U.S. Pat. No. 6,873,694; USPTO; Jun. 4, 2013.
Van der Meer, Jan. "Service management, provision and design." Intelligent Network Workshop, 1996. IN'96., IEEE. IEEE, 1996.
Request for Ex Parte reexamination of U.S. Pat. No. 6,873,694; May 10, 2013.
Takami, K, et al. "An application of advanced intelligent network technology to personal communication services." Intelligent Network Workshop, 1996. IN'96., IEEE. IEEE, 1996.
WebIN—An Architecture for Fast Deployment of IN-based Personal Services. Colin Low, David Skov & Nicolas Ragideau, IEEE Intelligent Network Workshop '96, Melbourne 1996.
Request for Ex Parte reexamination of U.S. Pat. No. 8,204,046; Apr. 24, 2013.
Vixie, Paul, et al. "Name Server Operations Guide for BIND." Vixie Enterprises, Jul. 1994.
Wang, Helen J., et al. "ICEBERG: An Internet core network architecture for integrated communications." Personal Communications, IEEE 7.4 (2000): 10-19.
Yakoob, Nisar. "Service Independent Operations Systems." Intelligent Network Workshop, 1996. IN'96., IEEE. IEEE, 1996.
Weider, Chris, and Joyce Reynolds. "Executive Introduction to Directory Services Using the X. 500 Protocol." ISI (1992).
Young, John. "Evolution of Intelligent Networks: Object oriented relationships for holistic communication services." Intelligent Network Workshop, 1996. IN'96., IEEE. IEEE, 1996.
M.A. Sheldon, A. Duda, R. Weiss, J.W. O'Toole, Jr. and D. K. Glifford. Content Routing for Distributed Information Servers. Proc. 4th Int. Conf. on Extending Database Technology, Cambridge, England, Mar. 1994.
McBryan. GENVL and WWWW: Tools for Taming the Web. Proc. 1st Int. World Wide Web Conf, CERN, Geneva, Switzerland, May 1994.
Microsoft Corp., "Microsoft's Intranet Strategy Whitepaper," Jun. 1996.
*Comcast IP Holdings I, LLC* v. *Sprint Communications Company L.P., et al.* Sprint's Motion to Stay Litigation Pending Reexamination, filed May 16, 2013.
N. Carriero and D. Gelernter, "Linda in Context," Commun. ACM, vol. 32, Apr. 1989.
Office action—EP 98916877.8—Mailing date: May 24, 2005.
Oral proceedings and decision oral proceedings EP opposition—EP 02000568.2, Mailing date: Jul. 25, 2006.
Partial European Search Report—EP 02079913.6—Mailing date: Feb. 3, 2011.
Response to Appeal—Appeal against decision oral proceedings EP opposition—EP 02000568.2, Mailing date: May 7, 2007.
Richardson et al., Virtual Network Computing, Feb. 1998, IEEE Internet Computing, pp. 33-38.
US Office action—U.S. Appl. No. 13/525,454—Mailing date: May 31, 2013.
US Office action—U.S. Pat. No. 6,038,689—Mailing date: Feb. 2, 1999.
US Office action—U.S. Pat. No. 6,038,689—Mailing date: May 19, 1999.
US Office action—U.S. Pat. No. 6,055,643—Mailing date: Jan. 25, 1999.
US Office action—U.S. Pat. No. 6,282,281—Mailing date: Oct. 3, 2000.
US Office action—U.S. Pat. No. 6,567,852—Mailing date: Oct. 1, 2002.
US Office action—U.S. Pat. No. 6,798,771—Mailing date: Aug. 8, 2002.
US Office action—U.S. Pat. No. 6,798,771—Mailing date: Feb. 14, 2001.
US Office action—U.S. Pat. No. 6,798,771—Mailing date: Jan. 8, 2003.
US Office action—U.S. Pat. No. 6,798,771—Mailing date: May 5, 2003.
US Office action—U.S. Pat. No. 8,170,008—Mailing date: Jan. 3, 2011.
US Office action—U.S. Pat. No. 8,189,565—Mailing date: Jan. 3, 2011.
US Office action—U.S. Pat. No. 8,204,046—Mailing date: Jan. 9, 2012.
US Office action—U.S. Pat. No. 8,223,752—Mailing date: May 7, 2012.
Wilson et al.: A network control architecture for bandwidth management, supercomm / icc 1992, vol. 3, Jun. 14, 1992, pp. 1385-1391, XP000337937, Chicago, US.
European Search Report—EP 02000567.4—Mailing date: Aug. 6, 2002.
National Research Council (US). NRenaissance Committee. Realizing the information future: The internet and beyond. National Academies Press, 1994.
"Specification of the KQML Agent Communicatoin Language," The DARPA Knowledge Sharing Initiative External Interfaces Working Group, draft, Feb. 1994.
A. Emtage and P. Deutsch. Archie—An Electronic Directory Service for the Internet. Proceedings of the USENIX Winter Conference, pp. 93-110, San Francisco, California, Jan. 1992.
Airiyan, Helen. "Experiences in Designing a Capacity Planning Tool for Intelligent Networks." Intelligent Network Workshop, 1996. IN'96., IEEE. IEEE, 1996.
Alanko, Timo, et al. "Measured performance of data transmission over cellular telephone networks." ACM SIGCOMM Computer Communication Review 24.5 (1994): 24-44.
Albitz, Paul. DNS and Bind. O'reilly, 2001.
*Comcast IP Holdings I, LLC* v. *Sprint Communications Company L.P. et al.* Sprint's Amended Reply Brief in Support of its Motion to Stay Litigation Pending Reexamination. Filed Jun. 13, 2013.
An Overview of Signalling System No. 7, Modarressi, A.R. & Skoog R.A., Proceedings of the IEEE, vol. 80, No. 4 Apr. 1992.
*Comcast IP Holdings I, LLC* v. *Sprint Communications Company L.P. et al.* Sprint's Answer and Counterclaims. Filed May 14, 2012.
*Comcast IP Holdings I, LLC* v. *Sprint Communications Company L.P. et al.* Sprint's Answer to Comcast's First Amended Complaint. Filed Jun. 29, 2012.
*Comcast IP Holdings I, LLC* v. *Sprint Communications Company L.P. et al.* Sprint's Answer and Counterclaims to Comcast's Second Amended Complaint. Filed Oct. 22, 2012.
*Comcast IP Holdings I, LLC* v. *Sprint Communications Company L.P. et al.* Comcast's Brief in Opposition to Sprint's Motion to Stay Litigation Pending Reexamination. Filed Jun. 3, 2013.
B. Kahle and A. Medlar. An Information System for Corporate Users: Wide Area Information Servers. ConneXions—The Interoperability Report, 5(11), pp. 2-9, Interop, Inc., Nov. 1991.
B. Walker, G. Popek, R. English, C. Kline and G. Thiel. The LOCUS Distributed Operating System. Proc. 9th ACM Symp. Operating Syst. Prin., pp. 49-70, Oct. 1983.
B.C. Neuman. Prospero: A Tool for Organizing Internet Resources. Electronic Networking: Research, Applications, and Policy, 2(1), pp. 30-37, Meckler Publications, Westport, Connecticut, Spring 1992.
Bailey, Joseph, "Internet Economics: What Happens When Constituencies Collide?" (1995).
Bailey, Joseph, et al. "Internet economics workshop notes." Journal of Electronic Publishing 1.1&2 (1995).
Barker, Paul, and Steve Kille. "The COSINE and Internet X. 500 schema." (1991).
Batni, Ram. "A 'Hybrid Intelligent Network (IN)' Solution for Local Number Portability (LNP) (or How you can take it with you!)." Intelligent Network Workshop, 1996. IN'96., IEEE. IEEE, 1996.
Crocker, Ronald. "Applying IN to mobile communications services beyond telephony." Intelligent Network Workshop, 1996. IN'96., IEEE. IEEE, 1996.
Betts, Richard. "Broadband intelligent networking: evolution of service control." Intelligent Network Workshop, 1996. IN'96., IEEE. IEEE, 1996.
Bilgi, Murat. Mobility Management Application Protocol (MMAP) for North American PCS Networks, IEEE Intelligent Network Workshop '96, Melbourne 1996.

(56) References Cited

OTHER PUBLICATIONS

Blankers, Patrick, and Yun-Chao Hu. "Broadband capabilities within intelligent networks." Intelligent Network Workshop, 1996. IN'96., IEEE. IEEE, 1996.
Bloemer, "Re: Dynamic Netfind from WWW," Apr. 1993.
Borenstein, Nathaniel S., and Ned Freed. "Multipurpose Internet mail extensions (MIME) part five: Conformance criteria and examples." (1996).
C. Dharap, R. Balay and M. Bowman. Type Structured File Systems. Proc. Int. Workshop on Object-Orientation in Operating Systems, IEEE Computer Society Press, Dec. 1993.
C. M. Bowman, P. B. Danzig, D. R. Hardy, U. Manber and M. F. Schwartz. Harvest: A Scalable, Customizable Discovery and Access System. Tech. Rep., Dept. Comput. Sci., Univ. Colorado, Boulder, Jul. 1994. In preparation.
C. M. Bowman, P. B. Danzig, U. Manber and M. F. Schwartz. Scalable Internet Resource Discovery: Research Problems and Approaches. To appear, Commun. ACM, 1994.
C. Weider, J. Fullton and S. Spero. Architecture of the Whois++ Index Service. Internet Draft, WNILS Working Group, Nov. 1992. Available from ftp://nri.reston.va.us/internet-drafts/draft-ieft-wnils-whois-00.txt.
T. Magedanz and R. Popescu-Zeletin, Intelligent Networks: Basic Technology, Standards and Evolution, (Intl. Thomson Computer Press Ed., 1996).
GB application No. 9603590.2, filed Feb. 20, 1996, by applicant Hewlett-Packard Company, priority application for at least PCT/GB96/03054, which was published Aug. 28, 1997 as WO 1997/031490.
Jeff Baart Declaration dated Nov. 1, 2013, in support of Declaration executed Oct. 8, 2013.
"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.
"IDT's Net2Phone Launches Phone-to-Phone Technology via the Internet," Press release, http://web.net2phone.com/about/press/releases/p2p.asp, Sep. 8, 1997.
"Inside APPN—The Essential Guide to the Next-Generation SNA," IBM, International Technical Support Organization Raleigh Center, Raleigh, NC, Jun. 1997.
"Integrated Services Digital Network (ISDN) 1.312," CCITT The International Telegraph and Telephone Consultative Committee, ITU International Telecommunication Union, Recommendation, 1.312/Q.1201, Oct. 1992.
"Interface Recommendation for Intelligent Network CS-1," International Telecommunication Union, ITU-T Telecommunication Standardization Sector of ITU, ITU-T Recommendation Q.1218, Oct. 1995.
"Internet Protocol Performance Metrics—Evolution Through Understanding", http://www.advanced.org/ippm.html (Aug. 1997).
"NetSpeak Corporation to Exhibit First Release of Voice Over IP, IP-to-PSTN Networking Products", Business Wire, Jun. 2, 1997.
"Series Q: Switching and Signalling," Intelligent Network, International Telecommunication Union, ITU-T, Telecommunication Standardization Sector of ITU, Recommendation Q.1218—Addendum 1, Sep. 1997.
"Specifications of Signalling System No. 7," International Telecommunication Union, ITU-T Telecommunication Standardization Sector of ITU, Recommendation, Q.700, Mar. 1993.
"Using JCC for Portable, Network Independent JAIN SLEE Services," available online at http://jainslee.org/application/sleeandjcc.html.
1979 Annual Technical Report, "A Research Program in Computer Technology", Oct. 1978-Sep. 1979, Prepared for the Defense Advanced Research Projects Agency, University of Southern California, ISI-SR-80-17.
1982 Annual Technical Report, "A Research Program in Computer Technology", Jul. 1981-Jun. 1982, University of Southern California, ISI/SR-83-23.
Aiken, B., et al., "Network Policy and Services: A report of a Workshop on Middleware," Network Working Group, pp. 1-26, Feb. 2000.
Almes et al., "A One-Way Delay Metric for IPPM," Advanced Network & Services, Network Working Group, http://www.ietf.org/internet-drafts/draft-ietf-ippm-delay-05.txt (Nov. 1998).
Arao, Shinya, et al., "Component-based policy deployment for service level differentiation in converging communication networks," IEEE, pp. 1388-1392, 1999.
Aygun,S et al. "conceptual data modeling of multimedia database applications", 1998 proceedings i multi-media database mangement systems workshop, Aug. 1998, pp. 182-189.
M. Kwiatkowski, Performance modeling of UPT networks, Proc. of the IEEE International Conference on Universal Personal Communications, vol. 1, 1995, pp. 543-547.
Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.
Barzilai, Tsipora, et al., "Design and Implementation of an RSVP-based Quality of Service Architecture for Integrated Services Internet," IEEE, May 1997.
Baumgartner, F., et al., "Differentiated services: a new approach for quality of service in the Internet," Proceedings of Eighth International Conference on High Performance Networking, pp. 255-273, Sep. 21-25, 1998.
Beck, Christopher J., et al., "Scheduling alternative activities," http://www.aaai.org/home.html, 1999.
Berners-Lee, T. et al. "Uniform Resource Identifiers (URI): Ge3neric Syntax," RFC 2396, Aug. 1998, pp. 1-40.
Bernet, Y., et al., "A Framework for Differentiated Services," The Internet Society, pp. 1-35, Sep. 22, 1999.
Blackwell et al. "Secure Short-Cut Routing for Mobile IP," USENIX Summary 1994 Technical Conferences, Jun. 6-10, 1994.
Blake, S., et al., "An Architecture for Differentiated Services," Network Working Group, pp. 1-36, Dec. 1998.
Borden et al., "Integration of Real-Time Services in an IP-ATM Network", Internet RFC/STD/FYI/BCP ARchives, Aug. 1995.
Botvich, D., et al., "On Charging for Internet Services provided over an A.TIVI network," IEEE, pp. 669-679, 1997.
Boyle, Jim, et al., "The COPS (Common Open Policy Service) Protocol," http://www.ietf.orgiintemet-drafts/draft-ietf-rap-cops-07.txt, pp. 1-35, Aug. 16, 1999.
Braden, R., et al., "Resource ReSerVation Protocol (RSVP)—Version 1 Functional Specification," Network Working Group, pp. 1-224, Univ. of Michigan, Sep. 1997.
Braun, Torsten, "Implementation of an Internet Video Conferencing Application over ATM," IBM European Networking Center, Heidelberg, Germany, IEEE, pp. 287-294, 1997.
Braun, Torsten, "Internet Protocols for Multimedia Communications," Part II: Resource Reservation, Transport, and Application Protocols, IEEE MultiMedia, pp. 74-82, Oct.-Dec. 1997.
GB application No. 9603591.0, filed Feb. 20, 1996, by applicant Hewlett-Packard Company, priority application for at least PCT/GB96/03048, which was published Jun. 19, 1997 as WO 1997/022209.
GB application No. 9603589.4, filed Feb. 20, 1996, by applicant Hewlett-Packard Company, priority application for at least PCT/GB96/03051, which was published Jun. 19, 1997 as WO 1997/022211.
GB application No. 9525190.6, filed Dec. 11, 1995, by applicant Hewlett-Packard Company, priority application for at least PCT/GB96/03055, which was published Jun. 19, 1997 as WO 1997/022212.
EP application No. 95410148.1, filed Dec. 22, 1995, by applicant Hewlett-Packard Company, priority application for at least PCT/GB96/03055, which was published Jun. 19, 1997 as WO 1997/022212.
GB application No. 9603582.9, filed Feb. 20, 1996, by applicant Hewlett-Packard Company, priority application for at least PCT/GB96/03055, which was published Jun. 19, 1997 as WO 1997/022212.
Buchanan, Ken, et al., "IMT-2000: Service Provider's Perspective," IEEE Personal Communications, pp. 8-13, Aug. 1997.

(56) References Cited

OTHER PUBLICATIONS

Cert et al., "A Protocol for Packet Network Intercommunication", IEEE Transactions on Communications, No. 8, May 1974.
Cesner et al., "Wideband Communications", 1984 Annual Technical Report, University of Southern California, ISI/SR-85-150, Jul. 1983-Jun. 1984.
Chandra, P., et al., "Network support for application-oriented QoS," (IWQoS 98) 1998 Sixth International Workshop on Quality of Service, pp. 187-195, May 18-20, 1998.
Chen et al., "Integrated Voice/Data Switching", IEEE Communication Magazine, Jun. 1988, vol. 26, No. 6.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Cisco Systems, "Cisco ATA 186 Analog Telephone Adaptor", document states "Copyright (C) 1992-2002".
Corley, "Bellsouth Trial of Wideband Packet Technology", Bellsouth Services, 1990 IEEE, CH2829-0/90/0000-1000.
Daniele, M., et al., "Textual Conventions for Internet Network Addresses," Nework Working Group, pp. 1-16, Jun. 2000.
Detreville et al., "A Distributed Experimental Communications System", Advances in Local Area Networks, IEEE Press, 1987.
du Bousquet,L et al. "telecommunication software validation using a synchronous approach", ASSET-98, proceedings, IEEE workshop on application-specific software engineering technology, 1998, pp. 98-101.
Free World Dialup and Verizon's patent on "name translation", The Jeff Pulver Blog, <http://pulverblog.pulver.com/archives/006846.html>, Apr. 23, 2007, 4 pages.
Friedes, et al., "ISDN opportunities for Large Business—800 Service Customers", IEEE International Conference on Communications, 1986, vol. 1, 7 pages. (Jun. 1986).
Fridisch, et al., "Terminals for Accessing the Internet—The Internet Telephne", Alcatel Telecommunications Review—4th Quarter 1996, pp. 304-309. (Dec. 1996).
Fuente, et al., "Application of the TINA-C Management Architecture", 1995, 12 pages. (Apr. 1995).
Fuhrer, et al., "The 5ESS Switching System: Operations, Administration, and Maintenance Capabilities, "AT&T Technical Journal, Jul. 1985, 14 pages.
Fujioka, et al., "Universal Service Creation and Provision Environment for Intelligent Network", International Switching Symposium, May 1990, pp. 149-156.
Ganor, "Talk, Talk", Tele.com, Jun. 1996, pp. 68-72.
Gareiss, "Voice Over the Internet", Data Communications, vol. 25, No. 12, Sep. 1996, pp. 93, 94, 96, 98 and 100.
Garrahan, et al., "Intelligent Network Overview", IEEE Communications Magazine, Mar. 1993, 7 pages.
Gasman, "Broadband Networking", 1994, 209 pages.
Gibson, "Web Foes Belong in 'Animal House'," PC Week, Aug. 19, 1996, 1 page.
Girod, et al., "Requirements for URN Resolution Systems", Internet: <http://www.potaroo.net/ietf/idref/draft-girod-urn-res-require/>, pp. 1-31 (Jun. 13, 1996).
GR-1280-CORE, Advanced Intelligent Network (AIN) Service Control Point (SCP) Generic Requirements, Telcordia Technologies Generic Requirements, Issue 1, Aug. 1993, 637 pages.
GR-2863-CORE, CCS Network Interface Specification (CCSNIS) Supporting Advanced Intelligent Network (AIN), Bellcore, Generic Requirements, Issue 2, Dec. 1995, 148 pages.
Graff, et al., "The 5ESS Switching System: Physical Design/Hardware," AT&T Technical Journal, Jul. 1985, 46 pages.
Gralla, "How the Internet Works", Communication on the Internet, Chapter 12, 1996, pp. 64-67. (Jun. 1996).
Grami, et al., "The Role of Satellites in the Information Superhighway", Jun. 1995, pp. 1577-1581.
Grigonis, "Computer Telephony Over the Internet", CT and the Net, Mar. 1996, 6 pages.

Gupta, et al., "Resource Sharing for Multi-Party Real-Time Communication", Conference Title: Proceedings IEEE INFOCOM '95, The Conference on Computer Communications, Fourteenth Annual Joint Conference of the IEEE Computer and Communications Societies, Bringing Information to people. Part vol. 3, 1995, pp. 1230-1237. (Apr. 1995).
Gupta, et al., "Technical Assessment of (T) INA-TMN-OSI Technology for Service Management Applications", Feb. 1994, pp. 877-887.
H.323: The Leading Standard in Voice Over IP, no earlier than 1996, 4 pages.
Hamilton, "Uniform Resource Identifiers & the Simple Discovery Protocol", Department of Computer Studies, Loughborough University of Technology, Internet: <http://martinh.net/uris/uris.html>, Jun. 20, 1995, 32 pages.
Hardcastle-Kille, S.E., "RFC 1279-X.500 and Domains," RFC 1279 Internet: <http://www.faqs.org/rfcs/rfc1279.html>, pp. 1-12. (Nov. 1991).
Harmer, et al., "On the Move Project", Dec. 1996, pp. 1-44.
Haugk, et al., "The 5ESS Switching System: Maintenance Capabilities," AT&T Technical Journal, Jul. 1985, 32 pages.
Huitema, "Routing in the Internet", Prentice-Hall PTR, 1995, 168 pages. (Mar. 1995).
Hvasshovd, et al., "The ClustRa Telecom Database: High Availability, High Throughput, and Real-Time Response", Proceedings of the 21st VLDB Conference, 1995, pp. 469-477. (1995).
IETF#27, Proceedings of the Twenty-Seventh Internet Engineering Task Force: SURF net and RARE, Jul. 16, 1993, 6 pages.
IETF#28, Proceedings of the Twenty-Eighth Internet Engineering Task Force (proceedings held Nov. 1993), pp. 258-266 (published no later than Mar. 1994).
Imilienski, et al., "Mobile Wireless Computing", Communications of the ACM, Oct. 1994, vol. 37, No. 10, pp. 18-28.
IMTC Voice Over IP Forum Service Interoperability Implementation Agreement, Draft 0.91, VOIP97-008, Jan. 13, 1997, 70 pages.
IMTC VoiP Forum Contribution, Proposal for Use of LDAP for Internet Telephony Directory Services, Mar. 11, 1997, 8 pages.
Inamori, et al., "Applying TMN to a Distributed Communications Node System with Common Platform Software", IEEE Feb. 1995, pp. 83-87.
Infrastructure ENUM, <http://www.circleid.com/posts/infrastructure_enum/>, Apr. 5, 2007, 7 pages.
International Search Report for PCT/US00/30448 dated Jan. 16, 2001, 3 pages.
Internet Phone Release, Getting Started Guide, 1996, 18 pages.
Jain, "Evolving Existing Narrowband Networks Broadband Networks with IN Capabilities", IEEE Apr. 1996, 6 pages.
Jennings, "End-user Requirements for High-Integrity Directory", 1996, ICC '96, Conference Record, Converging Technologies for Tomorrow's Applications, 1996 IEEE International Conference on vol. 3, Jun. 23-27, 1996, pp. 1793-1796, vol. 3; Digital Object Identifier 10.1109/ICC.1996.535599.
Johnson, "Scalable Support for Transparent Mobile Host Internetworking", Wireless Networks 1 (1995), pp. 311-321. (Sep. 1995).
Kabay, et al., "The Service Node—An Advanced in Services Element", Technology Journal, vol. 13, No. 2, Apr. 1995, pp. 64-72.
Kahane, "Introduction to VocalTec's CMA System, Intelligent Switching for a New Era of Telecom", Nov. 7, 1996, 18 pages.
Kahane, et al., "Call Management Agent System Specification", VoiP-0017, Aug. 15, 1996, 36 pages.
Kahn, "Videoconferencing Debuts on the Internet", Feb. 28, 1995, 2 pages.
Karn, "Geek of the Week, Mobile IP Networking", Internet Talk Radio, Nov. 1993, 17 pages.
Karttunen, et al., "Cost Structure Analysis and Reference Model for Scaleable Network Services", The Institution of Electrical Engineers, 1996, pp. 3/1-3/9. (Nov. 1996).
Kim, "Talk is Cheap", America's Network, Jul. 15, 1996, pp. 34-39.
Kishimoto, "Agent Communication System for Multimedia Communication Service", IEEE Infocom, Mar. 1996, Proceedings vol. 1, pp. 10-17.

(56) References Cited

OTHER PUBLICATIONS

Klein, et al., "Minimax Resource Allocation with Tree Structred Substitutable Resources", Journal: Operations Research, vol. 39, No. 2, Mar. 1991, pp. 285-295.
Klensin, et al., "SMTP Service Extension for 8bit-MIMEtransport", RFC1652, <http://tool.ielf.org/html/rfc1652>, Jul. 1994, 7 pages.
Klensin, et al., "SMTP Service Extensions", RFC1651, <http://tools.ielf.org/html/rfc1651 >, Jul. 1994, 12 pages.
*Comcast IP Holdings I, LLC v. Sprint Communications Company L.P., et al.* Sprint's Brief in Support of its Motion to Stay Litigation Pending Reexamination, May 16, 2013.
*Comcast IP Holdings I, LLC v. Sprint Communications Company L.P., et al.* Request for International Judicial Assistance, Pursuant to the Hague Convention on the Taking of Evidence Abroad in Civil or Commerical Matters, to Obtain Evidence from Colin Low and Andrew Seaborne, filed Jul. 16, 2013.
R.E. Droms. Access to Heterogeneous Directory Services. Proc. 9th Joint Conf. of IEEE Computer and Communications Societies (InfoCom), Jun. 1990.
*Comcast IP Holdings I, LLC v. Sprint Communications Company L.P., et al.* Sprint's Reply Brief in Support of its Motion to Stay Litigation Pending Reexamination, filed Jun. 11, 2013.
S. Bellovin. Using the Domain Name System for System Break-ins. USENIX, 1995.
S.S. Coleman, D.C. M. Wood and M.F. Schwartz. Fremont: A System for Discovering Network Characteristics and Problems. To appear, Proceedings of the USENIX Winter Conference, San Diego, California, Jan. 1993.
Scenarios for Computer Supported Telecommunications Applications (CSTA) Phase 2, ECMA TR/68, 1st ed., Dec. 1994.
*Comcast IP Holdings I, LLC v. Sprint Communications Company L.P., et al.* Scheduling Order Regarding Plaintiff's Patents, filed Jul. 24, 2012.
*Comcast IP Holdings I, LLC v. Sprint Communications Company L.P., et al.* Comcast's Second Amended Complaint, filed Oct. 3, 2012.
Shimazaki, Hitoshi. The IN Service Operations System based on the Call Processing History, IEEE Intelligent Network Workshop '96, Melbourne 1996.
Sollins, K. R. "Plan for Internet directory services." (1989).
*Comcast IP Holdings I, LLC v. Sprint Communications Company L.P., et al.* Sprint's Preliminary Identification of Claim Term(s), Jan. 25, 2013.
T. Berners-Lee. Uniform Resource Locators. CERN, Jul. 1993. Internet Draft, IETF URL Working Group.
V. Cerf. Networks. Scientific American, 265(3), pp. 72-81, Sep. 1991. Special Issue on Communications, Computers, and Networks.
Weiss, K., and J. Gargano. "Whois and Network Information Lookup Service, Whois++." (1995).
Yakoob, Nisar. "End customer control in the intelligent network." Intelligent Network Workshop, 1996. IN'96., IEEE. IEEE, 1996.
Yamada, Michio. "Study on IN Basic Call State Model for Packet Switched Network." Intelligent Network Workshop, 1996. IN'96., IEEE. IEEE, 1996.
Grant for Ex Parte reexamination request of U.S. Pat. No. 8,204,046; USPTO; May 21, 2013.
Request for Ex Parte reexamination of U.S. Pat. No. 8,170,008; May 10, 2013.
Grant for Ex Parte reexamination request of U.S. Pat. No. 7,206,304; USPTO; Jun. 6, 2013.
Request for Ex Parte reexamination of U.S. Pat. No. 8,223,752; Apr. 29, 2013.
Grant for Ex Parte reexamination request of U.S. Pat. No. 8,223,752; USPTO; May 21, 2013.
Request for Ex Parte reexamination of U.S. Pat. No. 7,903,641; May 2, 2013.
Grant for Ex Parte reexamination request of U.S. Pat. No. 7,903,641; USPTO; Jun. 12, 2013.
Tagg E.: "Automating Operating-Assisted Calls Using Voice Recognition" Speech Technology, Man-Machine Voice Communications, vol. 4, No. 2, Mar. 1988, pp. 22-25.
Turletti T: "The Inria Videoconferencing System (IVS)" Connexions, Oct. 1, 1994, pp. 20-24.
Mills, M. (Mar. 8, 1996) "Freebie Heebie-Jeebies: New Long-Distance Calling via the Internet Scares Small Phone Firms", The Washington Post, sec. F, pp. 1-2.
Sattler, Michael, "Nautilus Voice Encryption," May 10, 1995.
"Cisco Expands ISDN Router Solutions with Introduction of Low-Cost ISDN Router Series for Enterprise Telecommuters" Cisco Systems, Nov. 1995.
A. A. Lazar, K.S. Lim and F. Marconcini "Realizing a Foundation for Programmability of ATM Networks with the Binding Architecture", IEEE Journal on Selected Areas in Communications, vol. 14, No. 7, pp. 1214-1227 1996.
M.Y. Chung, D.K. Sung, Performance analysis of a profile management scheme for incall registration/deregistration in wireline UPT networks, IEICE Trans. Commun. E82-B (5) (1999).
M.Y. Chung, S.H. Kang, D.K. Sung, Performance analysis of two schemes for managing information related to incall registration in wireline UPT networks, Computer Communications 22 (1999) 1592-1606.
Marco Listanti and Francesco Villani,"An X.25-compatible protocol for packet voice communications," Computer Communications, pp. 23-31, vol. 6, No. 1, Feb. 1983, Butterworth & Co., Ltd.
S.C. Ahn, G.C. Choi, and K.S. Lee, "Implementation of IN in Korea Telecom," Proc. International Council for Computer Communication IN Conference, pp. 224-235, 1992.
The Common Object Request Broker: Architecture and specification. OMG Document No. 91.12.1, Dec. 1991. Revision 1.1 (Draft 10).
Y. Nakamura, et al., On a Hybrid Network System of Circuit Switching and Packet Switching, The Transactions of the IECE of Japan, vol. E 65, No. 6, Jun. 1982, pp. 37-45.
William Gray et al., Handover Control Scenarios within an IN architecture, International Conference on Intelligence in Networks, p. 71-76. Nov. 1, 1996.
Briere, Daniel D., et al., "Internet Telephony for Dummies," 2nd Edition, IDG Books Worlwide, Inc., pp. 249-268, 1997.
Chapman, D. Brent et al., "Building Internet Firewalls", Nov. 1995, O'Reilly & Associates, p. 58.
Margulies, Edwin (Aug. 1996) Understanding the Voice-Enabled Internet, Flatiron Publishing, Inc., pp. 4-42 and 12-1 to 12-3.
Gralla, Preston, "How the Internet Works," Ziff-Davis Press, pp. 118-119, 1996.
Non Final Office Action—US 90/012,859—Mailing Date: Sep. 25, 2013.
Non Final Office Action—US 90/012,845—Mailing Date: Sep. 25, 2013.
S. Deering, "Host Extensions for IP Multicasting", Aug. 1989, http://www.internic.net/rfc/rfc1112.txt, pp. 1-16.
"A Framework for a Gateway Location Protocol", which is a working document of the Internet Engineering Task Force (IETF), Oct. 28, 1998.
Campbell, Brian. "UPT and PCS: Early implementation experience." Intelligent Network Workshop, 1996. IN'96., IEEE. IEEE, 1996.
Capellmann, Carla, and Kristofer Kimbler. "Towards efficient feature interaction handling." Intelligent Network Workshop, 1996. IN'96., IEEE. IEEE, 1996.
Carew, Jim. "Competition for the IN service provider." Intelligent Network Workshop, 1996. IN'96., IEEE. IEEE, 1996.
Carmagnola, Valerio. "An Integrated IN/B-ISBN Reference Architecture for the Support of Multimedia Services." Intelligent Network Workshop, 1996. IN'96., IEEE. IEEE, 1996.
CCITT/ISO. The Directory, Part 1: Overview of Concepts, Models and Services. CCITT/ISO, Gloucester, England, Dec. 1988. CCITT Draft Recommendation X.500/ISO DIS 9594-1.
CCITT/ITU-T Rec. 1201, "Principles of Intelligent Network Architecture," 1992; see also Q.1202, Q.1203, Q.1204, etc.
Cho, Sehyeong. "SCE as a CASE: an extendible service creation architecture." Intelligent Network Workshop, 1996. IN'96., IEEE. IEEE, 1996.
Clark, David D. "Policy routing in internet protocols." Policy (1989).
Cohen, Danny. "On Names, Addresses and Routings." Internet experiment note (IEN) 23 (1978).

(56) References Cited

OTHER PUBLICATIONS

*Comcast IP Holdings I, LLC* v. *Sprint Communications Company LP, et al.*, CA No. 12-00205-RGA, Jun. 20, 2013 Minuscript.
*Comcast IP Holdings I, LLC* v. *Sprint Communications Company LP, et al.*, CA No. 12-00205-RGA, Jun. 20, 2013 Transcript.
*Comcast IP Holdings I, LLC* v. *Sprint Communications Company L.P.* Joint Claim Construction Chart, dated Mar. 1, 2013.
*Comcast IP Holdings I, LLC* v. *Sprint Communications Company L.P.* Plaintiff's Initial Claim Constructions, dated Jan. 25, 2013.
*Comcast IP Holdings I, LLC* v. *Sprint Communications Company L.P., et al.* Complaint for Patent Infringement, dated Feb. 21, 2012.
Crabill, Ed. "The Emerging ANSI IN Standard for North America based upon ITU-T Recommendations." Intelligent Network Workshop, 1996. IN'96., IEEE. IEEE, 1996.
Craignou, Beatriz, and J-Y. David. "Integrating intelligent networks in general network planning." Intelligent Network Workshop, 1996. IN'96., IEEE. IEEE, 1996.
D. Hardy and M.F. Schwartz. Essence: A Resource Discovery System Based on Semantic File Indexing. To appear, Proceedings of the USENIX Winter Conference, San Diego, California, Jan. 1993.
D. K. Gifford, P. Jouvelot, M. A. Sheldon and J. W. O'Toole, Jr. Semantic File Systems. Proc. 13th ACM Symp. Operating Syst. Prin., pp. 16-25, Oct. 1991.
D. R. Hardy and M. F. Schwartz. Customized Information Extraction as a Basis for Resource Discovery. Tech. Rep. CU-CS-707-94, Dept. Comput. Sci., Univ. Colorado, Boulder, Mar. 1994. Submitted for publication.
D. Zimmerman. The Finger User Information Protocol. Req. for Com. 1288, Center for Discrete Mathematics and Theoretical Computer Science, Nov. 1990.
D.J. Ewing, R. S. Hall and M.F. Schwartz. A Measurement Study of Internet File Transfer Traffic. Technical Report CU-CS-571-92, Department of Computer Science, University of Colorado, Boulder, Colorado, Jan. 1992.
D.L. Mills. Network Time Protocol (NTP). Req. for Com. 958, M/ACOM Linkabit, Sep. 1985.
Dasgupta, Partha. "Resource location in very large networks." Distributed and Networked Environments, 1994. Proceedings., First International Workshop on Services in. IEEE, 1994.
*Comcast IP Holdings I, LLC* v. *Sprint Communications Company L.P., et al.* Declaration of David J. Lisson in Support of Comcast's Brief in Opposition to Sprint's Motion to Stay Litigation Pending Reexamination, filed Jun. 4, 2013.
*Comcast IP Holdings I, LLC* v. *Sprint Communications Company L.P., et al.* Declaration of Robert Reckers in Support of Sprint's Motion to Stay Litigation Pending Reexamination, filed May 16, 2013.
*Comcast IP Holdings I, LLC* v. *Sprint Communications Company L.P., et al.* Plaintiff's Corporate Disclosure Statement, filed Feb. 21, 2012.
Eckardt, T., and T. Magedanz. "Personal Communications support based on TMN and TINA Concepts." Intelligent Network Workshop, 1996. IN'96., IEEE. IEEE, 1996.
Eckardt, Tim. "Mobile Service Agents and their Impacts on IN-Based Service Architectures." Intelligent Network Workshop, 1996. IN'96., IEEE. IEEE, 1996.
Ely, Tom. "The Service Control Point as a Cross Network Integrator." Intelligent Network Workshop, 1996. IN'96., IEEE. IEEE, 1996.

Eyers, Tony, and Henning Schulzrinne. "Predicting internet telephony call setup delay." Proc. 1st IP-Telephony Wksp. 2000.
F.F. Ingrand, M.P. Georgeff, A.S. Rao, "An Architecture for Real-Time Reasoning and System Control," IEEE Expert, Dec. 1992.
Faouzi, Daoud. "Intelligent services: towards more autonomy." Intelligent Network Workshop, 1996. IN'96., IEEE. IEEE, 1996.
*Comcast IP Holdings I, LLC* v. *Sprint Communications Company L.P., et al.* Comcast's First Amended Complaint, filed May 29, 2012.
Furht, Borko. "Where are information superhighways headed?." ACM Computing Surveys (CSUR) 27.4 (1995): 554-556.
Gallersdorfer, Rainer. "Performance of Relational Database Management Systems in Intelligent Networks of Mobility Environments." Intelligent Network Workshop, 1996. IN'96., IEEE. IEEE, 1996.
Golda, Oliver. "Interactive Broadband Applications, The Role of IN." Intelligent Network Workshop, 1996. IN'96., IEEE. IEEE, 1996.
Goralski, Walter, and Matthew C. Kolon. IP telephony. New York: McGraw-Hill, 2000.
Gutierrez, Raul. "Interworking Scenarios between TINA and IN." Intelligent Network Workshop, 1996. IN'96., IEEE. IEEE, 1996.
Hardman, Vicky, et al. "Reliable audio for use over the Internet." Proceedings of INET. vol. 95. 1995.
Hariu, Takeo. "Study on Call Model of Advanced Intelligent Network for Controlling B-ISDN." Intelligent Network Workshop, 1996. IN'96., IEEE. IEEE, 1996.
Hellemans, Patrick. The TINA Service Session Graph: A generic call model for multi-media services. Intelligent Network Workshop, 1996. IN'96., IEEE. IEEE, 1996.
Herrigel, Alexander. "Security Architecture for the Core Part of CS-2." Intelligent Network Workshop, 1996. IN'96., IEEE. IEEE, 1996.
Herzog, Uwe, et al. "Migrating IN towards TINA." Intelligent Network Workshop, 1996. IN'96., IEEE. IEEE, 1996.
Hollenbach, Steven. "Utilising Intelligent Network Technology in Customer Care Applications." Intelligent Network Workshop, 1996. IN'96., IEEE. IEEE, 1996.
Howes, Timothy A. "The Lightweight Directory Access Protocol: X. 500 Lite." Ann Arbor 1001 (1995): 48103-4943.
Intelligent Network Requirements for Personal Communications Services, Jonathan Homa & Steve Harris, IEEE Communications Magazine, Feb. 1992.
International Standards for Intelligent Networks, Jose M. Duran & John Visser, IEEE Communications Magazine, Feb. 1992.
Ishibashi, Hirozumi. A Study on Service Date Transfer Procedure using SCP & SDF, IEEE Intelligent Network Workshop '96, Melbourne 1996.
J. Postel and C. Anderson. White Pages Meeting Report. Req. for Com. 1588, USC Information Sci. Institute, Feb 1994.
J. Postel and J. Reynolds. File Transfer Protocol (FTP). Req. for Com. 959, USC Information Sci. Institute, Oct. 1985.
*Comcast IP Holdings I, LLC* v. *Sprint Communications Company L.P.*; C.A. No. 1:12-cv-00205-RGA; Rebuttal expert report of Jeffrey S. Dwoskin—Redacted—Oct. 25, 2013.
Non-Final Office Action—US 90/012,855—Mailing Date: Dec. 23, 2013.
*Comcast IP Holdings I* vs. *Sprint Communications*; C.A. No. 1:12-cv-00205-RGA; Memorandum order, Aug. 22, 2014.

\* cited by examiner

STATEFUL HOME PHONE SERVICE

CROSS-REFERENCE TO RELATED APPLICATIONS

This application is a continuation of U.S. application Ser. No. 12/473,319, filed on May 28, 2009, the entire disclosure of which is herein incorporated by reference.

FIELD OF THE DISCLOSURE

The present disclosure relates to a system and method for routing incoming messages to one or more destinations based on information about the call and the callee's environment, such as the state of the callee's security system.

BACKGROUND

In traditional telephone systems, the mapping between telephone numbers and the phones that ring in response to a call is generally fixed. All calls are delivered to the same destination, regardless of factors such as when the call is made, or the recipient's current status. More sophisticated systems may permit users to have their calls forwarded to another phone, but users often neglect such call forwarding features because they are too cumbersome to use. Accordingly, there remains a need for easy-to-use systems to allow users to receive incoming calls at different locations.

BRIEF SUMMARY

This summary is not intended to identify any critical or key elements, but instead merely presents certain introductory concepts so that the full scope of the claims may be appreciated upon reading the full specification and figures, of which this summary is a part.

In general terms, features described herein allow for incoming messages, such as phone calls, emails, text messages, etc., to be routed to different destinations based on a variety of factors generally related to the environment of the callee. By using this context-sensitive information, calls may be routed in a more convenient manner.

According to one aspect, the state of a security system associated with a callee may be used to determine where to route calls. For example, a home security system in its fully armed state may indicate that no one is home, so incoming calls may be routed elsewhere. Thus, incoming calls to a home may be routed to a cellular phone or to voicemail instead, when no one is home. Time of day may also factor into the routing decision making, so for example, a call received at a time when users are normally asleep may be automatically routed to a voicemail server. Alternatively, phones might only be rung in certain areas of the house, based on time of day. For example, during the night hours, a user might only want calls to ring phones located in non-bedrooms, so as to only disturb those who are awake. As another alternative, such nighttime calls may be routed only to bedrooms, to ensure that the occupant is alerted to the call.

According to another aspect, the location of the intended recipient of a message is used to determine where to send the message. For example, a security system may track a user's location by noting which door a user has opened with his RFID badge. Messages may then be delivered to devices at or near the user's location.

According to another aspect, a motion detector (e.g. an infrared sensor) may be used to determine where to send a message. For example, if there is movement detected within an office, then calls to a number associated with the office may ring only the phone(s) in the office. But if the office is not occupied, then a number of alternative routings may be used. For example, the call could cause an alternative phone at the premises to ring, the call could be sent directly to voicemail, or the call could be forwarded to a cellular phone.

According to yet another aspect, which user placed the security system into its current state may be used to determine where to route messages. For example, if a housekeeper or other visitor disarmed the security system, then messages that are phone calls may be forwarded to a cellular phone. But if an occupant disarmed the security system, then messages that are phone call may then cause phones at the premises to ring.

According to another aspect, a destination may include more than one endpoint. For example, some calls may cause one or more phones to ring, but the call may also be sent to call-recording equipment so the call can be saved for later review. A mapping of security system settings and/or other factors to message destinations may be stored in a memory.

Other features and advantages will be apparent upon reading the detailed description set forth below. The claims herein are not intended to be limited in any way by this brief summary.

DETAILED DESCRIPTION

A common type of security system is an intrusion detection system. Intrusion detection systems typically include a control panel that receives input from various sensors, such as motion detectors, door/window opening detectors, or glass-break sensors. The control panel may use the inputs from the sensors to sound an alarm. Other types of security systems include systems that detect the presence of fires, floods, dangerous gases, or other phenomena within or around a secure area, such as a building.

Security systems can be placed into various states. For example, a security system in an "armed" state may be configured to sound an alarm and/or call the authorities (or monitoring company) in response detecting movement within the monitored premises, or an opening of a closed door or window. The same security system in an "unarmed" state may note the opening of a door/window, or detect movement, but without sounding an alarm. Depending on the configuration of the security system, such as the number and type of sensors, a very large number of states are possible. Another example of a state of a security system is a "sleep" state. In this state, the security system may sound an alarm in response to a door being opened or glass breaking, but not in response to movement from within the monitored premises, to allow for occupant movement within the secure premises.

Sometimes security systems have multiple users who each have a unique identification code, radio frequency identification (RFID) badge, or other way of identifying themselves to the security system. Security systems may also include multiple zones. Each of these possibilities increases the number of potential states for a security system. For example, a security system may be configured to sound an alarm if movement is detected in one zone, but to ignore movement detected in another zone. Or the security system may respond to certain phenomena only if a particular user has not entered his identification code.

A security system may count the number of users who have entered or exited a certain zone (e.g., rooms in a house, offices, etc.). This count would be part of the system's state. Such a count may be useful because the security system may automatically arm when the last user exits a zone.

Figure 1:
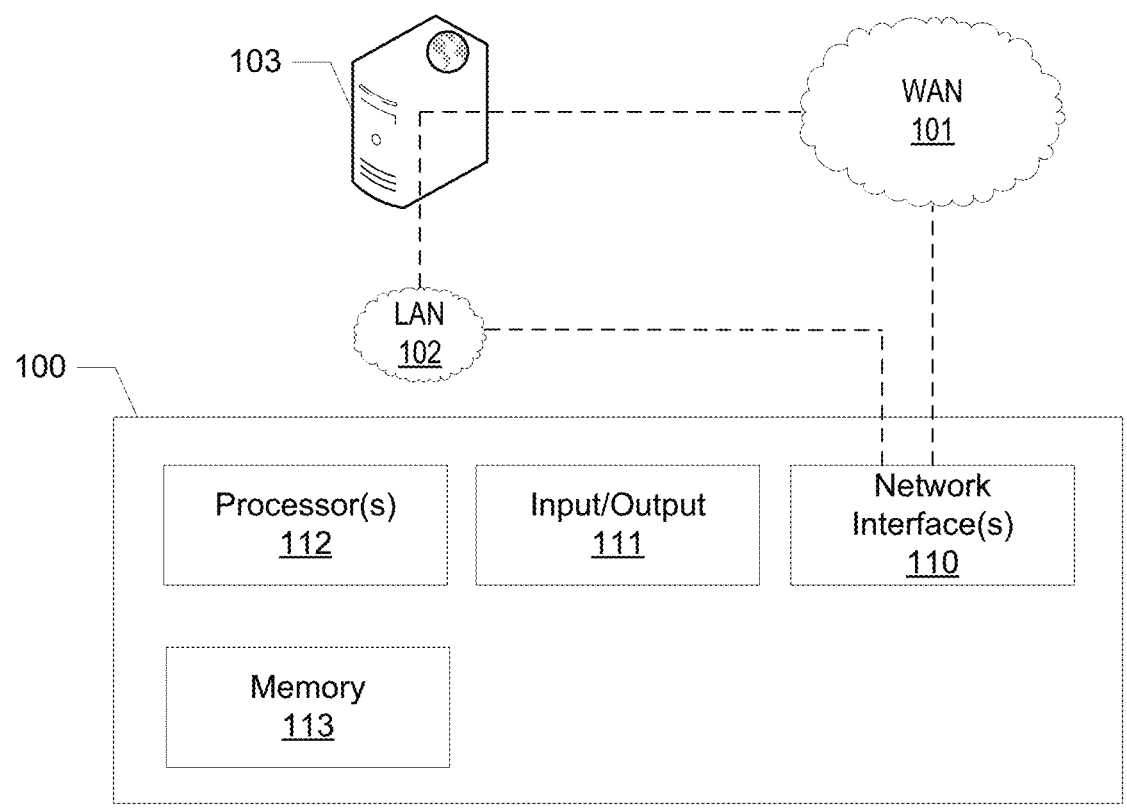
FIG. 1 is an illustrative embodiment of a computing device with call routing features described herein.

FIG. 1 illustrates one example of a computing device 100 that may be used to implement one or more features described herein. The computing device 100 (discussed below) may be connected to various networks outside the premises (e.g., outside the home), such as a wide area network (WAN) 101 (e.g., the Internet), local area network (LAN) 102, wireless/cellular network (not shown), or others. The specific connection may be via coaxial cable, optical cable, satellite, cellular wireless, or whatever other type of connection is desired. On those external networks, there may be any number of servers 103 (e.g., web server, telephone call routing computer, etc.) that can communicate with the computing device 100. Computing device 100 may be any type of computing device capable of performing the functions described herein. For example, computing device 100 may be a standalone PC, a rack-mounted server, a home media system, a security system panel, a cable modem, a set top box, etc.

Various network nodes, such as computing device 100 and external web server 103, may be interconnected via the wide area network (WAN) 101. Other networks may also or alternatively be used, including private intranets, corporate networks, LANs, wireless networks, personal networks (PAN), the public switched telephone network (PSTN), and the like. Network 101 is for illustration purposes and may be replaced with fewer or additional networks. A local area network (LAN) 102 may have one or more of any known LAN topology and may use one or more of a variety of different protocols, such as Ethernet. The connection of computing device 100 to any networks may be achieved through one or more network interfaces 110. The network interfaces may use a variety of communication means, including twisted pair wires, coaxial cable, fiber optics, radio waves, or other means of communication. Other devices (not shown) may be connected to computing device 100 through input/output interfaces 111 (e.g., keyboard, mouse, display, printer, external storage, etc.). Interfaces 111 may also include connections to the various sensors (e.g., motion detectors, doorway/window detectors, etc.) of a home security system.

Computing device 100 may include one or more processors 112, and may include one or more computer-readable memories 113. Memories 113 may include any desired type of data storage, such as hard drive, flash memory, diskette, compact disk, etc.

One or more aspects described herein may be embodied in computer-executable instructions and/or computer-usable or readable data stored in memory 113. The instructions may be one or more program modules, executed by one or more processors 112 or other devices as described herein. Program modules may include routines, programs, objects, components, data structures, etc. that perform particular tasks or implement particular abstract data types when executed by a processor in a computer or other device. The modules may be written in a source code programming language that is subsequently compiled for execution, or they may be written in an interpreted language or a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As noted above, the functionality of computing device 100, server 103, or other computing devices (not shown) described herein may be spread across multiple computing devices. In certain situations it may be advantageous to distribute processing load across multiple devices, to segregate transactions based on geographic location, user access level, quality of service (QoS), etc. FIG. 1 illustrates just one example of a computing device that may be used, and the devices used may vary, and are secondary to the functionality that they provide, as further described herein.

Figure 2:
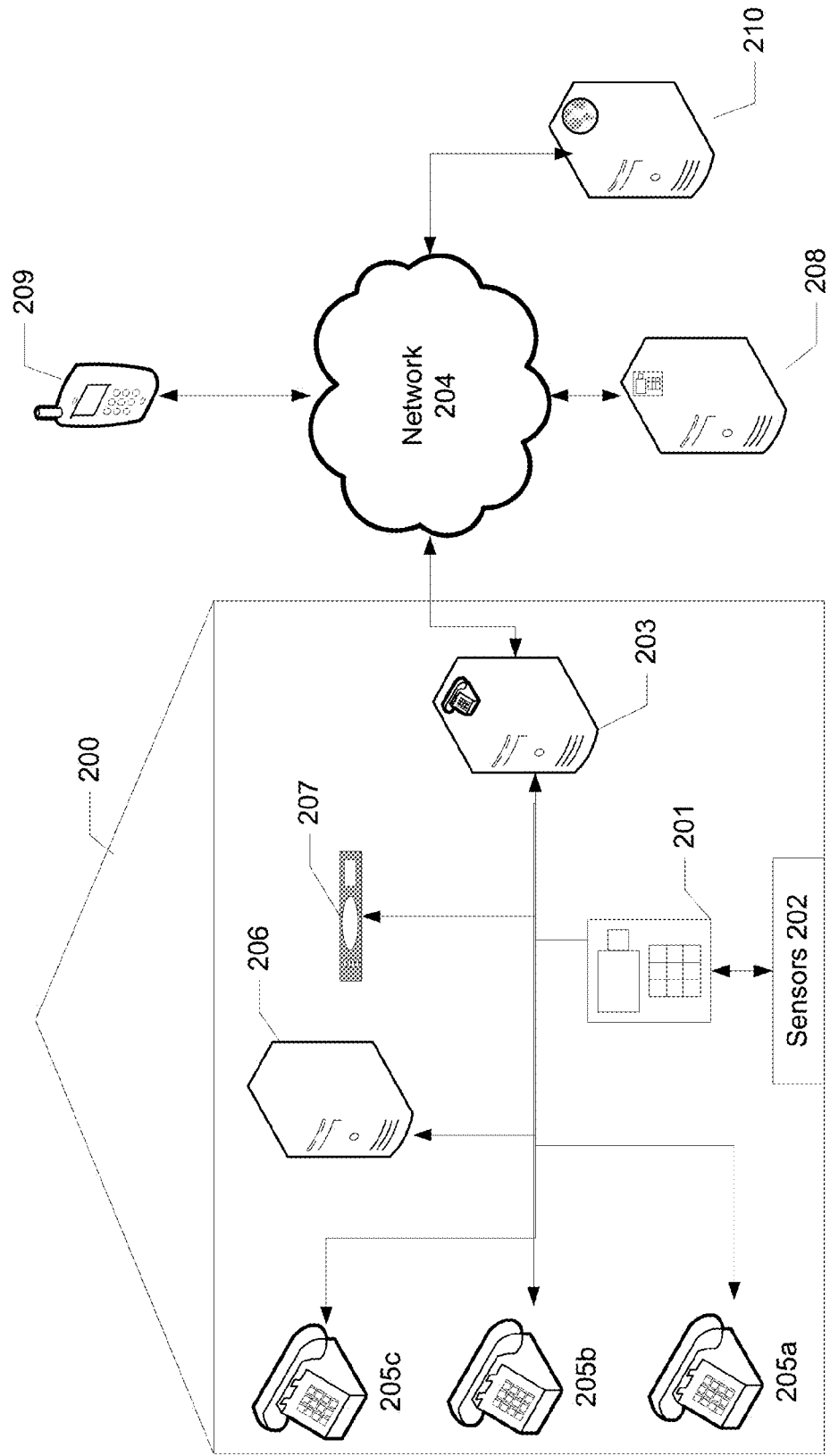
FIG. 2 illustrates one embodiment of a system for routing phone calls.

FIG. 2 shows an illustrative configuration of a premises 200, such as a home, having a security system. In FIG. 2, home 200 contains a security system computer 201, which may be connected to various security sensors 202 around the home (e.g., motion detectors, door/window sensors, etc.), and which may be placed into a variety of states (e.g., unarmed, sleep, away, etc.) by the user.

The home 200 may also include a message routing computing device 203, such as a call router. The call router 203 may be connected to an external network 204, such as a PSTN, coaxial cable network, fiber, etc., and may receive incoming communications (e.g., incoming phone calls) for the home 200, and may direct those communications to different locations. The different locations may be individual telephones 205a-c within the home 200, computers 206, set-top boxes 207, or any other desired location to which a message may be directed. The communication interconnections shown among the home devices in FIG. 2 may be made using any desired connection, such as a home's internal coaxial cable wiring, CAT-5 Ethernet wiring, power system, local wireless, etc.

Call router 213 may route incoming calls based on a number of factors. One factor may be the state of security system 201. For example, if security system 201 is in a "sleep" state, and the home occupants do not wish to receive calls while sleeping, then call router 203 may redirect all incoming calls to a voicemail computer 208, which may be located at a different location on the network 204.

On the other hand, if security system 231 is in a disarmed or "at home" state, then users may wish to receive incoming calls, and call router 213 may cause one or more of phones 205a-c to ring when an incoming call is received. If one or more of telephones 205a-c are not answered, then call router 203 may send the call to voice server 208, or a home answering machine (which may be implemented using routing computer 203). If security system 231 is in an armed or "not at home" state, and users wish to have incoming calls routed to a different, external location, then call router 213 may forward calls to an external phone, such as a cellular telephone 209 (or to a cellular network supporting the cellular telephone).

Users may also wish to have incoming calls routed to a different, external location if security system 231 is in a "visitor" or "kid" state. Examples of "visitor" states include when non-residents such as housecleaners, handymen, dog walkers, baby sitters, etc. disarm the system. Examples of "kid" states include when a child disarms the security system. Routing some or all calls to an external location, or to voicemail, while in a "visitor" or "kid" state keeps visitors and children from intercepting calls. Optionally, the ability to retrieve voicemail from phones 205a-c may also be wholly or partially restricted, as appropriate, while in a "visitor" or "kid" state.

Routing based on a "visitor" or "kid" state may be accomplished by querying the security system to determine its state and the identity of the individual who placed the security system in that state, and then routing calls to or away from phones 205a-c based on the response. The response may indicate a general state of the security system, such as "visitor." The response may also indicate a more specific state. For example, if routing will be performed on the basis of the identity of the user who last disarmed the security system, then this information may be included in the response. Instead of a sending a response, the security system may transmit its state without waiting for a query, or it may store its state in a table or other memory. Calls may then be routed based on the identity of the visitor or kid who disarmed the security system. For example, if Jim the plumber last disarmed the security system by entering his unique code into a keypad, then calls may continue to be routed as if the system were still armed, such as forwarding calls to one or more cellular phones. If Johnny, a child resident, last disarmed the security system by entering his unique code, then some or all calls may cause phones 205a-c to ring.

In one aspect, each of phones 205a-c (and other devices within the home) may be associated with a different phone service subscriber, and may be individually addressable by the router 203. For example, if telephone numbers are being used, then a different telephone number (or address) may be associated with each phone 205a-c. If user names are being used, then calls to one username may go to phone 205a, calls to a second username may go to phone 205b, etc. Multiple combinations of users and phones may be used, such as mapping multiple phones to a single user, mapping multiple users to a single phone, mapping groups of users to groups of phones, etc. Each user and/or phone may also be associated with a separate mailbox on the voicemail server 208.

Individually addressable phones (or other devices) may be caused to ring based on user preference. For example, if the phones 205a-c are individually addressable, and if the user wishes, then only some of phones 205a-c may ring in response to a call. For example, if home security system 201 is in a "sleep" state in which the user does not want incoming calls to disturb sleeping occupants, call router 203 may cause only phone 205a, located on a lower level of home 200, to ring in response to a call. Phones 205b-c may be located in or near bedrooms, and may not ring.

The mapping of users to phones may be adjusted dynamically based on a user's location within the home. For instance, the security system may monitor the location of individual users by having RFID detecting sensors positioned at different locations and monitoring movement of RFID tags within the home. Or, the system may have movement sensors in different bedrooms, and may be programmed to determine that the bedroom's assigned occupant is in that room if there is motion detected in that room (e.g., motion in Sue's room means Sue is in that room). Or, users may simply key in their presence (or absence upon leaving) to the system computer 201. When an incoming call is received for the user, the router 203 (through the security system 201) may determine the current location of the desired user, and may ring just the phone near the user's current location.

Calls may also be routed to other locations outside the home if the security system 201 reports that the desired recipient is not within the home. So, for example, if security system 201 determines that Sue is not in building 200, then calls for Sue may be sent to her cellular phone or to her voice mailbox. Calls to other users may still be routed to phones in the home 205a-c.

Incoming calls may also be routed based on the identity of the caller. For example, if John and Sue share a single subscriber account, they may configure call router 203 to send calls from certain numbers to phone 205b, which may be in John's room, and calls from other numbers to phones 205a,c. In another example, calls from John's workplace and family may be forwarded to John's cellular telephone, and calls from Sue's friends may be forwarded to Sue's cellular telephone. In yet another example, all calls from a list of callers may be allowed to ring some or all of phones 205a-c, regardless of how calls from other callers would be routed. For example, calls from a list of callers may ring some or all of phones 205a-c, regardless of the state of the security system. Conversely, calls from a list of callers may always be sent to a "call blocked" message or to voicemail, regardless of how calls from other callers would be routed.

Call router 203 may also change its routing of calls based on prior behavior of the caller, such as repeated unsuccessful attempts within a predetermined time period. For example, if a caller calls John more than three times in five minutes, the next attempt may be routed differently, such as directly to voicemail, or to a different device, depending on John's preference. In this way, urgent calls may reach John even though normal calls would not disturb him.

Call router 203 may also take the time or date into account. For example, call router 203 may send all calls to voicemail when the security system is first placed into a sleep state, but it may allow those calls to ring one or more of phones 205a-c after a set time or a calculated time. For example, a call may be allowed though after the security system has been in the sleep state for eight hours. Other examples include allowing calls through after a specific time (e.g., after 8 a.m.), after sunrise, or after some predetermined number of minutes before or after sunrise.

Call routing may also vary with the date. For instance, calls may be routed differently on weekends than on weekdays. Calls may be allowed to ring one or more of phones 205a-c after 8 a.m. on normal weekdays, but calls may not be allowed to ring phones 205a-c until after 10 a.m. on weekends or holidays when the security system is in a sleep state.

Call router 203 may also take into account the time at the destination to which the call is to be routed. For instance, if a call may be forwarded to a cellular phone, the call router may take the time zone in which the cellular phone is located into account. This may prevent calls from ringing a traveler's cellular phone in the middle of the night. Information about the location of a cellular phone may be received from a user or retrieved automatically. Examples of automatic retrieval include receiving communications from the cellular phone itself and receiving communications from location-tracking services, which communicate with either the cellular phone or the cellular service provider, or receiving the information from a cellular phone service to which the phone has registered its location.

The operator of call router 203 may implement a number of default call routing rules, such as that calls are sent to voicemail when the home security system is in a sleep state. Subscribers may modify the call routing rules using, for example, a keypad on the security system computer 201, a computer and web interface, etc. The web interface may allow users to specify or modify both a default rule, i.e. a rule that applies generally, and exceptions to that default rule. For example, a default rule may be that when the security system is in a certain state, all calls go to voicemail. An exception may be that calls from a certain person or group are forwarded to a cellular phone instead of going to voicemail.

The web interface may allow users to specify rules for routing phone calls based on a variety of factors, including the state of security system 201 (including information about how the security system will respond to inputs from its sensors, information detected by the sensors themselves, and information about individuals, such as that Sue has not typed her id code into the security system today). Other factors on which call routing may be based include the origin of a call, such as the number that appears in caller ID, the identity of the callee (such as which of several phone numbers associated with building 230 were dialed), the number of recent call attempts (such as if a caller attempts to call three times in five minutes), the date (such as whether it is a weekday, weekend, or holiday), the time, etc.

Where rules for routing phone calls are based on the phone number of the recipient or callee, wildcards may be used. In other words, if a user wishes to specify that calls from 555-5550, 555-5551, 555-5552, ..., 555-5559 are to go to voicemail, the user may affect this functionality in more than one way. One way would be to make a rule that says, calls from 555-555* are to go to voicemail. (Here, the * indicates that any number may be in the last position.) The user may also define a list containing all of the callers whose calls should be sent to voicemail. Alternatively, the user may create multiple separate rules for each caller. I.e. "Calls from 555-5550 go to voice mail" would be one rule, and "Calls from 555-5551 go to voicemail" would be another.

The rules may route calls to various destinations. The destinations may include cellular phones, subsets of the phones that are available with building 200, voicemail, busy signals, messages that calls have been blocked, office phones, call recording equipment, etc. It may be advantageous to allow users to give names to destinations or lists of phone numbers within the web interface. For example phones 205b and 205c may be called "upstairs phones" and all numbers beginning with 555-555 may be called "accounting department." This allows the routing rules to be defined in a user-friendly manner. For example, the user may now specify that calls from "accounting department" go to the destination "upstairs phones" on weekends.

Similarly, it may be advantageous to allow users to give names to states or groups of states of security system 201, as well as to other items on which call routing may be based. For example, if security system 201 has multiple zones (e.g., multiple rooms having monitoring devices), it may be advantageous to allow the user to define a name, such as "guesthouse armed," to describe states when some of the zones are set to sound an alarm. Default names for various states or groups of states of security system 201 may be provided. Default names for groups of dates may also be provided, such as "weekends," "weekdays," and "holidays."

Users may be able to specify call routing rules through a variety of user interfaces. For example, the user may type in rules such as "if security system is armed, then forward all calls to Bob's phone" into a text box. Alternately, the user may build such a rule using drop-down boxes, radio-boxes, etc.

Instead of or in addition to the web interface described above, users may also change call routing rules using a customized software application. In addition, call center employees may operate the web interface or customized software application in response to user requests received over the phone or in writing.

As shown in FIG. 2, web server 210 is connected to call router 203 via the network 204. Users may interact with web server 210 in order to define the routing rules for their account. Web server 210 then communicates those rules to call router 203. Alternately, call router 203 may query web server 210 in order to retrieve routing rules as needed (e.g., the call router 203 may transmit a message containing the incoming caller id, call type, etc., to the server 210, and may receive a response instructing the router 203 on where to route the call). Finally, a third server, separate from both call router 203 and web server 210, may house the routing rules. The various components illustrated may be combined/separated as desired, and are not limited to the particular configuration shown in the figure.

Locations may be altered as well. While the call router is shown inside of building 200 in FIG. 2, some or all of the elements of its functionality may be implemented at other locations. For example, decisions about which of phones 205a-c to ring may be handled by hardware located outside the home 200.

The connections between and locations of components shown in FIG. 2 are conceptual, not necessarily physical. For instance, the voice mailboxes may be physically housed at a datacenter located outside of building 200. Also, a service provider may have only a single line, such as a coaxial cable or fiber optic cable, leading into building 200. Security system 201 and phones 205a-c may be directly connected to that line. Alternatively, any or all of these components may be connected to the line indirectly. For example, any of phones 205a-c may connect to traditional twisted pair copper wiring used to provide traditional telephone service.

Other connection methods, such as radio transmissions, may also be used. For instance, one or more of phones 205a-c may be cellular phones, and security system 201 may communicate with other devices wirelessly. Phones 205a-c (as well as security system 201) may also be directly connected to the internet. This may be advantageous, for example, where the phone is implemented in software on a general-use computer.

Figure 3:
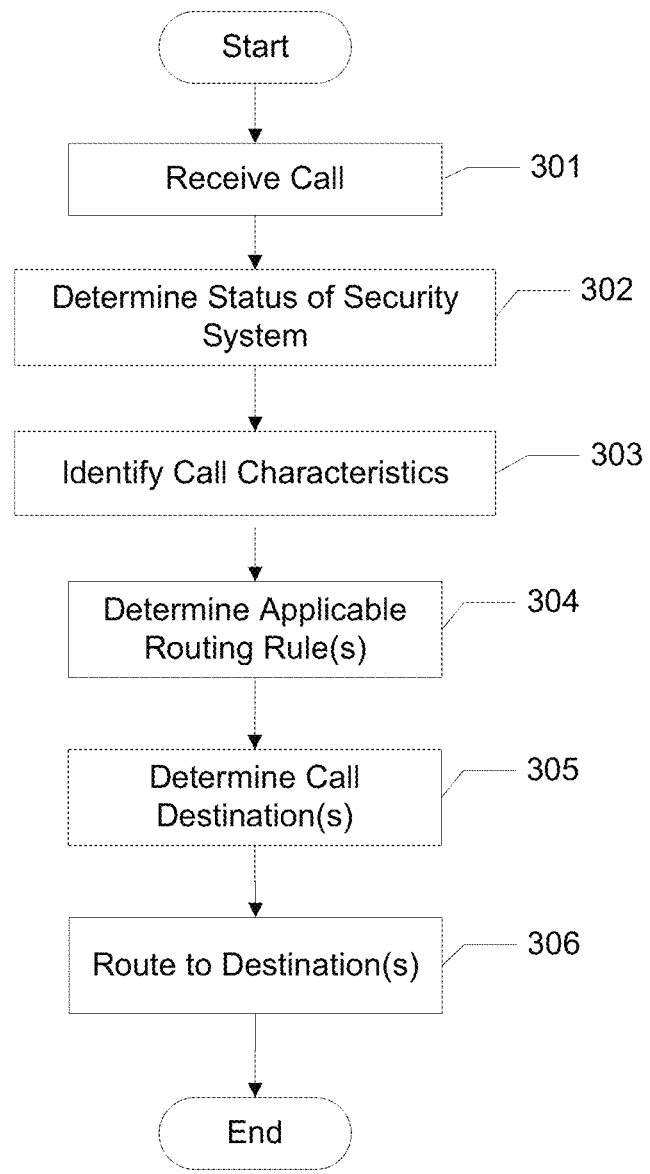
FIG. 3 shows a method for routing calls using features described herein.

FIG. 3 illustrates a method of routing calls in accordance with some aspects described herein. The decisions and steps shown in FIG. 3 are shown for illustrative purposes. Many variations of the illustrated method are possible. The decisions and steps shown may be removed, combined, or re-ordered while still obtaining identical or satisfactory results. Other steps or decisions may be added.

In step 301, a call (or other incoming message, such as email, text message, SMS, etc.) is received. In step 302, the routing computer 203 may determine the security state of the security system 201. This may be accomplished, for example, by transmitting a query to the security system computer 201. Alternatively, the security system 201 may periodically report its status to the call routing computer 203, which may store information identifying the status of the security system 201. The status information may identify the current mode (e.g., armed, unarmed, sleep, etc.), as well as user presence information, such as the location(s) of the home's occupants.

Then, in step 303, information about the received call, such as the caller's identification, the callee's identification, the state of the security system, the number of recent call attempts from the caller, the call type, message duration, etc, may be determined. The items listed in may be determined or identified at a later point in time. They are listed together in step 303 for conceptual simplicity.

In step 304, the applicable routing rules may be retrieved and consulted. The rules may be maintained in a database on, for example, the router 203. Rules may be deemed applicable based on the combination of security state and call characteristics (e.g., one predetermined rule may apply for calls from John received while the security system is armed "away").

In step 305, the applicable rule may be applied to the combination of security status and call characteristics, and the destination for the call may be determined. So, for example, the applicable rule may dictate that calls from John received while the system is armed "away" should be forwarded to Sue's mobile telephone. Alternatively, if Sue is determined to be at home and in her room, the applicable rule may dictate that the call from John be forwarded to the specific phone in Sue's room. In step 306, the call may be routed to the determined destination.

The table below illustrates an example combination of rules that may be established by the home occupant using any desired interface to the security system 201 and routing system 203 (e.g., web interface, computer display, keypad, etc.). As illustrated, the rules may implicate the setting of the security system, the caller identity, time of day, address of destination (e.g., an Internet Protocol address) etc.

| Security State | Caller ID | Time of Day | Destination |
| --- | --- | --- | --- |
| Unarmed | John | Any | 200.200.200.200 (Sue's Room) |
| Unarmed | Sam | Any | 200.200.200.100 (Jay's Room) |
| Armed/Away | John | 9am-5pm weekday | 200.200.200.300 (voicemail) |
| Armed/Home | Any | Any | 200.200.200.500 200.200.200.501 200.200.200.502 (Ring all Phones) |

While the features herein have been described with respect to specific examples, there are numerous variations and permutations of the above described systems and techniques that may be made. For example, illustrated steps and elements may be combined, divided, and rearranged as desired. Additional elements and steps may be added and/or inserted among those depicted.

The invention claimed is:

1. A method comprising:
   receiving, by one or more computing devices, a telephone call to a destination telephone number from a caller;
   determining, by the one or more computing devices, an intended recipient of the telephone call based on an originating telephone number of the caller or identity of the caller; and
   routing, by the one or more computing devices, the telephone call to one or more devices based at least in part on the intended recipient of the telephone call and based at least in part on information received from a security system, the information comprising an indication of a state of the security system.

2. The method of claim 1, wherein routing the telephone call further comprises:
   determining a location associated with the intended recipient; and
   selecting a first device of the one or more devices to receive the telephone call based at least in part on an indication of a presence or absence of movement at the location.

3. The method of claim 1,
   wherein the routing further comprises routing the telephone call based at least in part on an indication of an individual that placed the security system into its current state.

4. The method of claim 1, further comprising storing in a memory, by the one or more computing devices, information indicating phone call routing destinations based on different alarm settings of the security system.

5. A method, comprising:
   receiving, by one or more computing devices, a message;
   determining, by the one or more computing devices, a location of an intended recipient of the message within a premises based at least in part on information received from a security system of the premises; and
   routing, by the one or more computing devices, the message to one of a plurality of devices in the premises, based at least in part on the determined location of the intended recipient of the message within the premises.

6. The method of claim 5, wherein the information received from the security system that is used to determine the location of the intended recipient of the message comprises an indication of a presence or absence of movement at a location associated with the intended recipient of the message.

7. The method of claim 5, wherein the information received from the security system comprises an indication of a state of the security system.

8. The method of claim 5, wherein the information received from the security system comprises an indication of who placed the security system into its current state.

9. A method comprising:
   receiving an incoming message from an external communication network; and
   routing the incoming message to a subset of a plurality of devices in a premises based on output from a movement detector of a security system associated with the premises, wherein the subset of the plurality of devices in the premises excludes one or more devices in the plurality of devices in the premises.

10. The method of claim 9, wherein routing the incoming message to the subset of the plurality of devices in the premises is further based on a state of the security system.

11. The method of claim 9, wherein routing the incoming message to the subset of the plurality of devices in the premises is further based on information indicating an individual that placed the security system into its current state.

12. The method of claim 1, wherein the routing further comprises routing the telephone call based at least in part on a time of day at which the telephone call was received.

13. The method of claim 12, wherein the routing further comprises:
   determining a first cellular telephone within the one or more devices;
   determining a current time zone associated with the first cellular telephone; and
   routing the telephone call to the first cellular telephone based on the determination of the current time zone associated with the first cellular telephone.

14. The method of claim 1, wherein the routing further comprises routing the telephone call:
   based at least in part on a day of the week that the telephone call was received.

15. The method of claim 1, further comprising:
   retrieving a second information indicating a prior behavior stored before the telephone call, the second information indicating the prior behavior associated with the caller, wherein the routing further comprises routing the telephone call
   based at least in part on the second information indicating the prior behavior associated with the caller.

16. The method of claim 15, wherein the routing further comprises:

retrieving records corresponding to a number of previous telephone calls associated with the caller;

determining a time period corresponding to the number of previous telephone calls associated with the caller; and routing the telephone call based at least in part on the number of previous telephone calls associated with the caller and the time period corresponding to the number of previous telephone calls associated with the caller.

17. The method of claim 5, wherein routing the message to the one of the plurality of devices in the premises is further based on a day of the week on which the message was received.

18. The method of claim 5, wherein receiving the message comprises receiving an email, text message, or short message service (SMS) message, and wherein routing the message to the one of the plurality of devices further comprises routing the message to a device capable of displaying the email, text message, or SMS message.

19. The method of claim 9, wherein receiving the incoming message comprises receiving an email, text message, or short message service (SMS) message, and wherein routing the incoming message further comprises routing the incoming message to one or more devices capable of displaying the email, text message, or SMS message.

20. The method of claim 9, wherein the routing further comprises routing the incoming message to the subset of the plurality of devices in the premises based at least in part on a time of a day at which the incoming message was received.

\* \* \* \* \*